United States Patent [19]
Woodgate et al.

[11] Patent Number: 5,991,073
[45] Date of Patent: Nov. 23, 1999

[54] AUTOSTEREOSCOPIC DISPLAY INCLUDING A VIEWING WINDOW THAT MAY RECEIVE BLACK VIEW DATA

[75] Inventors: Graham John Woodgate, Oxfordshire; Richard Robert Moseley, Oxford; David Ezra, Oxfordshire, all of United Kingdom

[73] Assignee: Sharp Kabushiki Kaisha, Osaka, Japan

[21] Appl. No.: 08/788,035

[22] Filed: Jan. 23, 1997

[30] Foreign Application Priority Data

Jan. 26, 1996 [GB] United Kingdom .................... 9601620

[51] Int. Cl.⁶ .................................................. G02B 27/22
[52] U.S. Cl. ............................................. 359/462; 359/463
[58] Field of Search ...................................... 359/463, 464, 359/462; 348/54, 52, 51, 59; 349/15

[56] References Cited

U.S. PATENT DOCUMENTS

| 1,262,955 | 4/1918 | Bass et al. . | |
|---|---|---|---|
| 2,273,577 | 6/1942 | Ezra et al. . | |
| 4,132,468 | 1/1979 | Lo et al. | 359/463 |
| 5,349,379 | 9/1994 | Eichenlaub | 359/466 |
| 5,617,549 | 4/1997 | Yoshinaga et al. . | |
| 5,625,861 | 4/1997 | Woodgate et al. . | |
| 5,712,732 | 1/1998 | Street | 359/630 |
| 5,777,787 | 7/1998 | Luder et al. | 359/462 |

FOREIGN PATENT DOCUMENTS

| 0354851 | 2/1990 | European Pat. Off. . |
|---|---|---|
| 0726482 | 8/1996 | European Pat. Off. . |
| 0729054 | 8/1996 | European Pat. Off. . |
| 0752610 | 1/1997 | European Pat. Off. . |
| 9406249 | 9/1993 | WIPO . |
| 9702709 | 6/1996 | WIPO . |

OTHER PUBLICATIONS

U.S. Patent application Ser. No. 08/674.906; J. Harrold; "Spatial Light Modulator and Directional Display", filed Jul. 3, 1996.
U.S. Patent application Ser. No. 08/592,563; G. J. Woodgate; "Autostereoscopic Display and Method of Controlling an Autosteroscopic Display", filed Jan. 26, 1996.
U.S. Patent application Ser. No. 08/245,584; G. J. Woodgate et al; "Spatial Light Modulator and Directional Display", filed May 18, 1994.
Search Report for Application No. GB 9601620.9; dated Apr. 3, 1996.
European Search Report related to European Patent Application No. 97300482.3 dated May 20, 1998.
J. Eichenlaub, et al.; "An In Cockpit 'Situation Awareness' Autosteroscopic Avionics Display"; 13th Digital Avionics Systems Conference, Phoenix, Oct. 30–Nov. 3, 1994, pp. 257–268.

Primary Examiner—Jon Henry

[57] ABSTRACT

An autostereoscopic display includes a display device and an optical system which provide laterally overlapping viewing windows wherein one viewing window may receive black view data while an adjacent viewing window receives eye view data. Such a display may be used to perform observer tracking.

31 Claims, 48 Drawing Sheets

| | RIGHT VIEW | LEFT VIEW | BLACK VIEW |
|---|---|---|---|
| A | 1→2 | 3 | 2→1 |
| B | 2 | 3 | 1 |
| C | 2 | 3→1 | 1→3 |
| D | 2 | 1 | 3 |
| E | 2→3 | 1 | 3→2 |
| F | 3 | 1 | 2 |
| G | 3 | 1→2 | 2→1 |

ARRANGEMENT OF PROJECTION APERTURES

USE OF RECTANGULAR MASK IN PROJECTION APERTURES TO IMPROVE ILLUMINATION UNIFORMITY AT WINDOW PLANE

AUTOSTEREOSCOPIC DISPLAY INCLUDING A VIEWING WINDOW THAT MAY RECEIVE BLACK VIEW DATA

TECHNICAL FIELD

The present invention relates to an autostereoscopic display.

BACKGROUND OF THE INVENTION

In normal vision, the two human eyes perceive views of the world from different perspectives due to the separation of the eyes (Interocular separation). These two perspectives are then used by the brain to assess the distance to various objects in a scene. In order to provide a display which effectively displays a three dimensional (3D) image, it is necessary to recreate this situation and supply a so-called stereoscopic pair of images, one to each eye of the observer.

3D displays are classified into two types, namely stereoscopic and autostereoscopic, depending on the method used to supply the different views to the eyes. Stereoscopic displays typically display both of the images over a wide viewing area. In one known type of arrangement, two head mounted separate channels, as in head mounted displays, are worn by an observer such that each channel presents a respective one of the stereoscopic pair of images to the associated eye. Other types of stereoscopic displays typically display both of the images over a wide viewing area. FIG. 1 of the accompanying drawings illustrates such a display at 1 and illustrates the wide output light cone 2 produced by the display. Each of the views is encoded, for instance by colour (in anaglyph systems), polarisation state, or temporally (in shutter glasses systems). Viewing aids such as filters 3 and 4 are worn in front of the right and left eyes R and L of the observer so as to separate the views and let each eye see only the view intended for it. Thus, as shown in FIG. 1, the left and right views are encoded by encodings A and B.

The filter 3, which may be a colour filter, a polarising filter or a shutter, blocks light with the encoding A hut passes light with the encoding B so that the right eye R sees the right view. Similarly, the filter 4 blocks light with the encoding B but passes light with the encoding A so that the left eye sees only the left view.

Autostereoscopic displays require no viewing aids to be worn by the observer. Instead, the two views are only visible from limited regions of space as illustrated in FIG. 2 of the accompanying drawings. The autostereoscopic display 1 creates 'viewing regions' such as 6 and 7. The viewing regions are regions of space in which a single two dimensional (2D) image is visible across the whole of the active area of the display 1 by one eye. When an observer is situated such that the right eye R is in the right viewing region 7 and the left eye L is in the left viewing region 6, a stereoscopic pair of images is seen and a 3D image can be perceived.

For flat panel autostereoscopic displays, the viewing regions are typically formed by cooperation between the picture element (pixel) structure of the display and an optical element which is referred to as a parallax optic. Examples of parallax optics are parallax barriers, lenticular screens and holograms. A parallax barrier is a screen with vertical transmissive slits separated by opaque regions. FIG. 3 illustrates an autostereoscopic display of the front parallax barrier type. A parallax barrier 8 is disposed in front of a spatial light modulator 9 comprising glass substrates 10 and columns of pixels 11 with gaps 12 between adjacent columns. The SLM 9 may be a light-emitting device, such as a pixelated electroluminescent display. However, as shown in FIG. 3, the SLM 9 is of the light valve type, such as a liquid crystal device (LCD), provided with a backlight 13.

The pitch of the slits such as 14 is chosen to be close to an integer multiple of the pitch of the columns of pixels 11 so that groups of columns of pixels are associated with each slit of the barrier 8. As shown in FIG. 3, each slit such as 14 is associated with three columns such as columns 1, 2 and 3.

The function of the parallax optic 8 is to restrict the directions in which light is transmitted through each of the pixels to a predetermined range of output angles. To a first order, the angular range of view of each pixel is determined by the pixel width and the separation between the plane of the pixels and the plane of the parallax optic 8.

FIG. 4 of the accompanying drawings illustrates the angular zones of light created by the SLM 9 and the parallax barrier 8 where the parallax barrier has a pitch which is an exact integer multiple of the pitch of the columns of pixels 11. The angular zones Z1 and Z2 coming from different locations across the display surface intermix. Thus, there is no region in front of the display where an eye of the observer will see a single image across the whole of the display surface.

In order to overcome this problem, the pitch of the parallax optic 8 is reduced slightly so that the angular zones Z1 and Z2 converge at a predetermined plane referred to as a 'window' plane 15 in front of the display as illustrated in FIG. 5. The change in pitch of the parallax optic 8 is referred to as 'viewpoint correction' and gives rise to the viewing regions 6 and 7 where the zones Z2 and Z1, respectively, all overlap. The viewing regions 6 and 7 are generally 'kite' shaped in the lateral plane and extend vertically.

The window plane 15 defines the optimum viewing distance of the display. An observer whose eyes are located in the window plane 15 receives the best performance from the display. As each eye of the observer moves laterally in the window plane 15, the perceived image remains unchanged until the eye reaches the edge of the viewing region 6 or 7. The image perceived across the whole display will then change as the eye moves into the adjacent viewing region, for instance to the next image. The part of the window plane 15 within each viewing region 6, 7 is generally referred to as a 'viewing window'.

In a typical SLM such as a thin film transistor liquid crystal display (TFT LCD), the columns of pixels 11 are spaced apart by the gaps 12 to allow for the routing of electrical connections. The gaps 12 form vertical strips and are covered by an opaque material to stop light leaking through the gaps. In a TFT LCD, the opaque layer is called a 'black mask' or 'black matrix'. However, as illustrated in FIG. 6 of the accompanying drawings, the vertical strips between the columns of pixels 11 are also imaged to the window plane and cause dark regions 16 to be formed between the viewing regions 6, 7. If the dark regions 16 are to be avoided so that the viewing regions 6, 7 meet each other, apertures in the black mask defining the pixels 11 must be such that adjacent pairs of pixel columns associated with each parallax element of the parallax optic 8 are horizontally contiguous i.e. there is no continuous vertical black mask strip between such adjacent pairs of pixel columns.

The illumination profile (variation of light intensity with viewing position) within each viewing region 6, 7 is determined by the shape of the apertures defining the pixels 11. The parallax optic 8 is a cylindrical optical element so that the vertical aperture of each pixel column is integrated to give vertically extended lumination within each viewing region 6, 7. Thus, If the vertical aperture of the pixel varies across its width as illustrated at 17 in FIG. 7, illumination of the viewing window varies across its width. This is illustrated in FIG. 7 for the viewing region 7, which is divided into a bright zone 18, a dull zone 19, and mixed zones 20. An observer whose eye moves between the bright zone 18 and the dull zone 19 will perceive an intensity change of the order of 5% or more as a visual flicker effect. This effect detracts from the perceived quality of the display and is uncomfortable. It is therefore desirable to maintain a constant vertical aperture ratio in such displays, for instance by means of rectangular pixel apertures.

If an eye of the observer is not located at the window plane 15, then the breakdown in viewpoint correction means that the eye will see different information in different places across the display surface. For instance, if an observer eye is in the mixed zone 20 closer to the display, the observer eye will see the left hand side of the display as being substantially brighter than the right hand side thereof. If the observer is sufficiently far away from the window plane to be outside the viewing regions 6, 7, each eye sees slices of different images across the display surface so that the 3D effect is lost. This condition begins to occur at the tips of the viewing regions 6, 7 nearest and furthest from the display. Dark bands caused by vertical strips between the pixels also become visible as darker bands on the display.

Although each parallax element is principally associated with a respective group of pixel columns as illustrated by columns 1, 2 and 3 in FIG. 3, adjacent groups of pixel columns are also imaged by the element. Imaging of the groups creates lobes of repeated viewing regions to either side of the central or zero order lobe as illustrated in FIG. 8 for a two view display showing views V1 and V2. Each of the lobes repeats all the properties of the central lobe but is affected to a larger extent by imperfections and abberations of the optical system so that higher order lobes may be unusable.

In order to provide a full colour display, each pixel 11 is generally optically aligned with a filter associated with one of the three primary colours (red, green, blue). By suitably controlling groups of three pixels associated with the three primary colour filters, substantially all visible colours may be produced or approximated. In an autostereoscopic display, each of the stereoscopic image channels must contain enough of the colour filters for a balanced colour output. Many SLMs have colour filters arranged in vertical columns for ease of manufacture so that all the pixels in each column have the same colour filter associated therewith. If a parallax optic were disposed on such an SLM with three pixel columns associated with each parallax element, light imaged into each viewing region would be of only one colour. The colour filter layout must therefore be such as to avoid this situation, for instance as disclosed in EP 0752610.

The autostereoscopic displays illustrated in FIGS. 3 to 7 have parallax barriers as the parallax optics 8 disposed at the front of the display i.e. between the SLM 9 and the viewing regions 6, 7. However, other arrangements of parallax optical work in substantially the same manner.

For instance, as shown in FIG. 9 of the accompanying drawings, the front parallax barrier may be replaced by a front lenticular screen which comprises an array of cylindrically converging lenslets or lenticules. The lenticular screen focuses light from the SLM 9 to the window plane and produces viewing regions having well-defined boundary regions on axis. Because the lenticules work by redirecting light rather than by restricting light throughput as in the case of a parallax barrier, the illumination at the window plane is greater for a lenticular screen. However, parallax barriers are not subject to the optical abberations produced by lenticular screens.

FIG. 10 of the accompanying drawings illustrates an autostereoscopic display which differs from that shown in FIG. 3 in that the parallax barrier 8 is disposed between the backlight 13 and the SLM 9 to form a rear parallax barrier display. This arrangement has the advantage that the parallax barrier 8 is kept behind the SLM 9 and therefore way from possible damage. Also, the light efficiency may be improved by making the rear surface of the parallax barrier 8 reflective so as to permit recycling of the light not incident on the slits (rather than absorbing such light). A switchable diffuser 21 is disposed between the SLM 9 and the parallax barrier 8 and may, for example, comprise a polymer-dispersed liquid crystal. When switched to a low dispersion state, the display operates as described hereinbefore as an autostereoscopic 3D display. When the diffuser 21 is switched to a highly dispersive state, the light rays are deflected on passing through the diffuser to form an even or 'Lambertian' distribution which prevents the creating of the viewing zones. The display therefore functions as a 2D display and permits the full spatial resolution of the SLM 9 to be used in displaying a 2D image.

FIG. 11 shows a known type of spatial light modulator (SLM) 9 in the form of a liquid crystal display (LCD) comprising a plurality of picture elements (pixels) arranged as rows and columns in a regular pattern or array. The LCD 9 provides a colour display and comprises red pixels 32, blue pixels 33, and green pixels 34. The LCD 9 is of the thin film transistor twisted nematic type and the pixels are separated from each other by a black mask 35. Thus, each column of pixels is separated from each adjacent column by a continuous vertical opaque strip of the black mask 35, which prevents light from passing through the thin film transistors of the LCD 1.

In order to provide a 3D display, a lenticular screen 8 is disposed in front of the pixels of the LCD 9. The lenticular screen 8 comprises a plurality of vertically extending lenticules, each of which is optically cylindrically converging. The lenticules extend vertically and may be formed, for instance, as plano-convex cylindrical lenses or as graded refractive index (GRIN) cylindrical lenses. Each lenticule is disposed above a plurality of columns of pixels (four columns as shown in FIG. 11) and each column of pixels provides a vertical slice of a 2D view. The shape of each pixel is rectangular with a small rectangular extension projecting from the right side of each pixel.

As illustrated in FIG. 12, when the 3D display is suitably illuminated from behind and image data are supplied to the pixels of the LCD 9 such that each column of pixels displays a thin vertical slice of a 2D image, each lenticule of the screen 8 forms viewing zones 37 to 40 from the respective four columns of pixels associated with the lenticule. The directions in which the viewing zones 37 to 40 extend correspond to the directions from which the respective 2D views were recorded during image capture. When viewed by an observer whose eyes are in adjacent ones of the viewing zones 37 to 40, a 3D image is perceived.

However, the vertical portions of the black mask 35 between the columns of pixels are also imaged in the directions indicated at 41 to 45. Further, the viewing zones 37 to 40 contain regions such as 46 to 48 of reduced brightness corresponding to imaging of the rectangular protrusions extending from the main pixel regions. Thus, the output of the display does not have continuous parallax with uniform brightness.

FIG. 13 shows a 3D display of the type disclosed in EP 0 625 861 and comprising an LCD 9 and a lenticular screen 8. The LCD 9 differs from that shown in FIG. 11 in that the pixels are arranged in a different pattern of horizontal rows and vertical columns. In particular, each pixel may be a composite pixel comprising a red pixel 32, a blue pixel 33 and a green pixel 34. The pixels are arranged such that they are contiguous in the horizontal direction. In other words, there are no continuous vertical black mask portions separating the pixels. To achieve this, each composite pixel 50 in a first row is spaced vertically from a horizontally adjacent composite pixel 51 in a second row but the right hand edge of the composite pixel 50 lies on the same vertical line as the left hand edge of the composite pixel 51. Thus, compared with FIG. 11, the number of columns of pixels imaged by each lenticule of the screen 8 has been doubled to eight whereas the vertical resolution of the LCD 9 has effectively been halved.

As shown in FIG. 14, each lenticule of the screen 8 generates eight viewing zones 52 to 59 which are angularly contiguous with each other and which represent eight different 2D views with continuous horizontal parallax. Thus, "black" regions such as 41 and "grey" regions such as 46 in FIG. 2 are eliminated and an observer can perceive a 3D image of substantially constant intensity and without image gaps. Further, the number of 2D views for the or each 3D image frame is doubled by halving the vertical resolution.

The LCD 9 shown in FIG. 13 thus overcomes the disadvantages of the LCD 9 shown in FIG. 11 in that contiguous viewing zones can be produced. However, the pixels must be accurately contiguous in the horizontal direction in order to avoid undesirable visual artifacts appearing to the observer. In particular, any underlap or overlap of the pixels in the horizontal direction will give rise to intensity variations as an observer eye moves from each viewing zone to an adjacent viewing zone. Thus, LCDs of this type have to be manufactured to very tight tolerances in order to avoid such effects and this increases the complexity and cost of manufacture.

Further, as will be described hereinafter, the crosstalk between left and right views may give rise to undesirable visual artifacts with the LCD of FIG. 13. In particular, the amount of crosstalk seen by each eye may be different and may vary in a stepwise manner as the observer moves.

EP 0 617 549 discloses an stereoscopic head-mounted display which has a separate display device and optical system for each eye of an observer. Each display device comprises a backlight and an LCD and each pedocal system forms a virtual image of a left or right eye view of a stereoscopic pair. For viewing comfort, the virtual images are formed in the same region in front of the observer.

EP 0 262 955 discloses an autostereoscopic display of the type providing two views which are repeated in a plurality of lobes.

SUMMARY OF THE INVENTION

According to a first aspect of the invention, there is provided a viewpoint corrected autostereoscopic display comprising at least one display device and an optical system, characterised in that the optical system cooperates with the display device to form, in a window plane, a plurality of viewing windows with adjacent pairs of viewing windows overlapping laterally.

Manufacturing tolerances can therefore be relaxed because small errors in the positions of the viewing windows no longer give rise to undesirable visual artifacts.

The or each display device and the optical system may cooperate to form at least three windows. Such an arrangement permits observer tracking without moving parts to be provided and a display providing three windows is the simplest form of such an observer tracking display.

Preferably the or each display device and the optical system cooperate to repeat the windows in a plurality of lobes. This arrangement permits greater observer viewing freedom. It is preferable that the lobes overlap, The at least one display device may comprises a spatial light modulator comprising a plurality of picture elements arranged as rows extending in a first direction and columns extending in a second direction substantially perpendicular to the first direction, the picture elements being arranged in groups of N, where N is an integer greater than 1, adjacent the picture elements of each group overlapping with each other in the first direction. Such pixelated spatial light modulators are available and provide an elegant way of embodying the display. For convenience, the picture elements of each group may be disposed in two adjacent rows.

The picture elements may have a substantially constant vertical aperture and may, for example, be of rectangular or parallelogram shape. Such an arrangement avoids variations in illumination intensity across the viewing windows.

Adjacent groups of picture elements may overlap with each other in the first direction.

The width of each picture element may be substantially equal to one and half times the lateral pitch of the picture elements to provide an optimum layout.

The spatial light modulator may be embodied as a light-emissive device, such as an electroluminescent display, or as a light-transmissive device, such as a liquid crystal device, for instance associated with a source of illumination such as a backlight.

The optical system may comprise a parallax device having a plurality of parallax generating elements which extend in the second direction and each of which is aligned with N columns of picture elements. Examples of parallax devices are parallax barriers, lenticular screens, and holograms.

The at least one display device may comprise a spatial light modulator comprising a plurality of picture elements arranged as rows extending in a first direction and columns extending in a second direction substantially perpendicular to the first direction, the picture elements being arranged in groups of N, where N is an integer greater than 1, the optical system comprising: a first parallax device having a plurality of parallax generating elements which extend in the second direction and each of which is aligned with N columns of picture elements; and a second parallax device having a plurality of parallax generating elements which extend in the second direction and each of which is aligned with a respective column of picture elements.

The display may comprise an observer tracker for determining the position of an observer, and an image controller responsive to the observer tracker for dividing the image displayed by the or each display device such that a window which contains a left eye of the observer receives left eye view data, a window which contains a right eye of the observer receives right eye view data, and, when an eye of the observer is in a region where adjacent windows overlap, one of the adjacent windows receives black view data.

In another embodiment, the display comprises an observer tracker for determining the position of an observer, and an image controller responsive to the observer tracker for dividing the image supplied to the windows in regions across a display surface such that: a left eye of the observer perceives only left eye image information; a right eye of the observer perceives only right eye image information; and, in areas where an observer eye receives light in two of the windows, one of the two windows is switched to black.

In order to provide an optimum lateral pitch of the windows, the at least one display device and the optical system may cooperate to form the windows with a lateral pitch substantially equal to 2e/N, where e is an average interocular separation and N is the number of windows per lobe.

It is thus possible to provide a display which tracks an observer laterally or laterally and longitudinally without requiring any moving parts. The display may make use of lenticular screens or front or rear parallax barriers. Three viewing windows per lobe may be used so as to minimise loss of resolution in 3D mode of the display. Alternatively, more than three windows may be used to improve certain aspects of display performance. Several observers can be independently tracked if desired, for instance by providing at least three windows per observer. In the case of pixelated devices, pixel boundaries no longer give rise to undesirable visual artifacts so that manufacturing tolerances can be relaxed. Further, the cross-talk performance of the display is improved compared with known displays. For instance, the amount of cross-talk seen by each eye is substantially the same and does not vary in a stepwise manner as the observer moves.

Where a liquid crystal device is used, the device may be manufactured using existing techniques and requiring only relatively little modification. For instance, it is possible to provide a suitable device merely by modifying the black mask of known types of LCDs.

BRIEF DESCRIPTION OF THE DRAWINGS

The invention will be further described, by way of example, with reference to the accompanying drawings, in which.

Like reference numerals refer to like parts throughout the drawings.

DETAILED DESCRIPTION OF THE PREFERRED EMBODIMENTS

Figure 13:
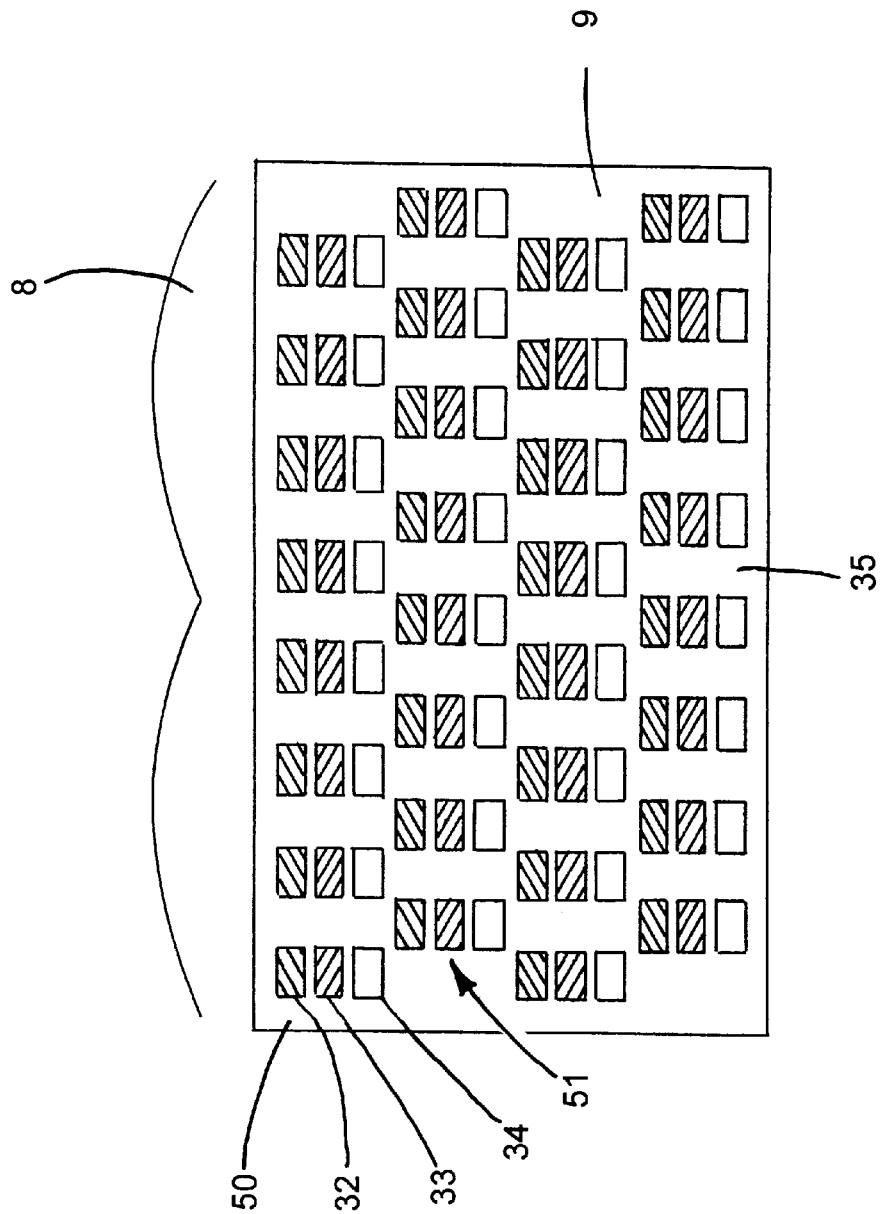
FIG. 13 illustrates another known type of directional display.
Figure 14:
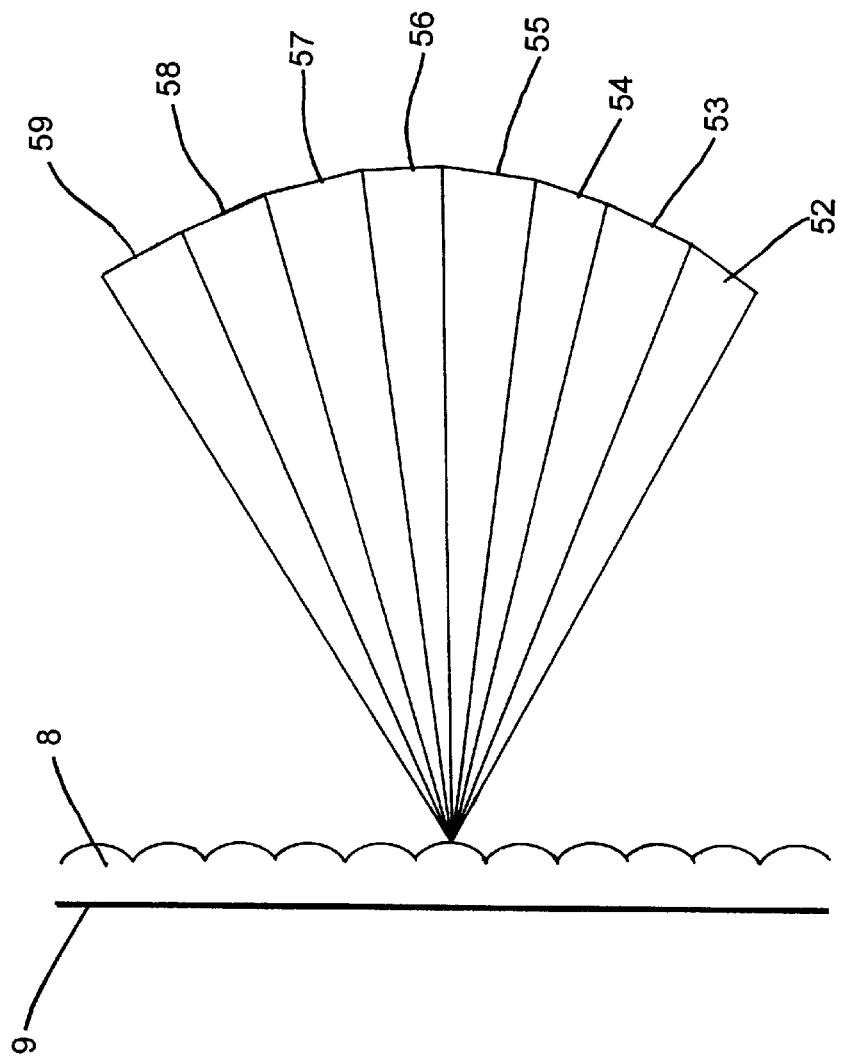
FIG. 14 illustrates the light output of the display of FIG. 13.
Figure 15:
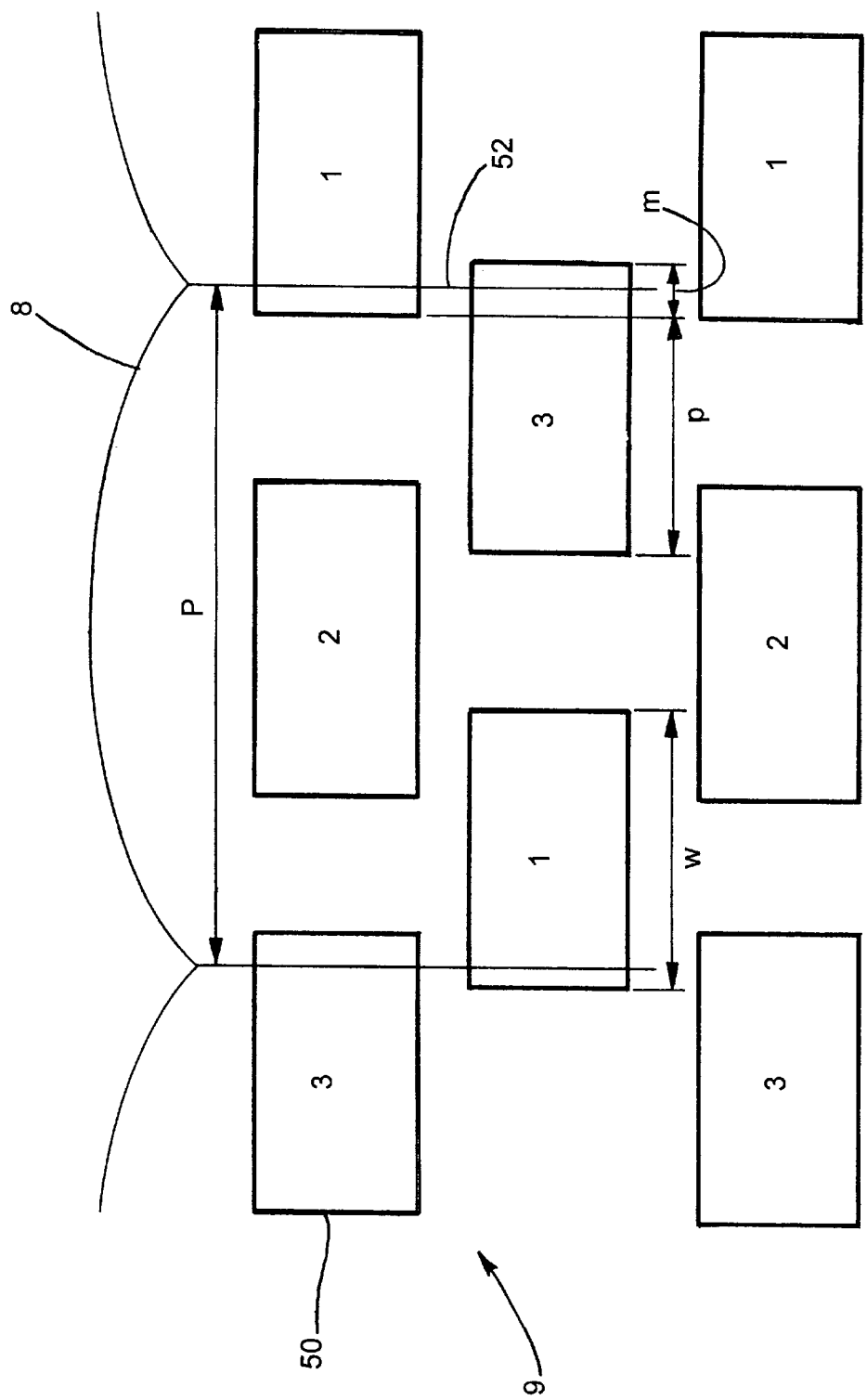
FIG. 15 illustrates a directional display constituting an embodiment of the invention.

FIG. 15 illustrates part of an LCD 9 which differs from the LCD shown in FIG. 13 in that the pixels 50 overlap in the horizontal direction. The pixels 50 are of rectangular shape with adjacent sides aligned in the row and column directions. The width w of each pixel is greater than the pitch p of the pixels in the horizontal or row direction so as to provide an overlap indicated at m between each adjacent pair of pixels.

A parallax device 8, which is illustrated as a lenticular screen but which may be any other suitable device such as a parallax barrier, has a pitch P which is substantially equal to an Integer multiple of the pitch p of the pixels. However, as described hereinbefore, for viewpoint corrected displays, the pitch P of the lenticular screen 8 is made slightly smaller than an integer multiple of the pitch p of the pixels 50.

3D displays illustrated in FIGS. 13 and 15 provided with rear illumination may be used in a reversionary 2D mode. The brightness of such displays in the 2D mode using the LCD of FIG. 15 will be greater than that of displays using the LCD of FIG. 13. However, the brightness of autostereoscopic modes will be the same if the pixels have the same vertical extent and the same vertical black mask width.

Displays of the type shown in FIG. 15 may be used in projection display systems. For instance, the output of a display may be projected onto the rear of a parallax barrier or lenticular screen. Alternatively, if several projectors are imaged onto a direction preserving screen, such as an autocollimating or a retro reflector, then overlapping windows can be produced by overlapping the projector lens apertures.

The display of FIG. 15 may be a colour display. For instance, colour filter arrangements of the type disclosed in EP 0 625 861 or in EP 0 752 610 may be used in the LCD of FIG. 15.

Figure 16:
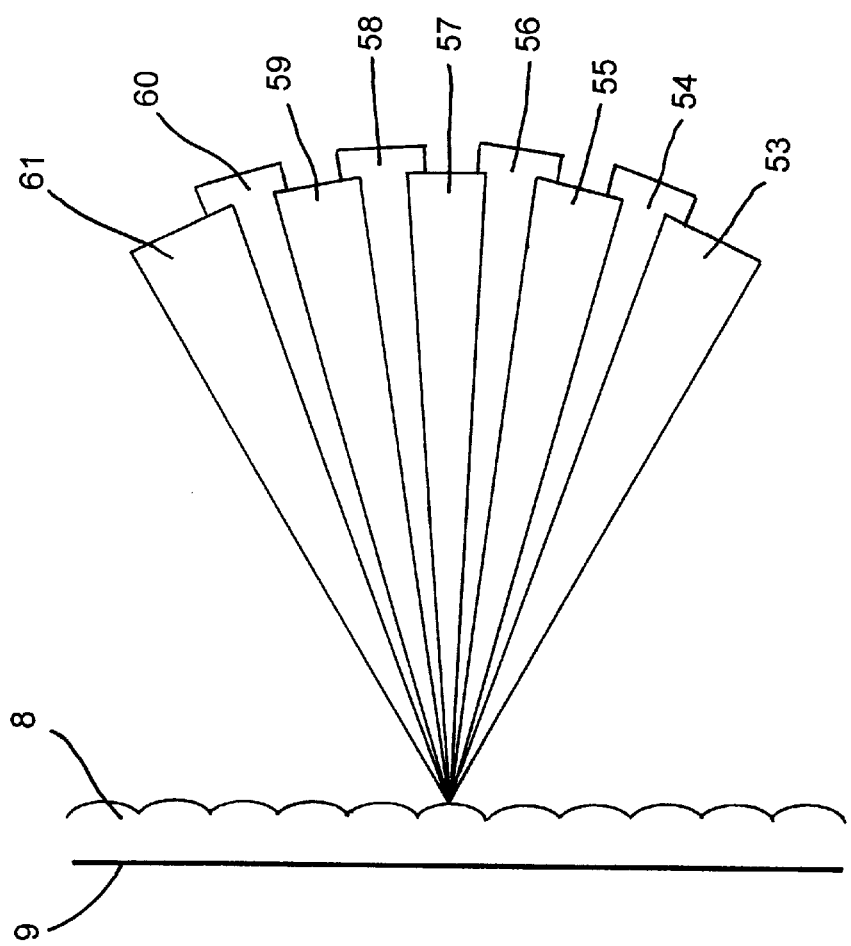
FIG. 16 illustrates the light output of the display of FIG. 15.

FIG. 16 illustrates the viewing zones produced by imaging the pixels 50 through one of the lenticules of the screen 8. The LCD 9 is suitably illuminated, for instance by a backlight, and the lenticule is shown as producing a fan-shaped set of nine viewing zones 53 to 61. Adjacent pairs of viewing zones, such as 53 and 54, have an angular overlap corresponding to the overlap region m of adjacent pixels. The LCD illustrated in FIGS. 15 and 16 is shown producing three viewing zones in each of three lobes. Thus, the pixels 50 disposed directly below the lenticule produce viewing zones 56 to 58 in the zeroth order lobe. The three pixels under an adjacent lenticule produce the viewing zones 53 to 55 in the +1 order lobe through the same lenticule, and the three pixels 50 under the adjacent lenticule on the other side produce the viewing zones 59 to 61 in the −1 order lube through the same lenticule.

Figure 17:
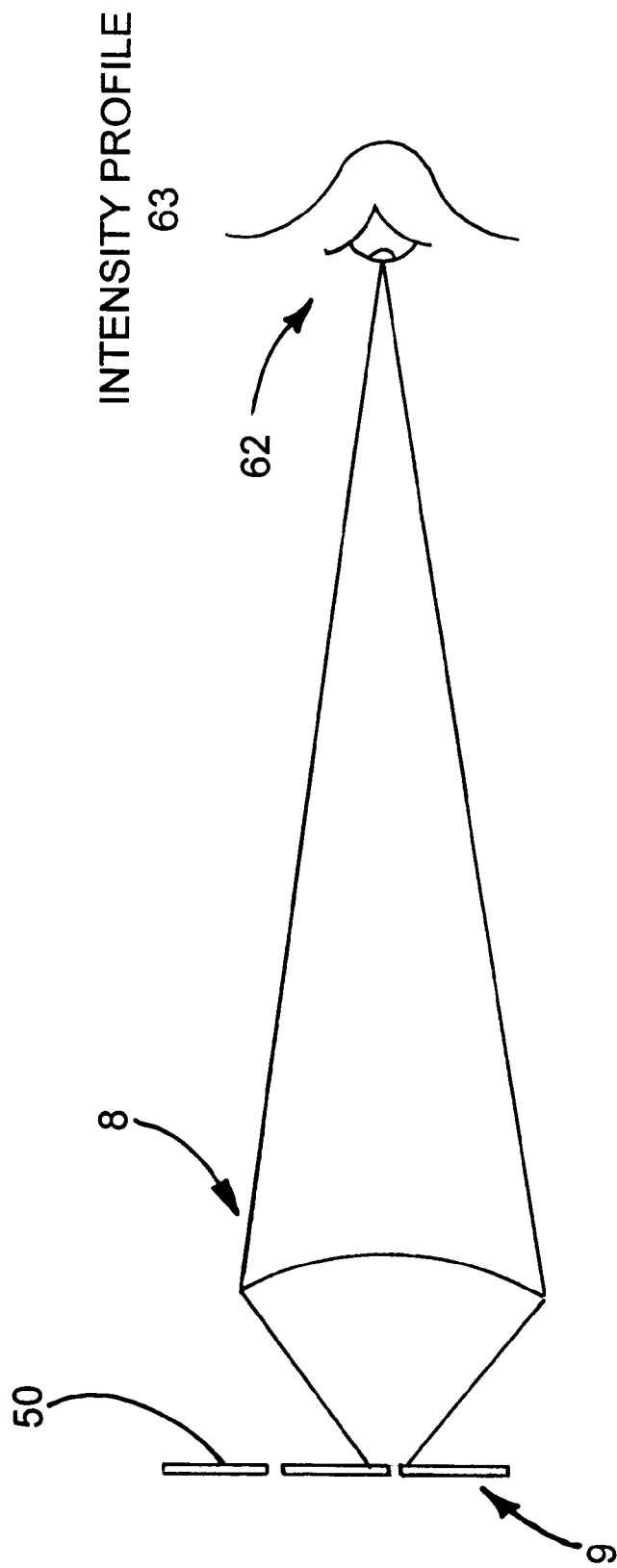
FIGS. 17 and 18 illustrate intensity variations produced by the display of FIG. 13.

FIG. 17 illustrates a visual artefact which may be produced by an LCD of the type shown in FIG. 13. Because of manufacturing tolerances, adjacent pixels 50 may not be exactly contiguous in the horizontal direction. FIG. 17 illustrates the case where there is an underlap i.e. a gap between adjacent pixels, caused by such tolerances. As shown by the ray paths from an observer eye 62, the lenticular screen 8 has an on-axis resolved spot size which, in practice, is a few micrometers. Manufacturing tolerances resulting in errors of the order of 1 micrometer in the contiguity of the pixels manifest themselves as changes in intensity of light from the lenticule as the image of the eye at the LCD pixel plane ("eye spot") crosses a boundary between adjacent pixels. This is illustrated for an underlap in FIG. 17 and the corresponding intensity profile of light intensity against eye position is shown at 63. As the eye 62 crosses the boundary between adjacent pixels, there is a reduction in intensity whereas an overlap between pixels would result in an increase in intensity. Such intensity variation can be reduced by improving manufacturing tolerances but this increases the cost and difficulty of manufacture.

Figure 18:
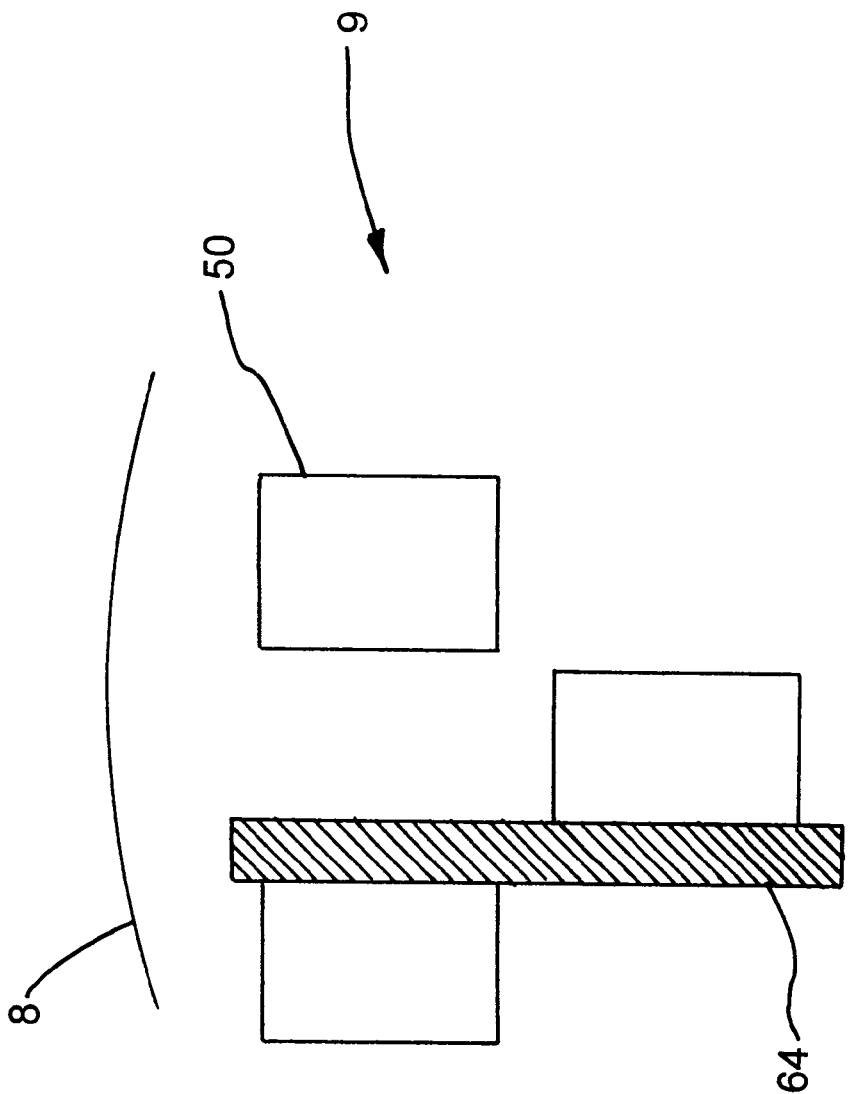

As shown in FIG. 18, the eye spot is imaged by a lenticular screen as a bar 64 of finite width. The light intensity is proportional to the area of overlap between the bar 64 and the pixels 50. Because of the underlap illustrated in FIG. 18, the area of overlap varies as the bar 64 crosses a boundary between adjacent pixels.

The LCD 9 of FIG. 15 overcomes this problem by providing the overlap regions m between adjacent pixels 50 and switching between the adjacent pixels when an observer eye is in the region of overlap between adjacent viewing zones. By ensuring that the overlap regions m are wider than the eye spot and by ensuring that switching between pixels occurs when the eye spot is wholly within the overlap regions, visual artifacts resulting from intensity changes or variations can be substantially eliminated or rendered invisible provided tho adjacent pixels have the same intensity performance. Any small intensity changes caused by intensity mismatch between adjacent pixels may be rendered substantially invisible by cross fading between the adjacent pixels so that visual artifacts are reduced or substantially eliminated. Further, this is achieved with substantially relaxed manufacturing tolerance requirements since it is merely necessary to ensure that a sufficiently wide overlap region m between adjacent pixels is provided.

In the manufacture of the black mask in a liquid crystal display, it is difficult to produce very sharp corners in any aperture. Hence the corners of a substantially rectangular pixel have a certain radius of curvature associated with them. This will lead to a slight darkening of the window at the edge due to loss in vertical aperture. In the display of FIG. 15, any visual artefact this darkening may cause is avoided as the viewer does not cross the edge of a window during normal tracking operation.

Figure 19:
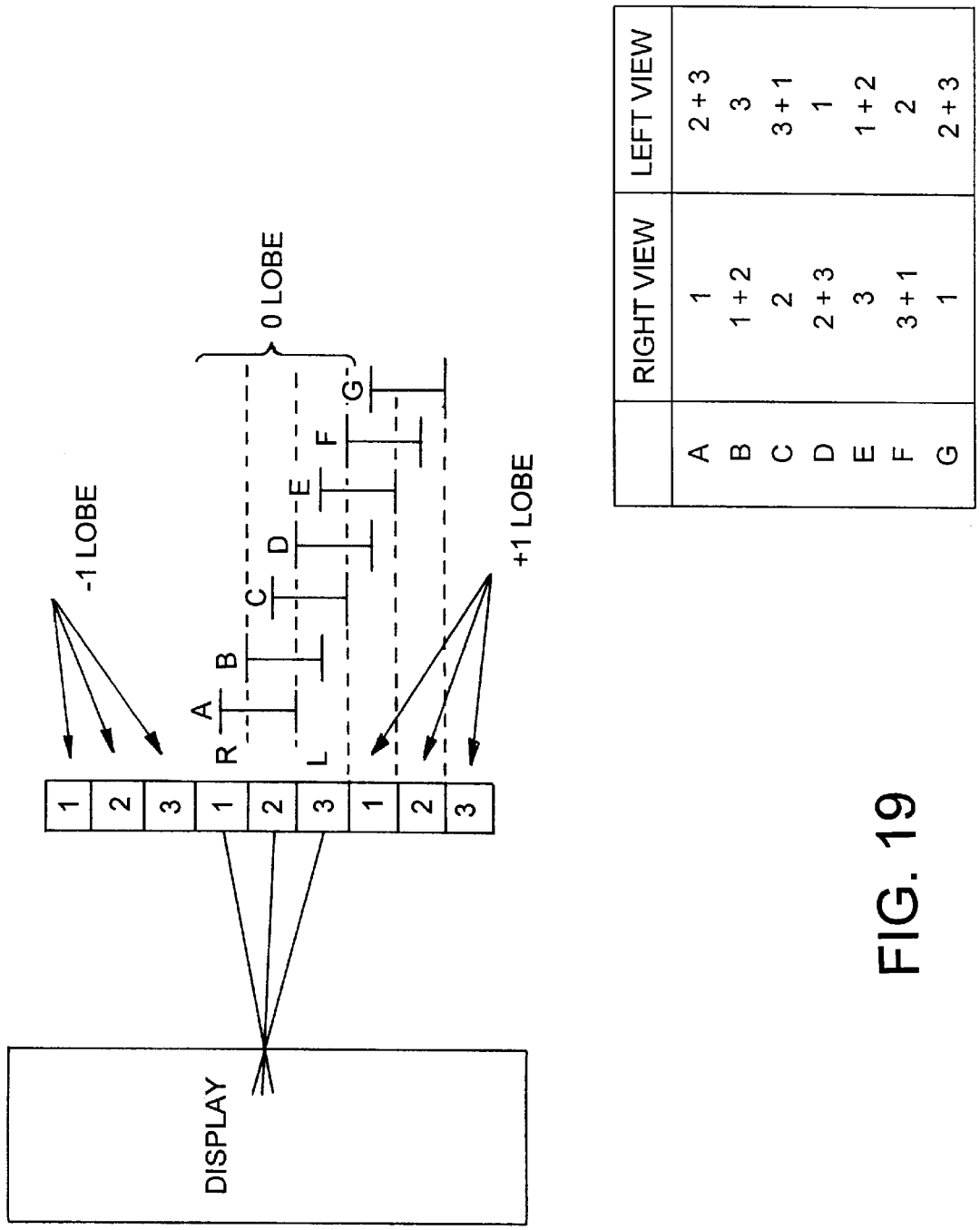
FIG. 19 illustrates a known type of autostereoscopic display for performing observer tracking.

FIG. 19 schematically illustrates an autostereoscopic display of the type disclosed in EP 0726482 comprising the lenticular display illustrated in FIG. 13. Image data are presented to the display device so as to generate a number of viewing zones, each of which corresponds to a different view. Zones corresponding to the same view converge at a designed position so as to form a viewpoint corrected zone at which the observer can observe the autostereoscopic effect. The widest part of each viewpoint corrected zone defines a "window". The "window" occurs at a predetermined distance from the display device.

The windows are contiguous with one another and hence define a laterally extended viewing region at which the autostereoscopic effect can be observed provided that the image displayed in each window is updated in accordance with the observer's position. The three windows are labelled 1, 2 and 3 and are imaged into three lobes labelled −1, 0 and +1. For the "three window" display illustrated, each window has a lateral extent of two-thirds of the average interocular separation of the observer group. The display is arranged such that each window displays either left view data or right view data. The left and right views are not mixed within a window.

With an observer at position A of FIG. 19, the observer's right eye R is within the first window 1 of the zeroth lobe and the observer's left eye is at the boundary of the second and third windows 2 and 3 of the zeroth lobe. The positions A to G show the lateral position of the observer, but the longitudinal position is always at the nominal viewing distance. In order to provide an autostereoscopic view, the first windows 1 are controlled (via the first display) to show right view data and the second and third windows are controlled (via the second and third displays) to show left view data. As the observer moves from position A to position B, the observer's right eye moves towards the boundary between the first and second windows of the zeroth lobe. Similarly the observer's left eye moves away from the boundary between the second and third windows of the zeroth lobe. The result is that the second window 2 becomes un-observed and the image data displayed thereby can be updated from left view data to right view data in anticipation of the observer arriving at position B. Once the observer is at position B, the observer's right eye is at the boundary between the first and second windows 1 and 2 of the zeroth lobe—both of which show right view data—whereas the observer's left eye is at the centre of the third window which shows left view data.

As the observer moves from position B to position C, the first window 1 of the +1 lobe is updated to show left view data in anticipation of the observer's left eye being at a position where the first window of the +1 lobe can be observed.

Figure 20:
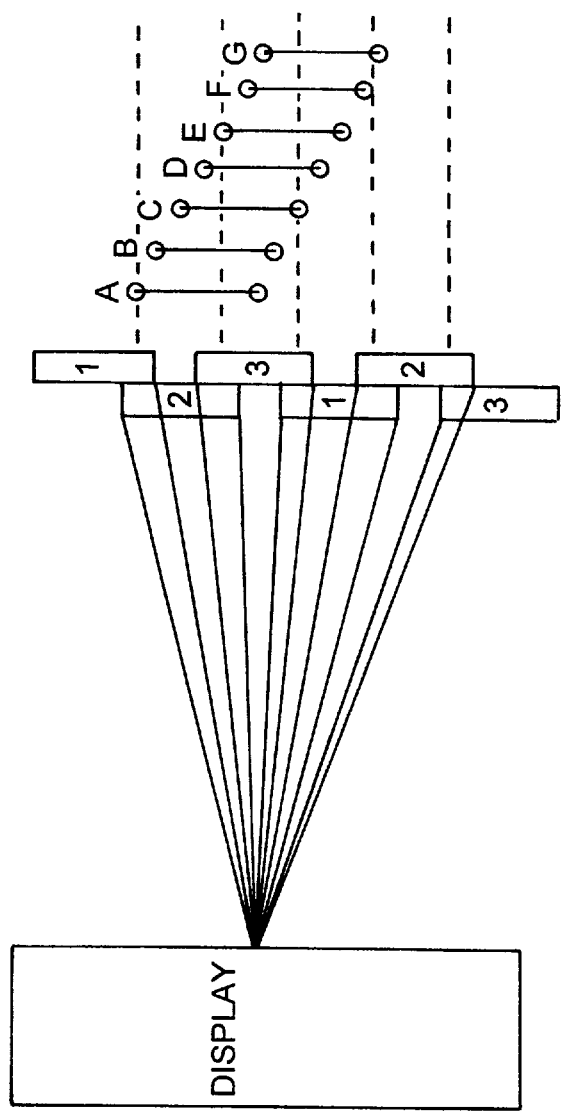
FIG. 20 illustrates an autostereoscopic display constituting an embodiment of the invention for performing lateral observer tracking.

FIG. 20 schematically illustrates an autostereoscopic display comprising the LCD and lenticular screen shown in FIG. 15. The display 15 is shown producing three viewing windows (labelled 1 to 3) repeated in two lobes. Different lateral positions of an observer are illustrated at A to G representing lateral positions in the plane of the windows. The table indicates the image data displayed in the three windows for the observer positions. An observer tracking system determines the position of the observer and controls the image data supplied to three image displays. With the lenticular display arrangement shown in FIG. 15, the pixels are labelled 1 to 3 so as to indicate which image display they constitute. In this type of display, the images are spatially multiplexed as interleaved image strips formed by columns of pixels with three columns of pixels located below each lenticule of the screen 8.

With the observer at the position A, the left eye is located in the window 3 so that left view data are displayed by the pixels constituting the third image display. The right eye is in the overlap region of windows 1 and 2. As the observer moves to the left, right eye view data which was displayed in the window 1 is switched to the window 2 and the pixels supplying the window 1 are switched to black. Thus, at position B, right and left image view data are displayed in the windows 2 and 3, respectively.

As the observer moves through the position C, the right eye remains in the window 2 which therefore continues to display the right image view data. However, the left eye moves into the overlap region between the window 3 and the window 1 in the adjacent lobe. Thus, the left image view data are supplied to the pixels forming the window 1 and the pixels forming the window 3 are switched to black so as to display no image. Accordingly, as described hereinbefore, visual artifacts caused by intensity variations as the observer moves are substantially reduced or eliminated compared with displays of the contiguous type illustrated in FIG. 13.

Figure 21:
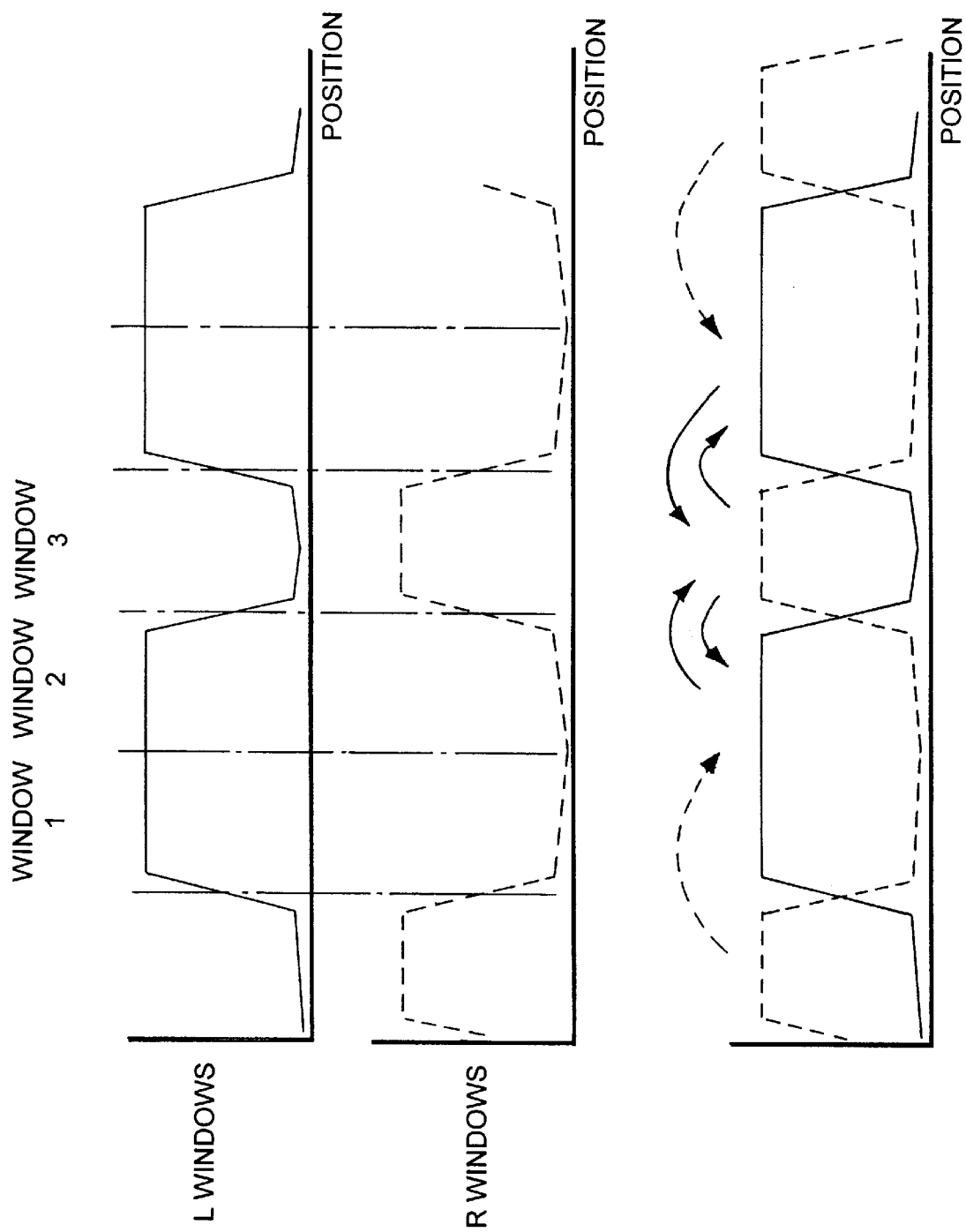
FIG. 21 illustrates cross talk effects produced in a display of the type shown in FIG. 19.

Operation of the display shown in FIG. 13 to perform lateral tracking is described in EP 0 726 482 and differs from the operation described with reference to FIG. 20 in that, at any one time, two adjacent windows are showing one view and the third window is showing the other view of a stereoscopic pair. This gives rise to the cross-talk performance illustrated in FIG. 21. The upper diagram of FIG. 21 illustrates intensity against position where windows 1 and 2 are displaying left image data. The middle diagram illustrates window 3 displaying right image data. Light from the windows spills into the adjacent windows on either side, as indicated in the bottom diagram of FIG. 21. However, because two windows are displaying the left view whereas one window is displaying the right view, there will be greater spillage of light from windows 1 and 2 into window 3 than from window 3 into windows 1 and 2. Accordingly, the right view will contain more cross-talk than the left view.

As the observer moves, this situation is reversed so that higher cross-talk will occur in the left view. The result is that some image flicker artifact will be visible as the observer moves.

Figure 22:
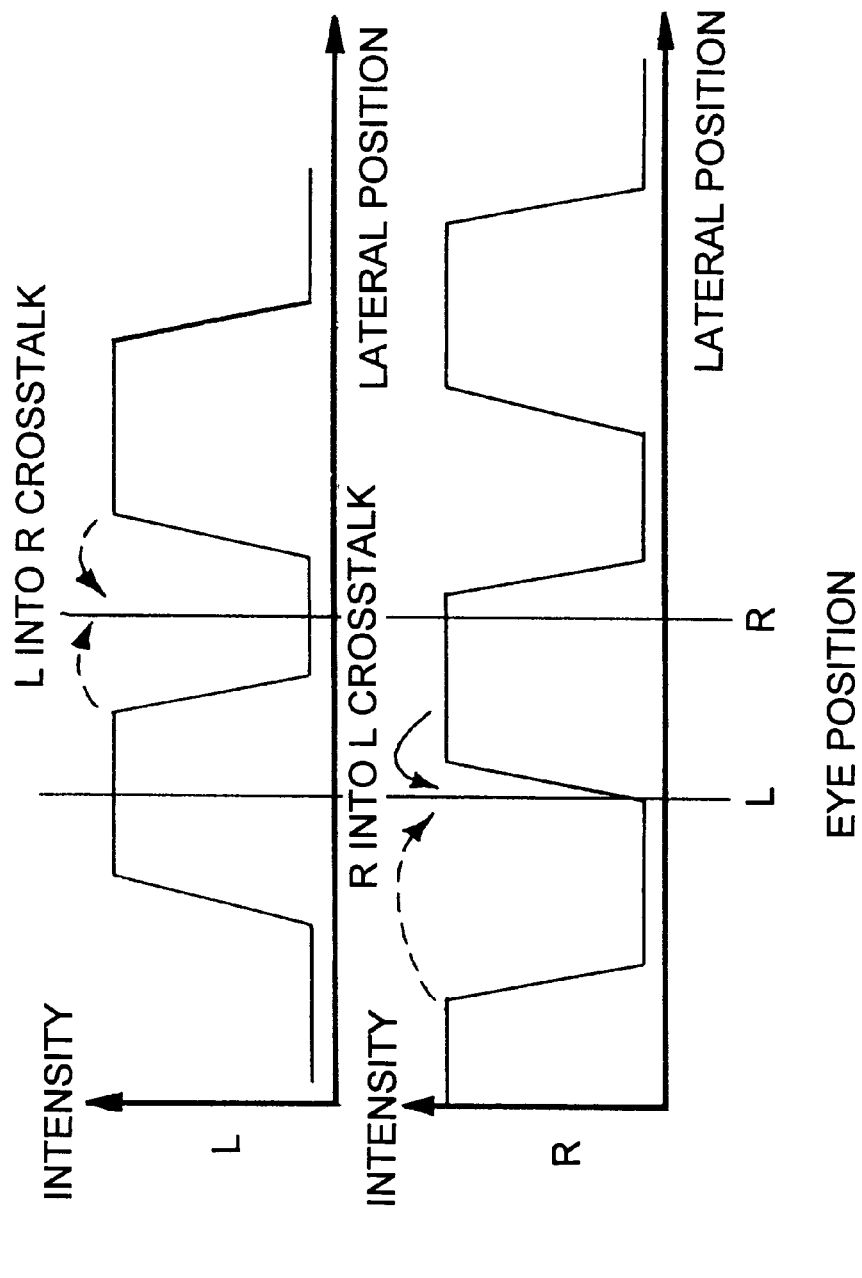
FIGS. 22 and 23 illustrate cross talk performance of the display of FIG. 20.
Figure 23:
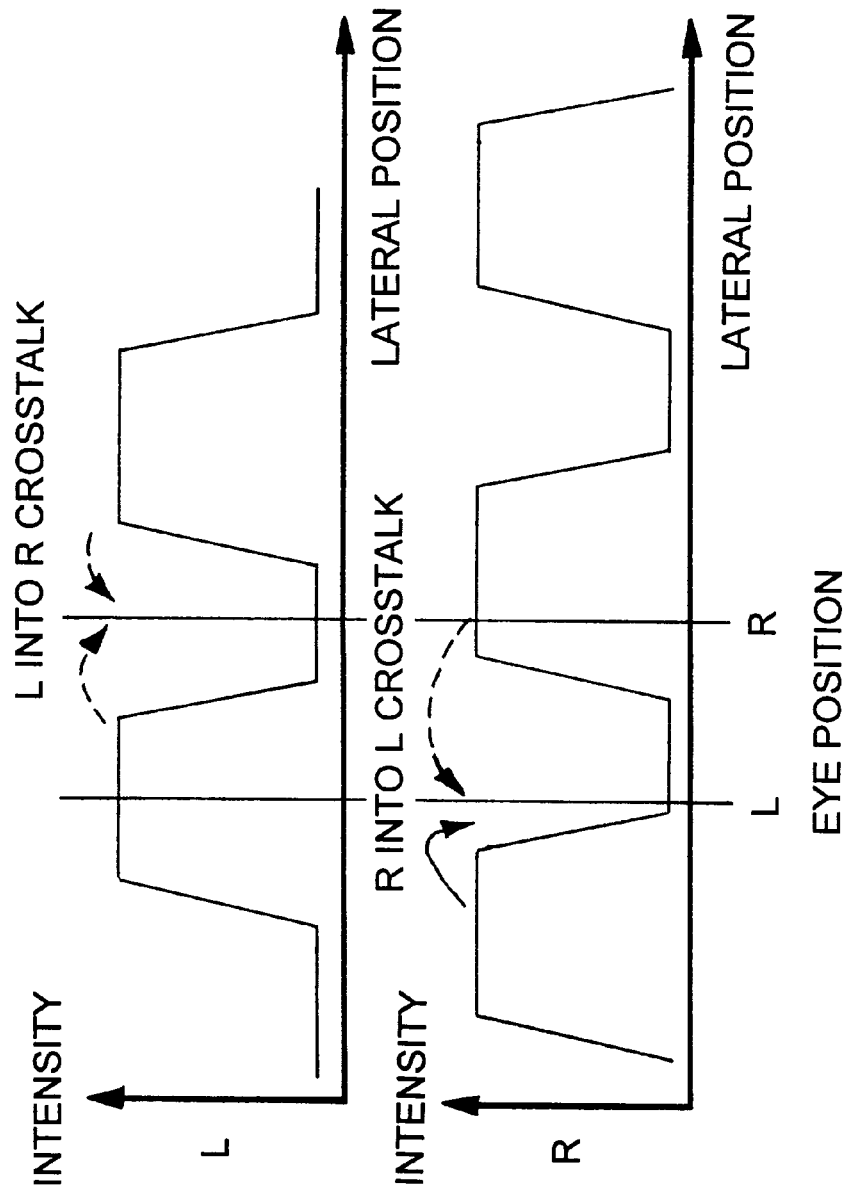

FIGS. 22 and 23 illustrates the effects of cross-talk between left and right views for the display illustrated in FIG. 20 with FIG. 22 showing cross-talk immediately before image data are switched and FIG. 23 illustrating cross-talk immediately thereafter. In this display, only one window per view is illuminated at any one time so that the amount of cross-talk is substantially the same for both the left and right views. Accordingly, image flicker artifacts caused by variations in cross-talk are substantially eliminated.

Figure 24:
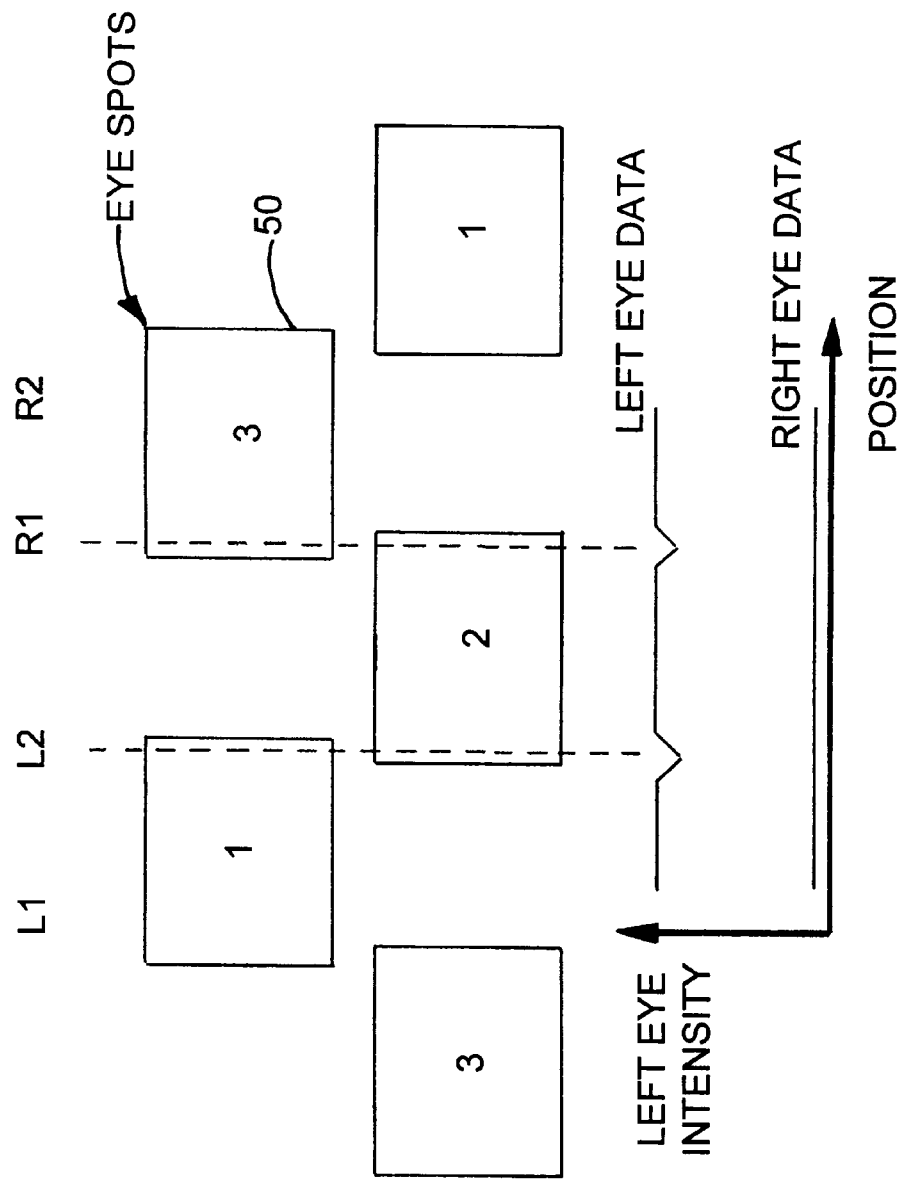
FIGS. 24 and 25 illustrate the effects on intensity fluctuations and cross talk of varying the overlap of adjacent pixels of the display of FIG. 20.

The optimal overlap of adjacent windows, and hence of adjacent pixels, is a compromise between crosstalk and aberrational performance of the display. FIG. 24 illustrates the eye spots which are produced as vertical bars by a lenticular screen or parallax barrier. The eye spots L1 and R1 show the eye spot positions for an observer at a first position whereas the eye spots L2 and R2 correspond to an observer at a different second position. The eye spots are shown as being wider than the regions of overlap between adjacent pixels. In this case, the observer sees an intensity change as the eyes move over the overlap regions as illustrated diagrammatically in the graph forming part of FIG. 24. Further, the width of the eye spots grows as the observer moves off the axis of the display. Accordingly, this flicker artifact will increase as the observer moves away from the central position and this will limit the acceptable viewing freedom with respect to the display. On the other hand, the "active" windows will be spaced further apart so that there will be reduced cross-talk between views.

Figure 25:
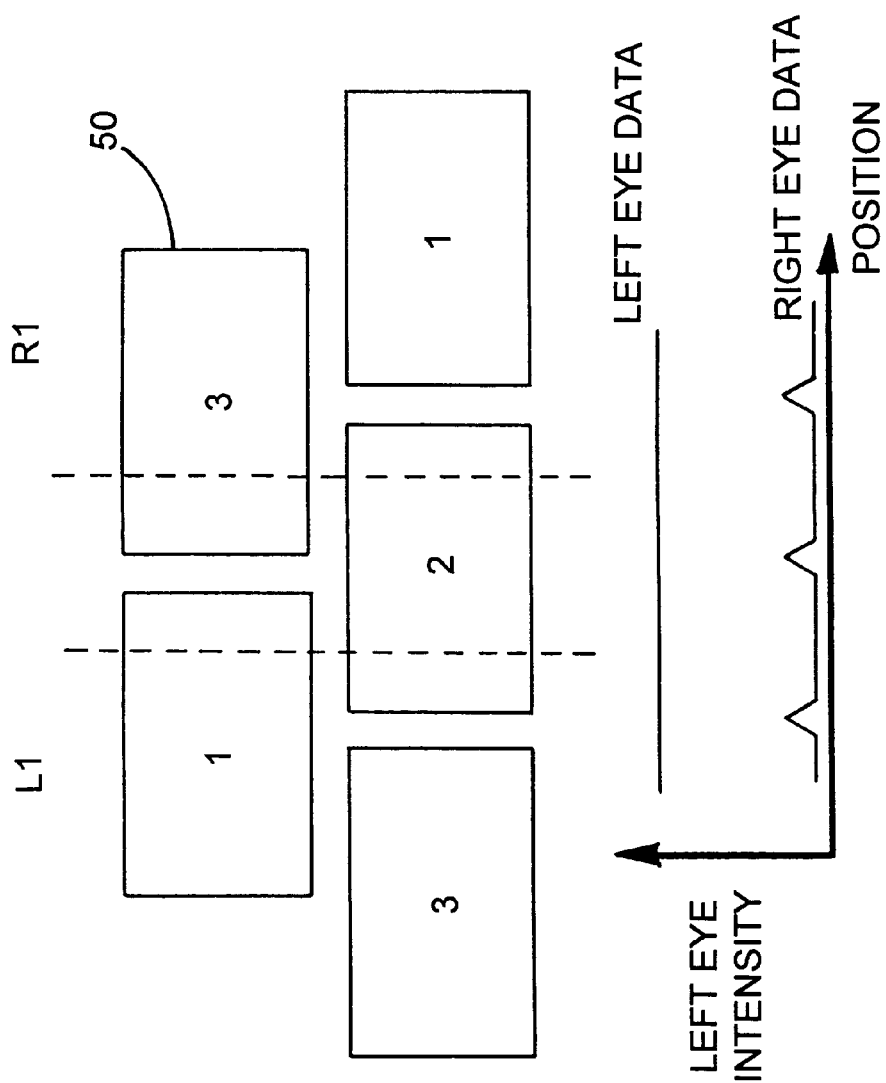

FIG. 25 illustrates the situation where there is a relatively large overlap between adjacent pixels 50. Although intensity fluctuations are substantially reduced or eliminated because the width of each eye spot is substantially less than the width of the overlap region between adjacent pixels, the active windows displaying left and right image view data are now much closer together. Accordingly, there will be substantially increased light spillage between active windows leading to greater cross-talk. If the width of the eye spot is smaller than the gap between adjacent pixels, minimal cross-talk will be seen. As the eye spot grows, for instance as a result of aberrational effects away from the axis of the display, the amount of visible cross-talk will increase. This may give rise to intensity fluctuations as the observer moves, thus resulting in another flicker type artifact. The width of the overlap regions between adjacent pixels is thus chosen to provide an acceptable compromise between intensity fluctuations and cross-talk fluctuations.

By providing a display of the type shown in FIG. 15 with four columns of pixels 50 below each lenticule of the lenticular screen 8, it is possible to provide a display which produces four viewing windows in each lobe. Such an arrangement is much more immune to the error mechanism described hereinbefore because the eye spots do not need to cover the same view pixels at any position. This may be achieved by arranging for the viewing windows to be located such that switching of view data occurs substantially simultaneously for the left and right image view data. Overlap regions between adjacent pixels may be made relatively large so as to avoid the intensity variations illustrated in FIG. 24 whereas alternate windows are always switched to black so that there is no variation in cross-talk performance as an observer moves laterally with respect to the display.

Figure 26:
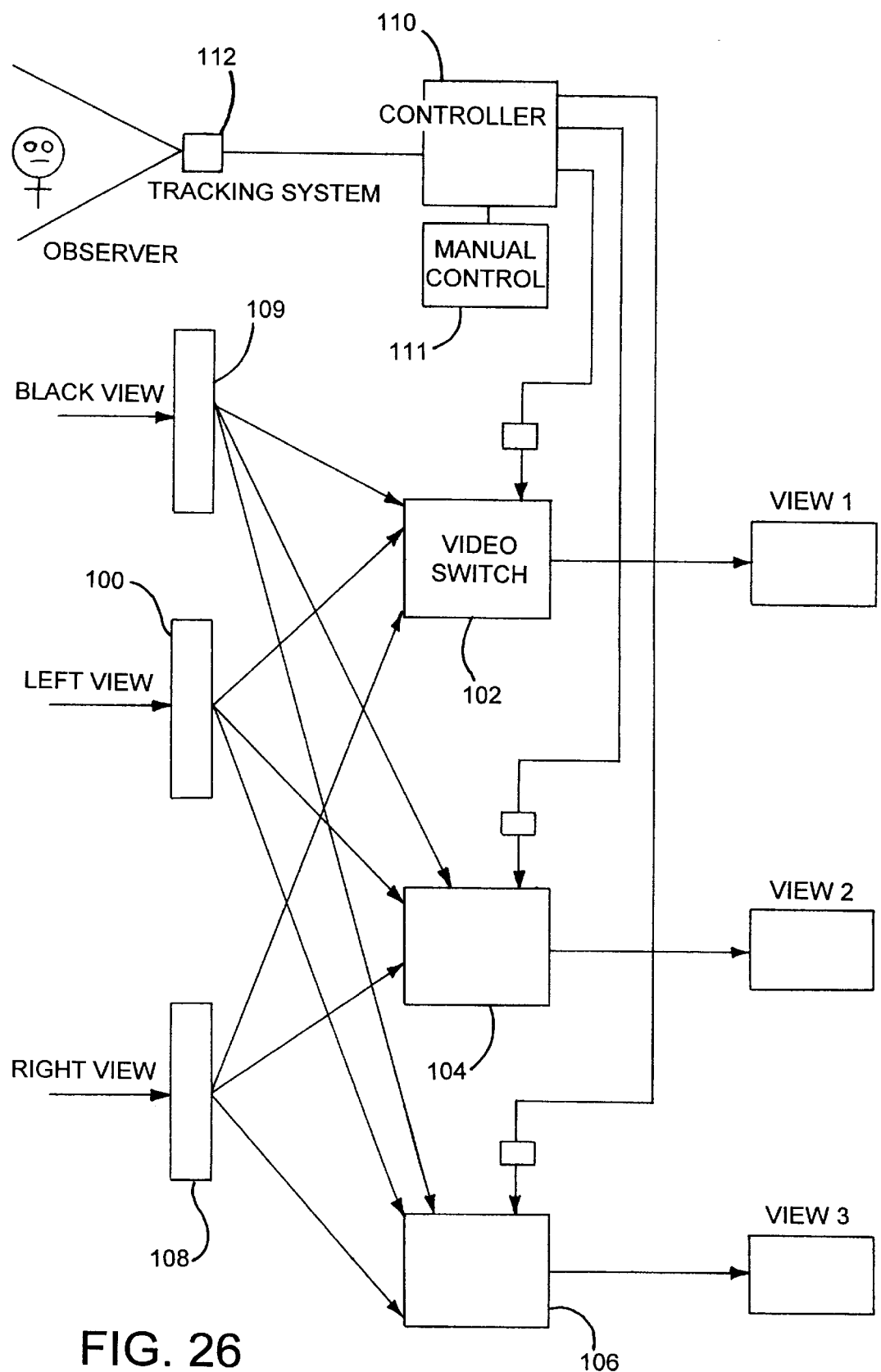
FIG. 26 illustrates a control system for controlling the display shown in FIG. 20.

FIG. 26 schematically illustrates a video multiplexing system for controlling the views displayed by the image displays. Although three or more windows are provided, only left and right eye view information is required. Left eye view information is provided via a buffer 100 to left view inputs of first, second and third video switches 102, 104 and 106. Right eye view information is provided via a buffer 108 to right eye inputs of the first, second and third video switches. Black view information is provided via a buffer 109 to black inputs of the first, second and third video switches. Each video switch is responsible for selecting the video view to be provided to one of the three image displays for display at one of the windows. Each video switch may control a respective display device or may be arranged to drive a single display in a multiplexed fashion.

Each video switch receives a control input from a controller 110 which selects whether the left, right or black view data should be displayed. The controller 110 is responsive to a tracking system 112 which determines the position of an observer. From a knowledge of the observer position and the parameters of the display, the controller selects appropriate views and instructs the video switches to display the relevant left or right views or to be black. Alternatively, the controller 110 may be responsive to a manual control 111 which is manually operated by an observer so as to provide manual observer tracking.

Figure 27:
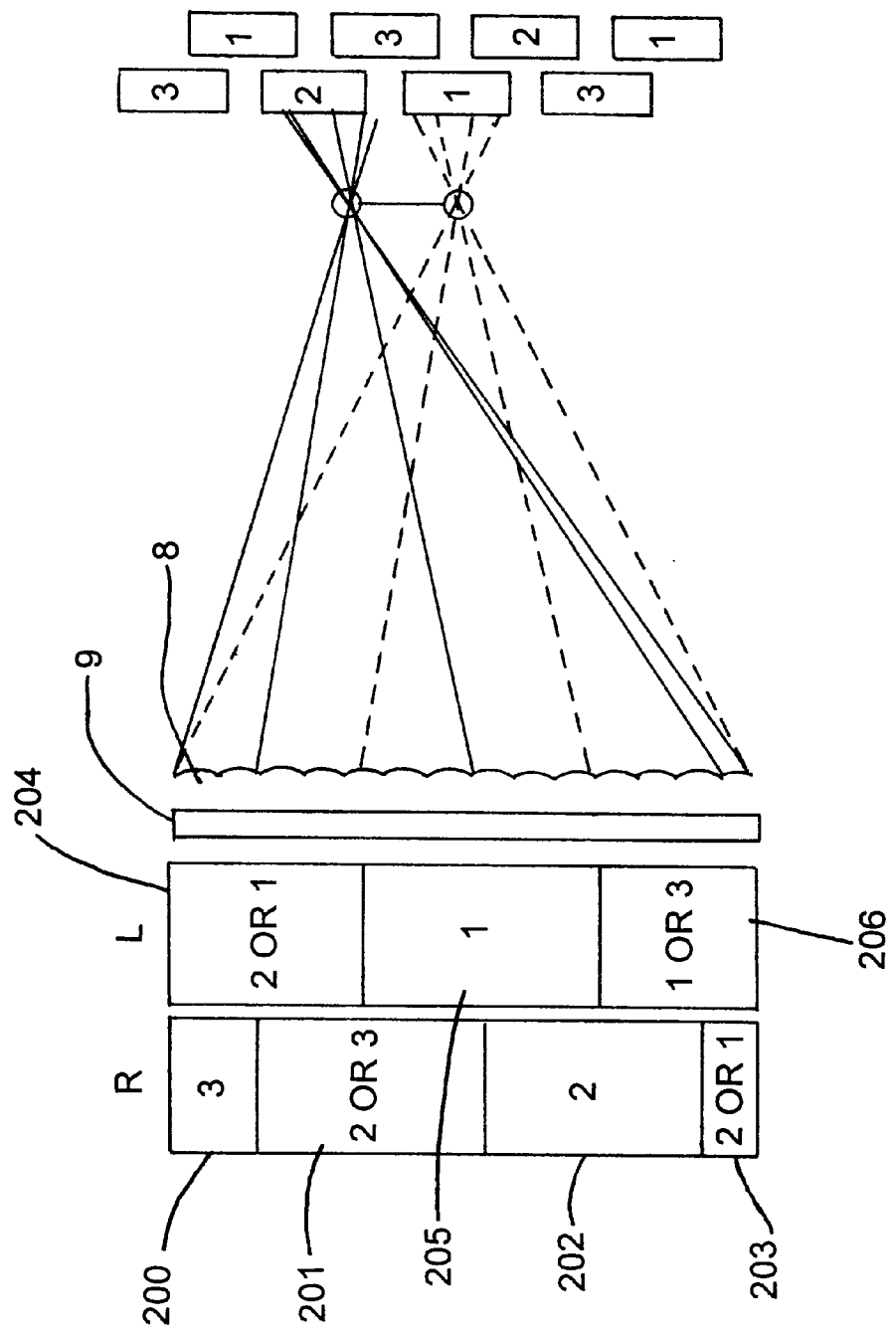
FIG. 27 illustrates an autostereoscopic display and the effects of movement of an observer from a designed viewing distance.

FIG. 27 schematically illustrates an autostereoscopic display for providing lateral and longitudinal observer tracking using the LCD 9 and the lenticular screen 8 shown in FIG. 15. The ray path from the display to the observer who is located nearer the display than the design position i.e. between the display and the windows, is shown. The images seen by the observer can be calculated by tracing back the rays from the window boundaries through each of the observer eyes to the display. Thus, the right eye will see the image in window 3 in a region 200 of the display, the windows 2 and 3 in a region 201 of the display, the image in the window 2 in a region 202, and the images in the windows 1 and 2 in a region 203. The left eye will see images in the windows 1 and 2 in a region 204, the image in the window 1 in a region 205, and the images in the windows 1 and 2 in a region 206 of the display.

Figure 28:
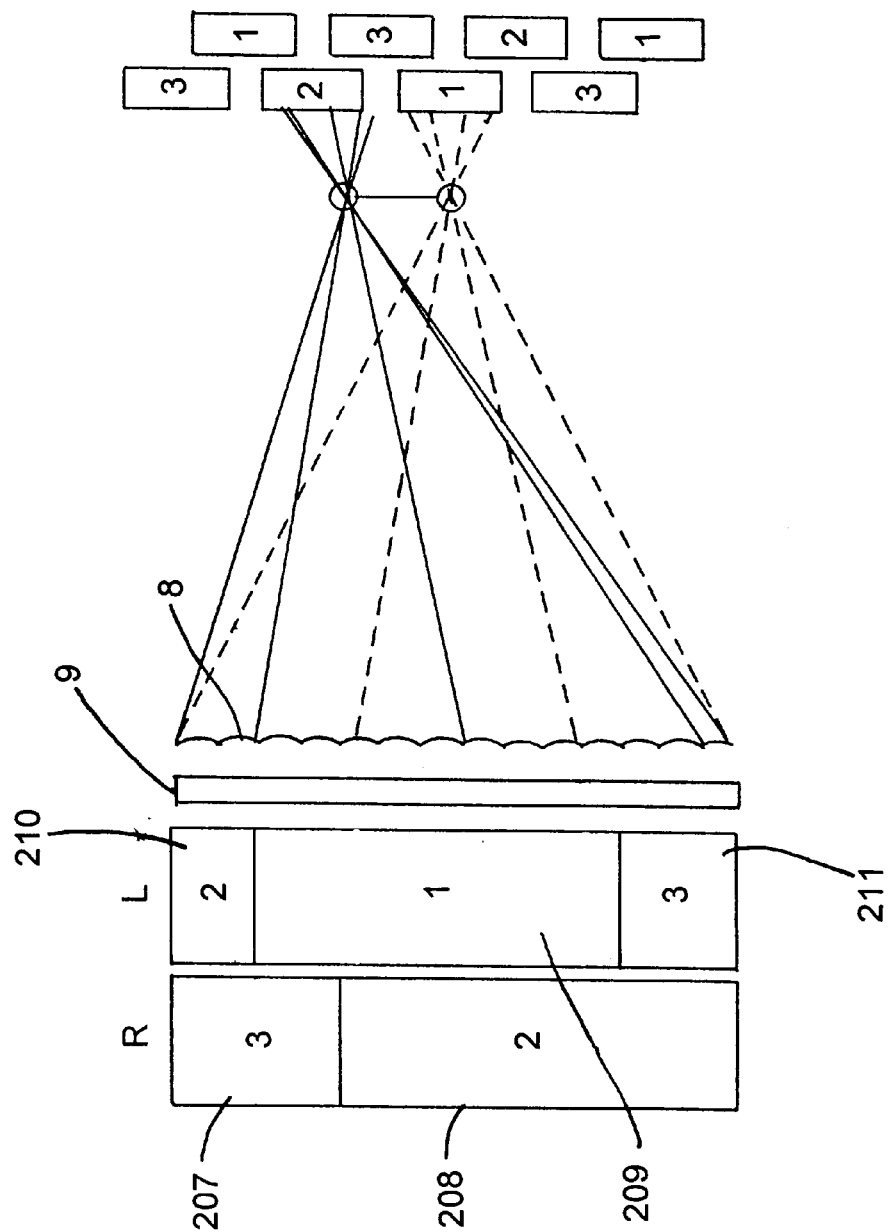
FIG. 28 illustrates the display shown in FIG. 27 operated so as to perform longitudinal observer tracking.

FIG. 28 shows a possible choice for the image content of the windows so as to preserve autostereoscopic image viewing. Right eye information is displayed in the windows 3 and 2 in regions 207 and 208 of the display. Left eye information is displayed in the window 1 of a region 209, in the window 2 of a region 210, and in the window 3 of a region 211 of the display. Thus, the information displayed by the pixels forming the windows 1 to 3 is sliced so that the left eye sees only left eye information and the right eye sees only right eye information. Such image slicing is disclosed in EP 0 721 131.

Similar analysis and control of the display may be used to ensure autostereoscopic viewing when the observer is located further away from the display such that the viewing windows are between the display and the observer. It is thus possible to extend laterally and longitudinally the viewing region within which the observer perceives a 3D image.

For three windows per lobe, the display is arranged such that the average interocular separation of the observer is substantially equal to one and a half times the pitch of the windows at the optimum viewing distance. (In fact a general expression for N windows per lobe is Wp=2e/N, where Wp is the window pitch and e is the average interocular separation of the user group). This corresponds to the eye spot separation at the plane of the pixels being substantially equal to one and a half times the pixel pitch p. As the observer moves towards and away from the display, the separation of the eye spots will increase and decrease, respectively. The maximum permissible separation between the spots while permitting autostereoscopic viewing is 2 p and the minimum separation is p. The maximum and minimum viewing distances for a lenticular type of display may be calculated as follows.

In the case of a display with three windows, for a nominally focused lenticular screen of thickness t and refractive index n and for an observer interlocular separation e, the nominal viewing distance $z_{nom}$, corresponding to the positions of the windows, is given by:

$z_{nom}=et/(1.5\ np)$

The maximum and minimum viewing distances are given by:

$z_{min}=et/(2\ np)$ $z_{max}=et/(np)$

For a display with N windows, the nominal maximum and minimum viewing distances are given by:

$Z_{nom}=(2*e*t)/(n*N*p)$ $z_{min}=z_{nom}(1-(N-2)/(2(N-1)))$ $z_{max}=z_{nom}(1+(N-2)/2)$ Thus, as the number of viewing windows is increased, longitudinal viewing freedom is enhanced. The use of more windows will also enhance lateral viewing freedom in real displays because the eye spot switch points are further from the pixel boundaries so that the effects of aberrations on image quality at the switch points is reduced.

Figure 29:
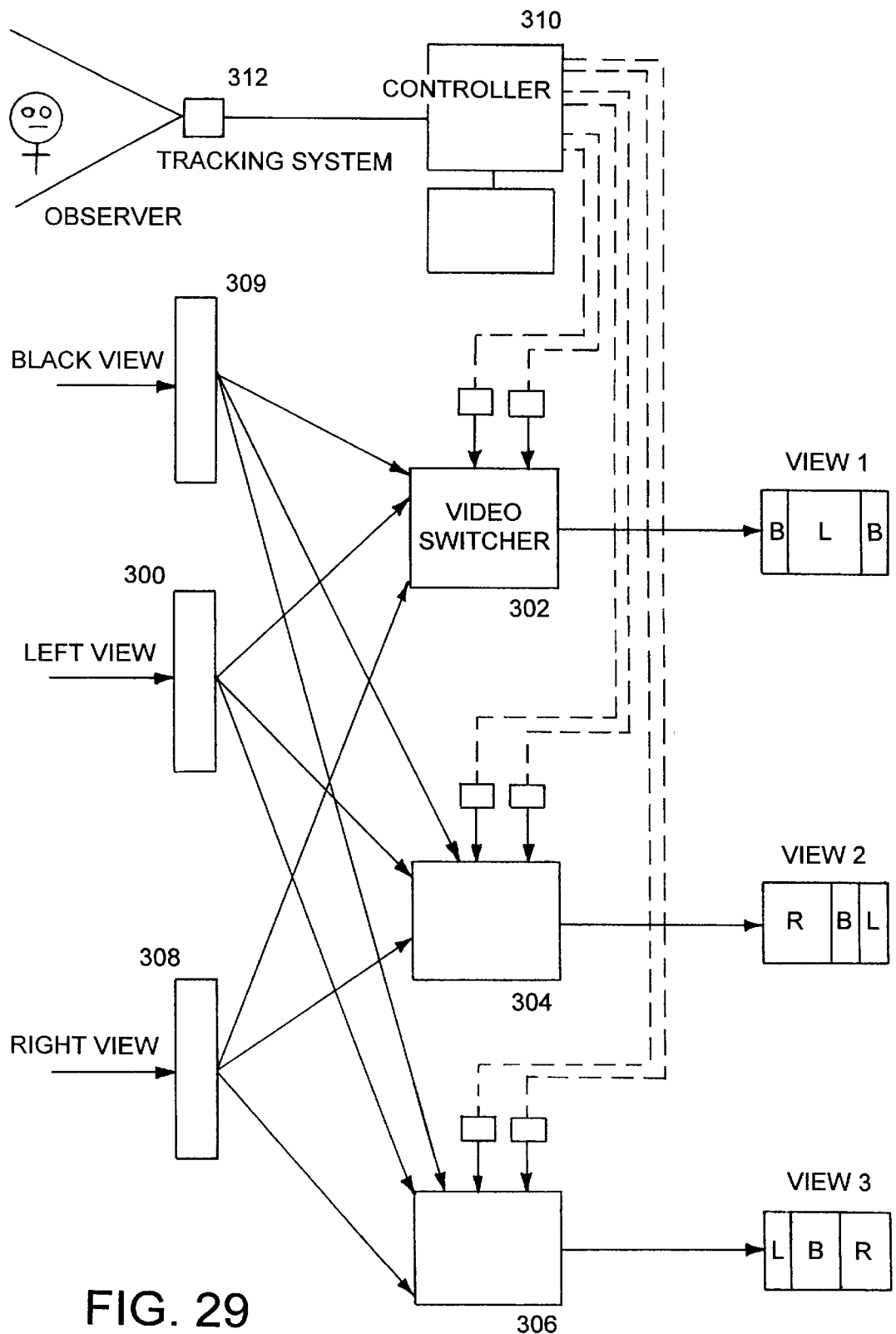
FIG. 29 illustrates control a system for the display of FIG. 28.

FIG. 29 schematically illustrates a video multiplexing system for the production of sliced video images. Although three or more windows are provided, only left and right eye view information is required. Left eye view information is provided via a buffer 300 to left view inputs of first, second and third video switches 302, 304 and 306. Right eye view information is provided via a buffer 308 to right eye inputs of the first, second and third video switches. Black view information is provided via a buffer 309 to black inputs of the first, second and third video switches. Each video switch is responsible for generating the video view to be provided to one of the image displays for generation of a view within one of the windows. Each video switch may control a respective display device or may be arranged to drive a single display in a multiplexed fashion as shown in FIG. 27.

Each video switch receives two control inputs from a controller 310 which selects whether the left, right or black view data should be displayed over a given part of the video output. The controller 310 is responsive to a tracking system 312 which determines the position of an observer. From a knowledge of the observer position and the parameters of the display, the controller selects appropriate views and instructs the video switches to display the relevant parts of the left and right views and black. For instance, the view displays shown in FIG. 29 correspond to the image data required for operation as illustrated in FIG. 28.

Figure 30:
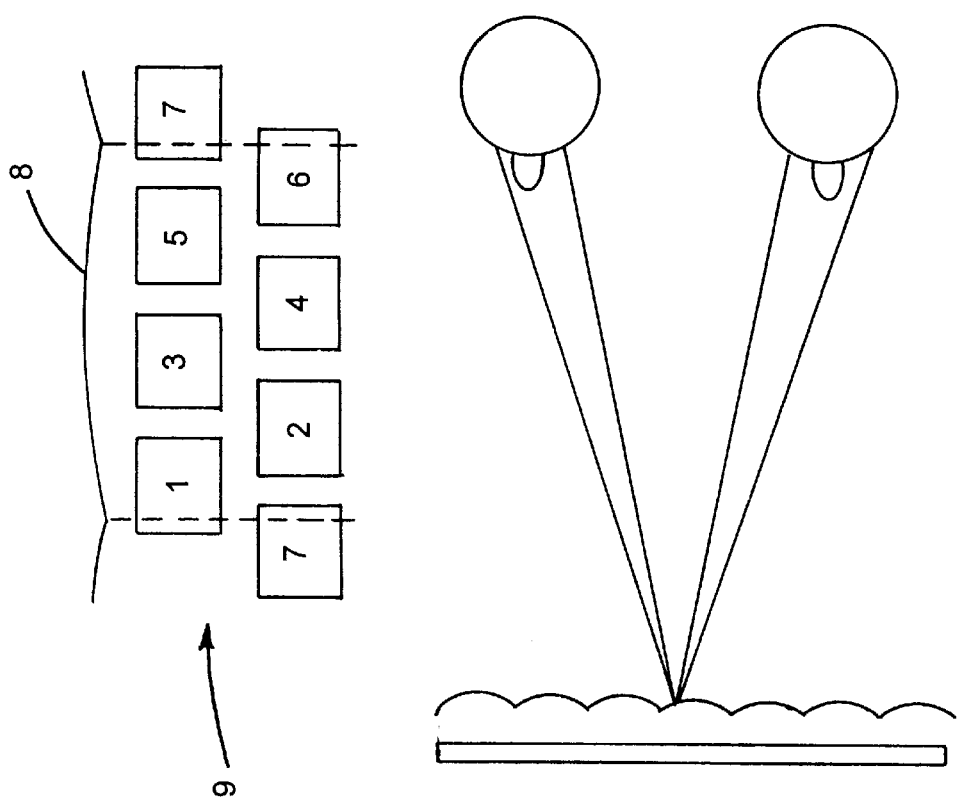
FIG. 30 illustrates a display of the type shown in FIG. 15 for multiple observer tracking.

The display may be arranged to track more than one observer and to provide each observer with a 3D image within an extended viewing range. For instance, FIG. 30 illustrates diagrammatically a display which is capable of tracking two observers. The LCD comprises seven sets of pixels arranged as columns of overlapping pixels disposed under each lenticule of the lenticular screen. The display thus provides seven overlapping windows which may be repeated in adjacent lobes and allows the two observers to be tracked simultaneously and to perceive a 3D image.

Figure 31:
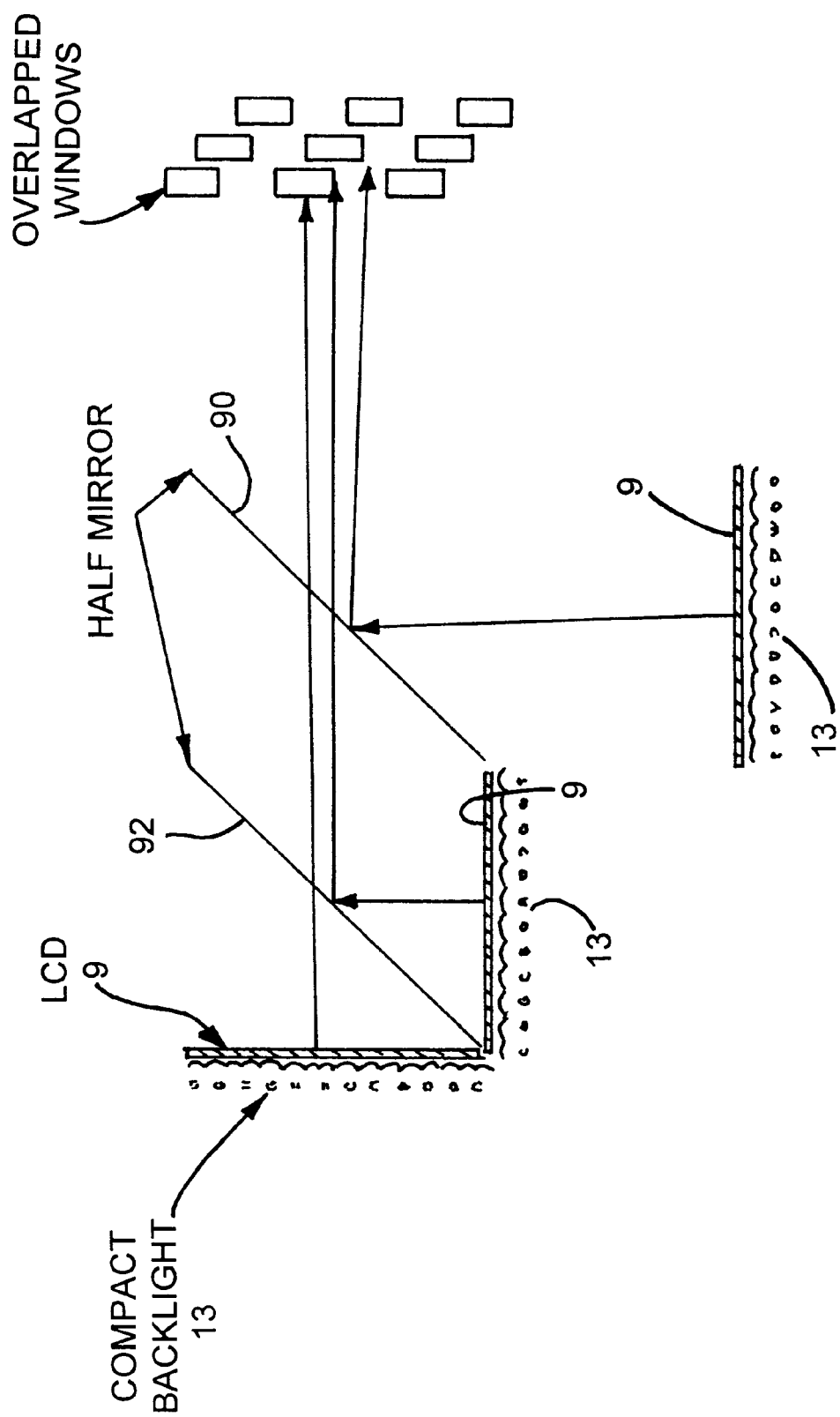
FIG. 31 illustrates another autostereoscopic display with overlapping windows.

The display shown in FIG. 31 differs from the embodiments described hereinbefore in that it is of the beam combiner type using compact illuminators 13. The compact illuminators 13 each comprises a lenticular screen behind which is disposed a parallax barrier. The parallax barrier comprises a plurality of slits, each of which is aligned with a lenticule of the lenticular screen. A Lambertian backlight is disposed behind the parallax barrier.

Each lenticule of the lenticular screen images the aligned slit of the parallax barrier to the window of the zero lobe. In addition, the adjacent lenticules image the same slit to the same windows in the −1 and +1 lobes of the viewing windows. Accordingly, the display shown in FIG. 31 operates in the same way as described hereinbefore for observer tracking.

Figure 32:
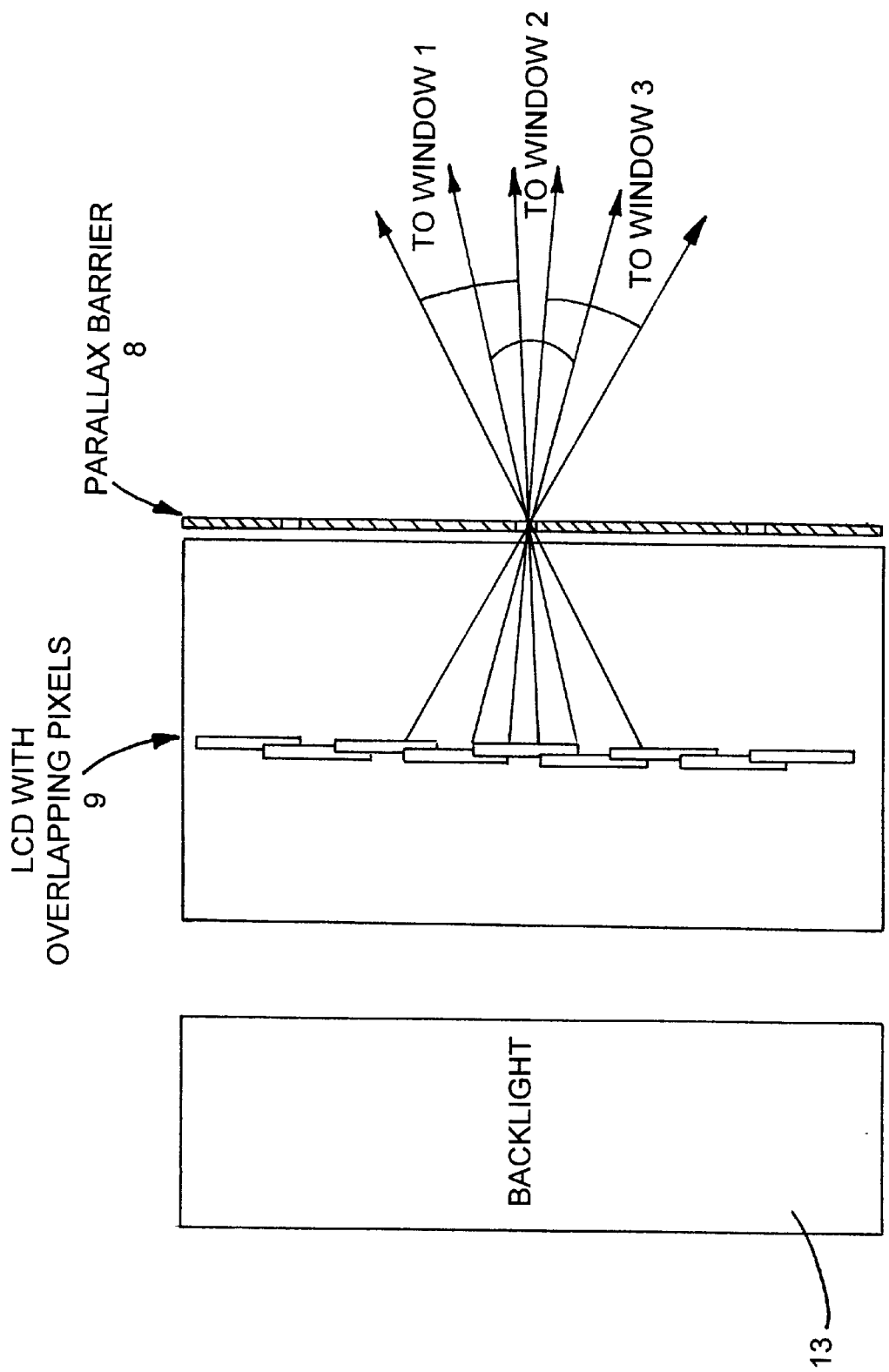
FIG. 32 is a schematic sectional view of part of the display using a front parallax barrier.

FIG. 32 shows part of a display which differs from that shown in FIG. 16 in that the lenticular screen is replaced by a parallax barrier 8. The barrier 8 comprises a plurality of slits aligned with the pixels of the liquid crystal display 9 as shown in FIG. 32. A Lambertian backlight 13 is provided behind the liquid crystal display, whose pixels overlap. The pixels are illustrated in different planes for the sake of clarity but are normally disposed in a single plane.

As shown in FIG. 32, each slit directs light along light cones to the first, second, and third windows of the zero lobe from the associated pixels. Further, the slits form +1 and −1 lobe windows such that the windows in each lobe overlap the lobes overlap.

Although displays of the type shown in FIG. 32 having a "front" parallax barrier 8 produce a darker image, for a given level of illumination, compared with displays using lenticular screens, parallax barriers do not suffer from the optical aberrations of lenticular screens. In a front parallax barrier display, the quality of the windows, particularly in terms of the width of the boundary of each window, produced at the plane of an observer is controlled by the width of the slits. If the slits are made narrower, the geometric spreading of each window edge is reduced. However, the amount of diffraction occurring at the slit increases with decreasing width of each slit so that it is necessary to choose the width of the slits as a compromise between diffraction and geometric degradation effects.

Figure 33:
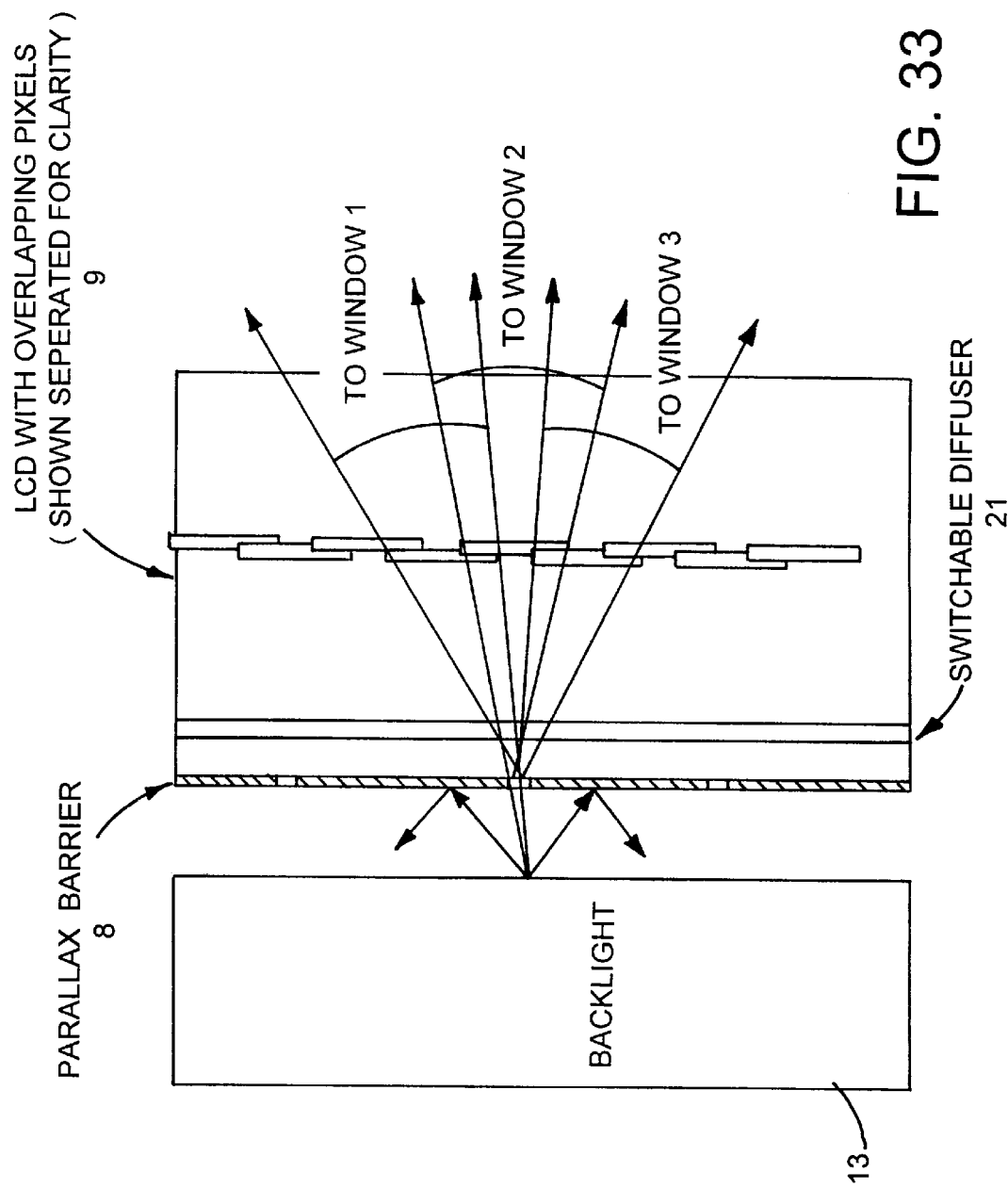
FIG. 33 is a schematic sectional view of part of a display using a rear parallax barrier.

FIG. 33 illustrates part of a display which differs from that shown in FIG. 32 in that the front parallax barrier 8 is replaced by a rear parallax barrier 8 disposed between the liquid crystal display 9 and the backlight 13. A switchable diffuser 21 is provided between the barrier 8 and the display 9. The surface of the barrier 8 facing the backlight 13 is made reflective so that light which does not pass through the slits of the barrier 8 is reflected back to the backlight 13 for reuse. This improves the brightness of the displayed image.

The use of a rear parallax barrier 8 results in the geometric spreading of each window edge being controlled by the width of the slits of the parallax barrier whereas the diffraction spreading of the edges is controlled by the width of the pixels of the SLM 9. It is therefore possible to improve the quality of the window imaging compared with the display shown in FIG. 32 using the front parallax barrier. The effects of diffraction are disclosed in British Patent Application No. 9625497.4.

The display may be used for 2D operation by switching the switchable diffuser 21 so as to diffuse light from the slits of the barrier 8. The liquid crystal display 9 is then illuminated by a Lambertian source and 2D images are visible throughout a wide viewing range.

The rear parallax barrier 8 may be made as an array of transparent slits in an opaque mask. Alternatively, the barrier may be made by imaging a defined size light source through a lenticular screen onto a diffuser.

Figure 34:
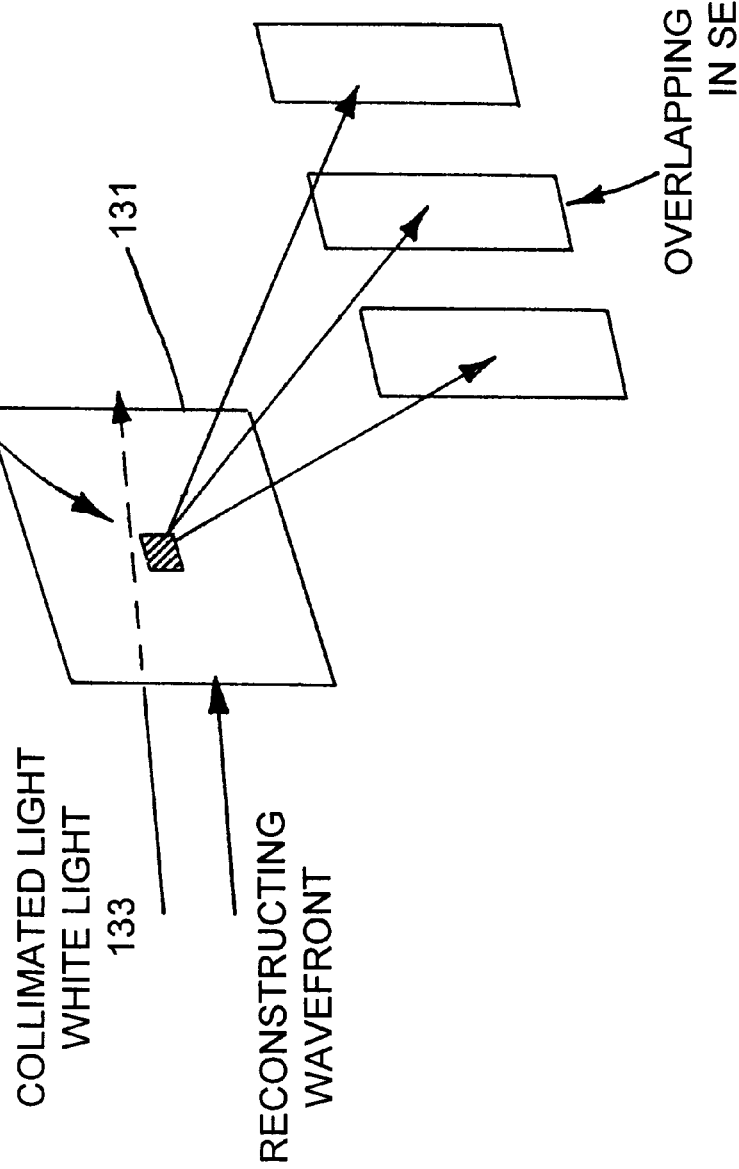
FIGS. 34 and 35 illustrate diagrammatically the use of holograms to form viewing windows.
Figure 35:
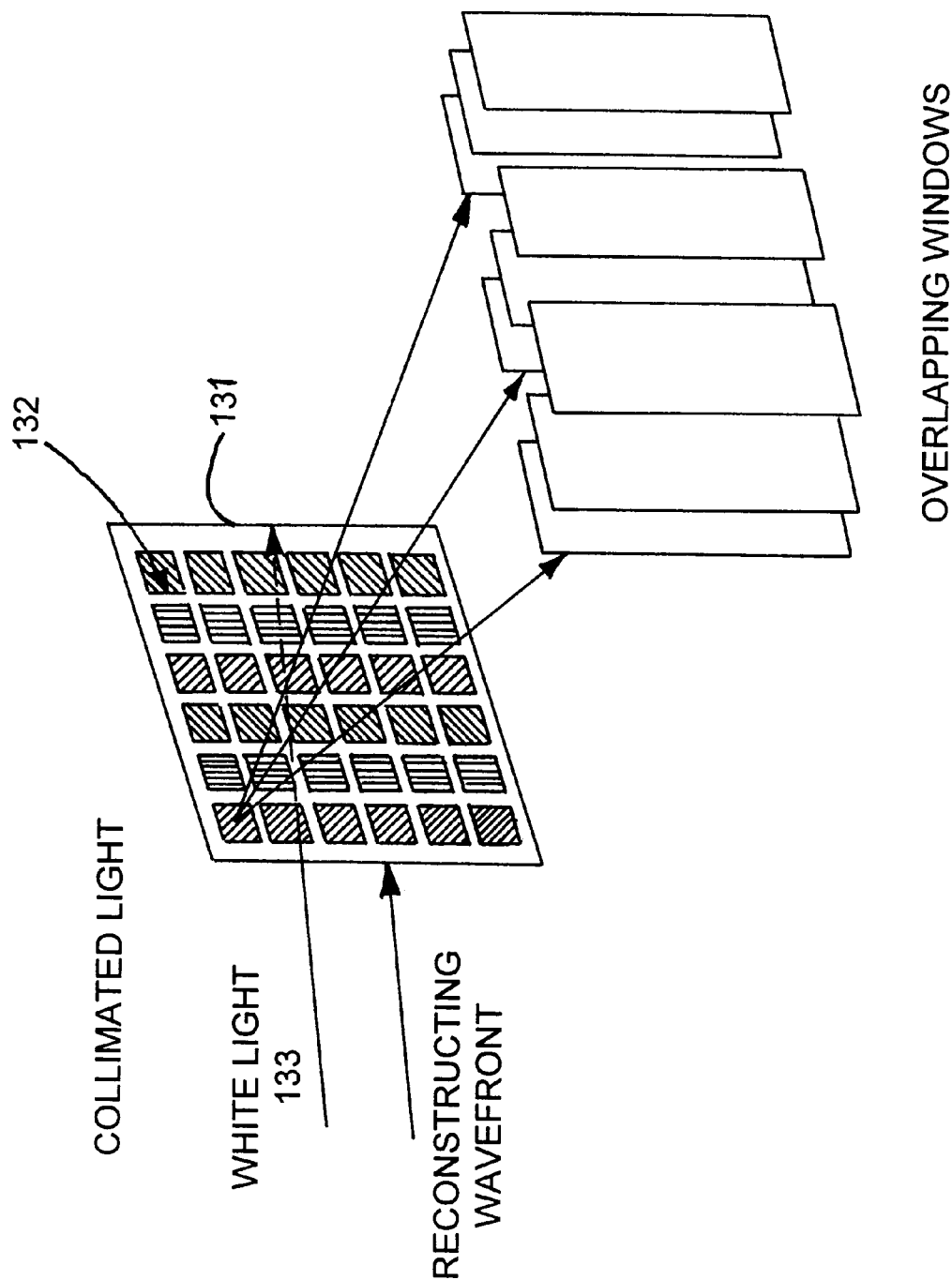

FIG. 34 illustrates diagrammatically an alternative technique for producing three or more overlapping windows by means of a hologram 131 comprising a plurality of holographic elements 132 associated with respective pixels of the spatial light modulator of the display and tuned for the appropriate colour filters of the pixels. Such holographic elements 132 are equivalent in operation to a lenticular screen or parallax barrier and, when appropriately illuminated for instance by a collimated white light reconstructing beam 133, each holographic element 132 produces a defined window for the associated colour. Each holographic element may be recorded so as to define several lobes as shown in FIG. 34. The holographic elements 132 are arranged in groups so that the light from each group of pixels is imaged to one of the three or more groups of windows as shown in FIG. 35. The intensity of the light is controlled by the pixel switching properties and the directionality by the hologram 131. An advantage of using holograms is that they are capable of providing significant improvements to the off-axis behaviour of the display because off-axis aberrations can be substantially cancelled when recording the holograms.

Figure 36:
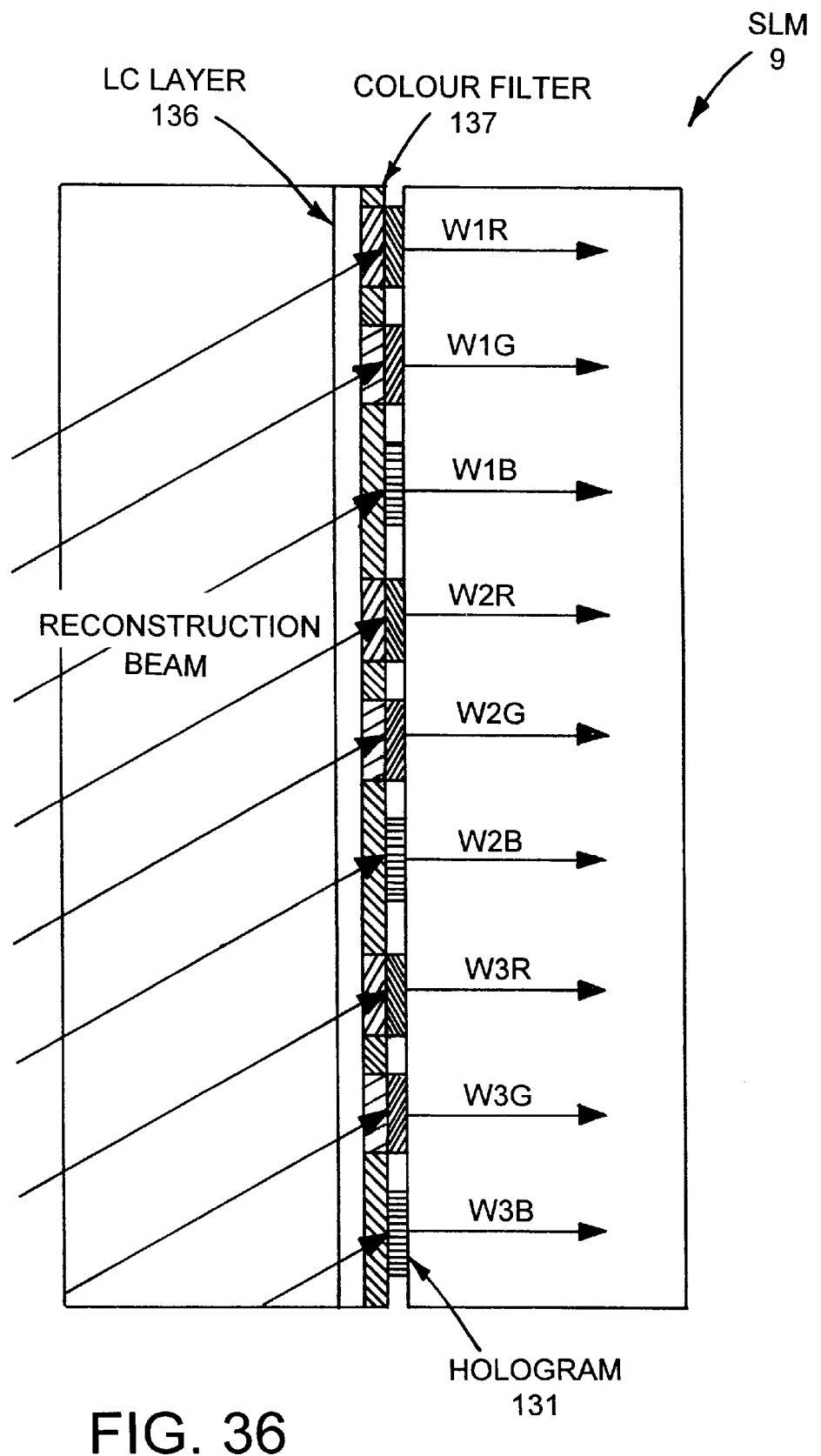
FIG. 36 is a schematic sectional view of part of a display using an internal hologram.

As shown in FIG. 36, the hologram 131 may be disposed inside the SLM 9 together with a liquid crystal layer 136 and a colour filter 137. Thus, the hologram is disposed substantially at the plane of the liquid crystal device forming the SLM 9, for instance by controlling the pattern of a black mask inside the pixel aperture. The hologram at each pixel can be tuned so as to direct light for the particular colour associated with the colour filter for that pixel to the appropriate window. This is indicated in FIG. 36 by abbreviations such that "W" refers to a window and "R", "G", and "B" refer to red, green, and blue light, respectively. Thus, the white light performance of the display may be improved. For instance, a light source for the display may contain three narrow spectral peaks which may be obtained by the appropriate choice of phosphors used in fluorescent tubes which, in combination with the colour filter and pixels, results in relatively small spectral spreading of the light from the holographic elements.

Figure 37:
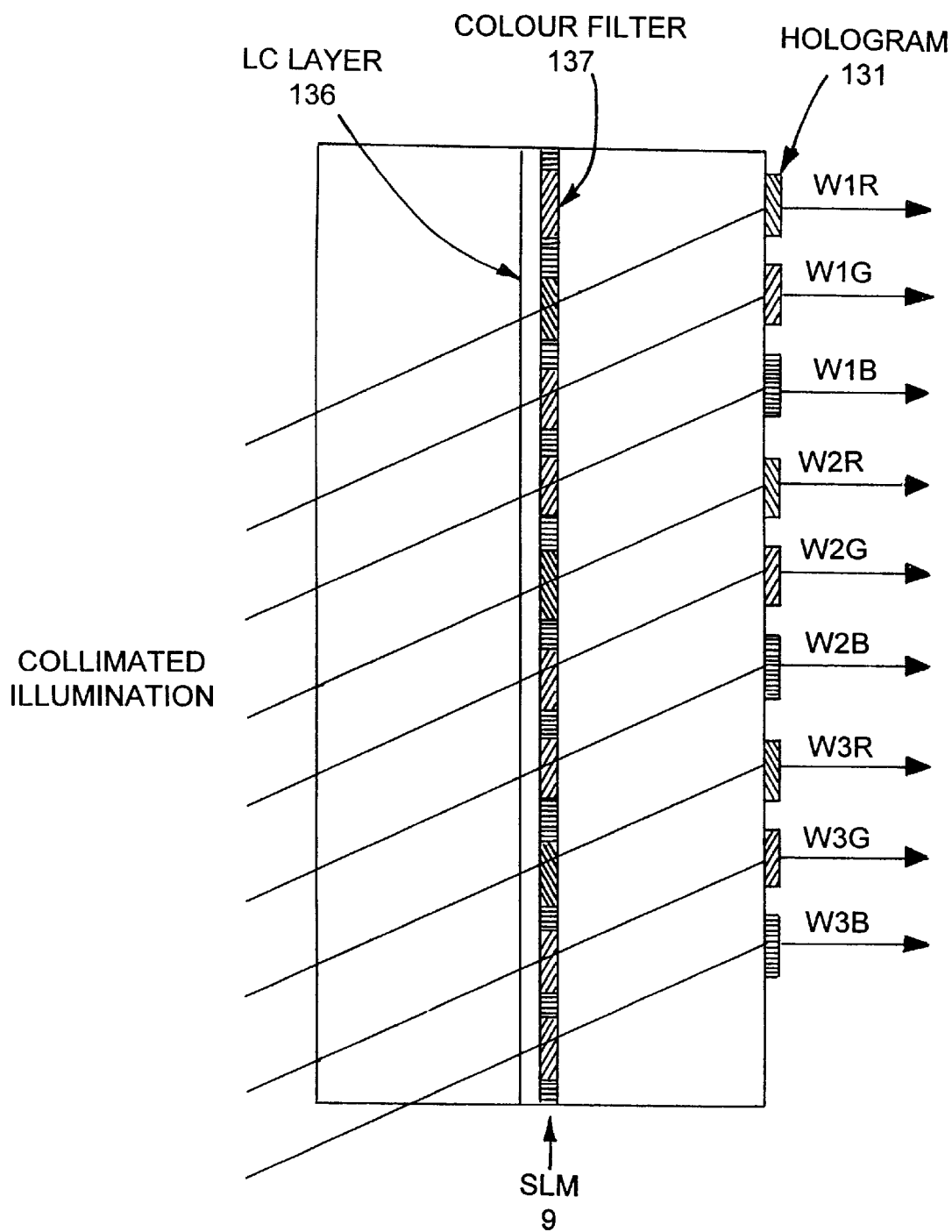
FIG. 37 is a schematic sectional view of part of a display using an external hologram.

FIG. 37 shows an alternative arrangement in which the hologram 131 is disposed on the outer surface of the SLM 9. In this arrangement, by using collimated illumination, it is possible to make use of holograms formed in a photopolymer or dichromated gelatine or in the form of etched surface relief or embossed holograms. Alternatively, by controlling the structure of electrodes within each pixel of the SLM 9, gratings may be created in the SLM.

The holograms 131 may be computer generated or may be recorded by interfering light from an illuminated window with a reference beam. For instance, a mask may be used to expose a recording plate at the first window of each lobe through a red colour filter together with a red reference beam. This may then be repeated for green and blue light. The process then may be repeated for each window and each corresponding holographic element.

Figure 38:
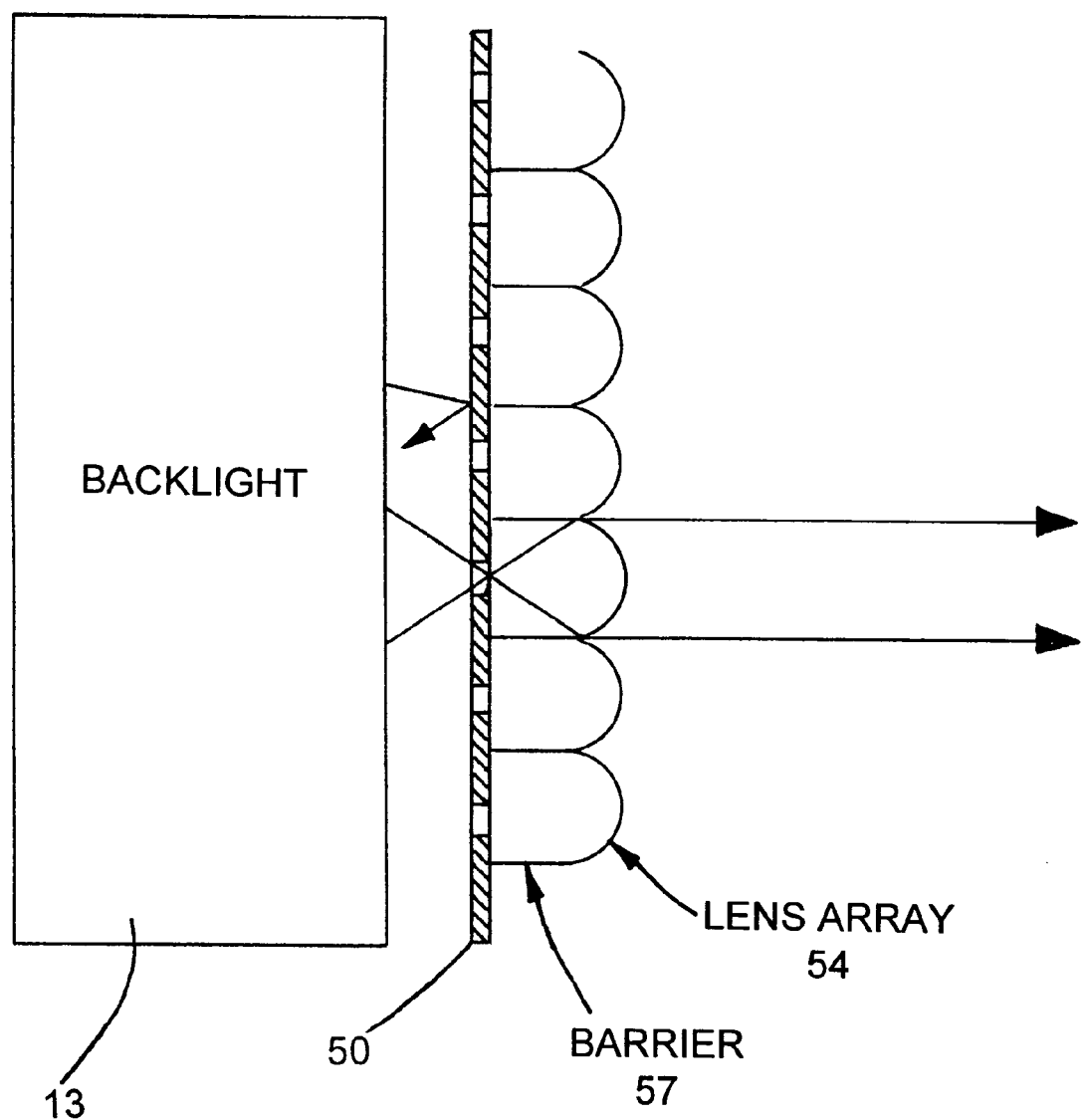
FIGS. 38 and 39 are schematic sectional views of compact backlights for illuminating holograms.

FIG. 38 illustrates a compact collimated white backlight which may be used for illuminating the holograms 131. The backlight has barriers 57 arranged between elements of the lens array 54, which is arranged to produce collimated light. The rear surface of the barrier 50 is made reflective so as to return unused light to the backlight illuminator 13 reuse.

Figure 39:
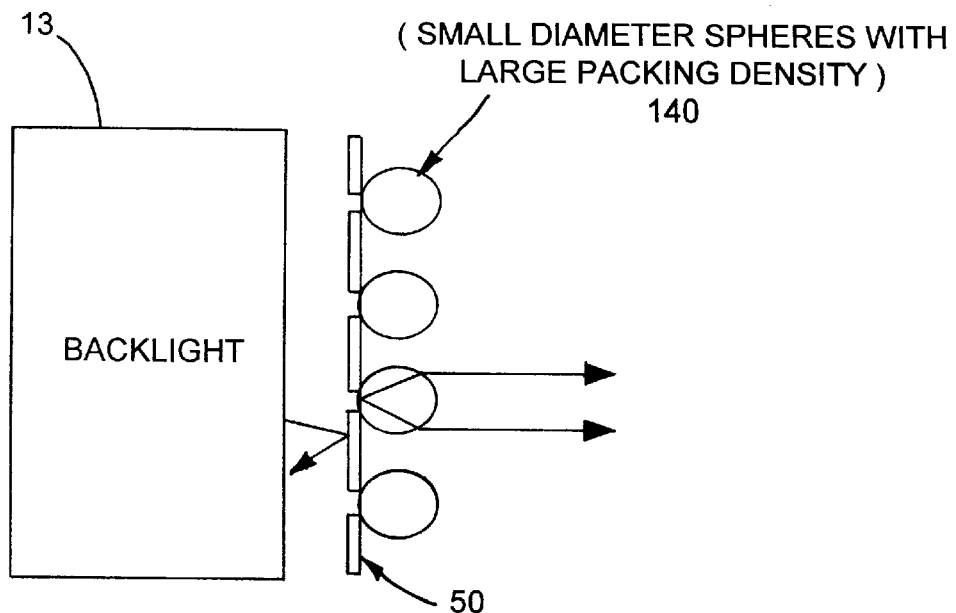

FIG. 39 shows a collimated backlight which differs from that shown in FIG. 38 in that the lens array 54 and the barrier 57 are replaced by small glass spheres 140 having a large packing density. As another alternative, it is possible to produce collimated light by means of an edge lit hologram.

It is thus possible to provide an observer tracking autostereoscopic display having no moving parts. Such a display is more robust and offers quicker response compared to a display incorporating moving parts. Such a display is also relatively insensitive to errors in the tracking of the observer.

The functions of a non-mechanical, electronic, lateral and longitudinal tracking method and a mechanical tracking method (for example, translating a parallax clement, for example a parallax barrier or a lenticular screen with respect to an SLM or rotating a sandwich comprising at least a parallax element and an SLM in a flat panel type display) can be combined. It is thus possible to obtain good aberrational performance from the mechanical tracking method (the images of an observer's eye through the parallax barrier at the plane of the SLM are kept at or near the centre of the SLM pixels) as well as speed and extended viewing freedom from the non-mechanical tracking method. In this way, as an observer moves to a new position, a relatively slow mechanical system can either translate the parallax barrier or lenticular screen with respect to the SLM, or rotate the sandwich. Further, the non-mechanical tracking method working in conjunction with the mechanical tracking method allows the observer to maintain an autostereoscopic image throughout with extended longitudinal viewing freedom which is not possible if only the mechanical method is used.

Although LCDs 9 of the type shown in FIG. 15 may be manufactured specially in order to provide the required overlapping pixel pattern, such manufacture would be relatively expensive. In particular, a new electronic driving scheme would be required as would be new mask patterns for the active elements and internal electrodes of the LCD.

Figure 40:
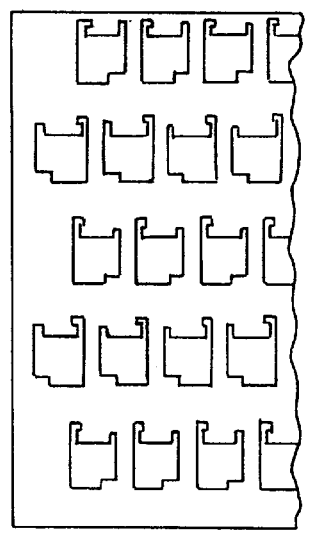
FIG. 40 illustrates a known type of delta pattern liquid crystal display.

FIG. 40 illustrates a known type of conventional "delta pattern" black mask which defines the regions of the active pixels which are visible in a conventional RGB panel display. The mask may be modified so as to define overlapping apertures for the active pixels so as to allow the LCD of FIG. 15 to be made. The LCD is otherwise conventional but, as described hereinbefore, is suitable for use in autostereoscopic displays. In particular, it is unnecessary to change the positioning of addressing electrodes or active matrix elements, such as transistors or diodes, in the display. Further, it is not necessary to move transistors and other electronic components forming part of an electronic drive scheme of the display. It is accordingly not necessary to provide a completely new mask set for an active matrix type display.

By omitting colour filters of a conventional delta pattern display, a LCD can be provided which is suitable for use in monochrome autostereoscopic displays. The original red, green and blue channels may then be used to provide three independent viewing windows. Thus, three spatially multiplexed views can be displayed by supplying their pixels to the original red, green and blue channels of the LCD so that little or no modification of the electronic drive system of the LCD is required.

It is thus possible to manufacture a LCD of the type shown in FIG. 15 by making use of an existing process which requires little modification. Such LCDs may therefore be made economically.

Figure 41:
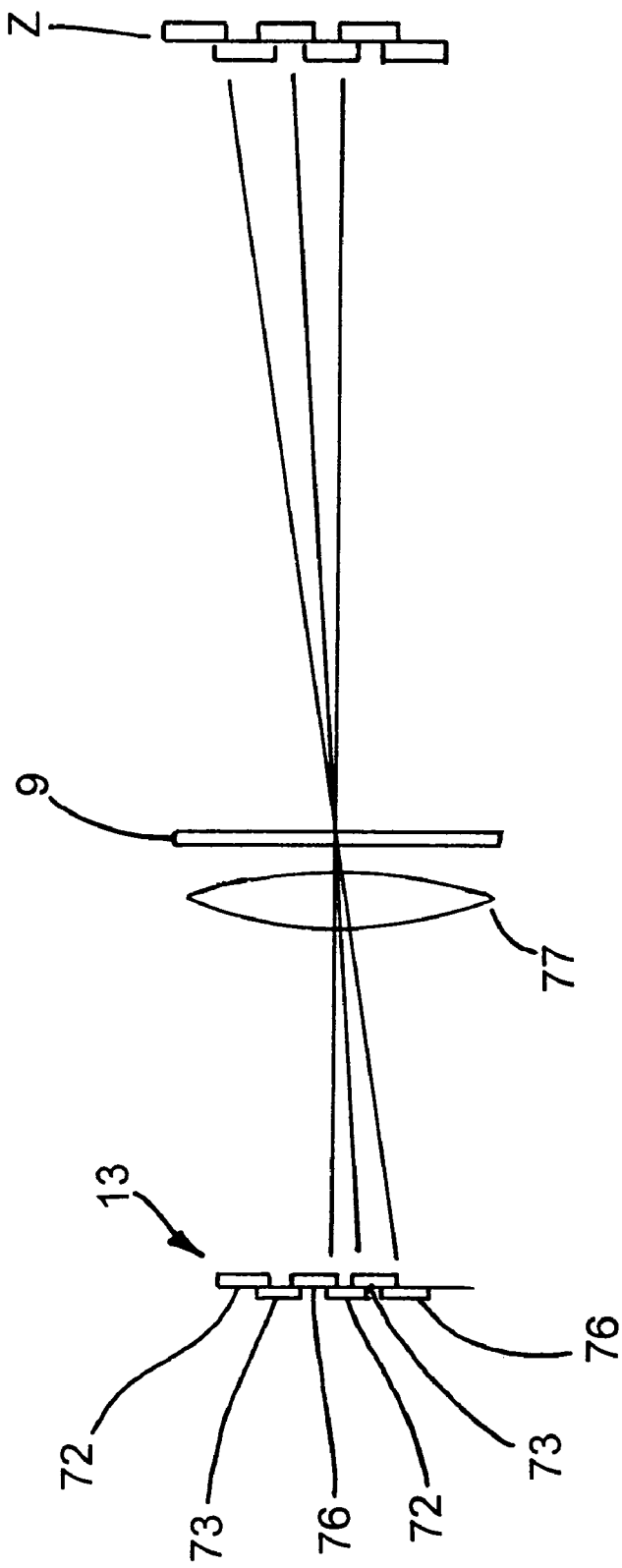
FIG. 41 is a schematic illustration of a time multiplexed display constituting an embodiment of the present invention.
Figure 42:
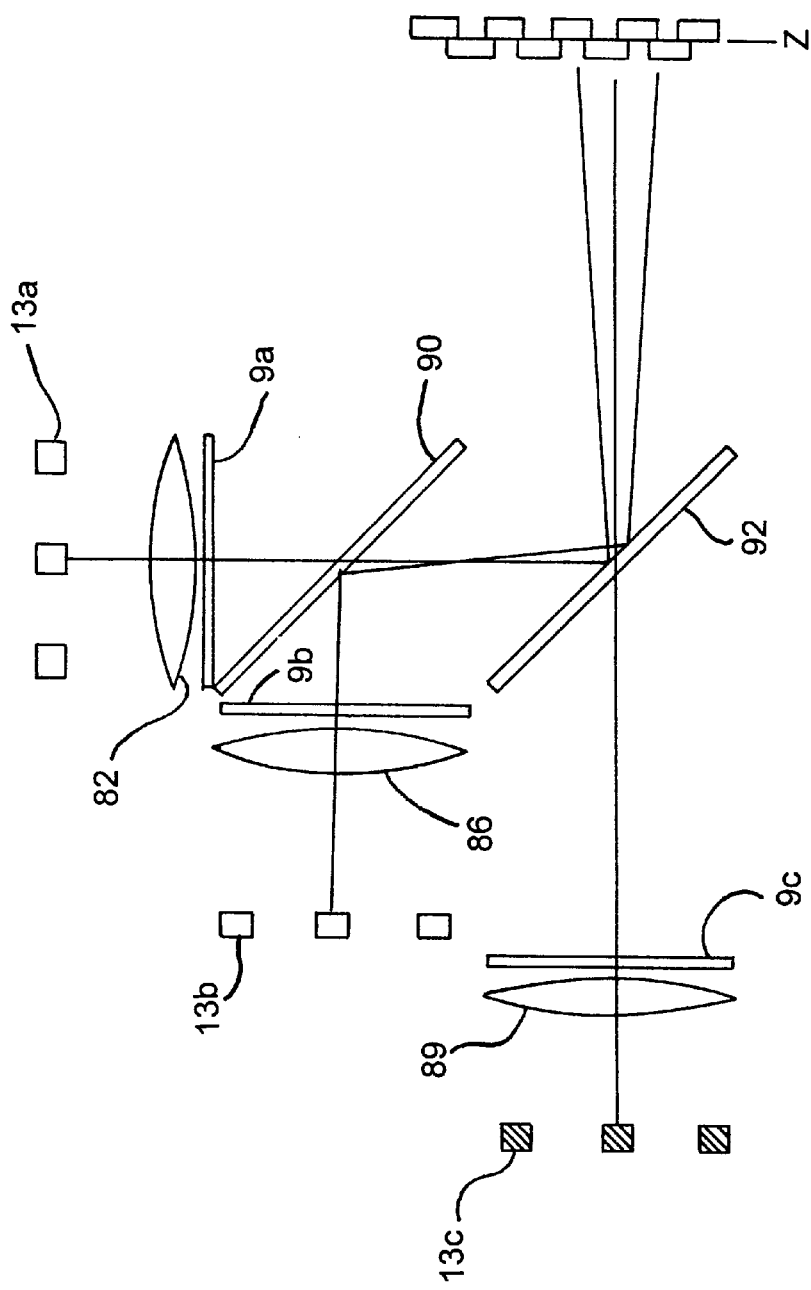
FIG. 42 is a schematic illustration of a three view beam combiner display constituting an embodiment of the present invention.

FIG. 41 illustrates a display comprising a spatial light modulator 9, a lens 77 and an illumination source 13 comprising six overlapping light emitting elements arranged in pairs 72, 73, and 74. The lens 47 acts to form an image of the source 13 at the nominal viewing distance Z. Each pair of light emitting elements has the same inter-element distance as each other pair and the elements are arranged in a common plane. The pairs of light emitting elements are illuminated in sequence. Video information is supplied to the spatial light modulator in a time multiplexed manner in sequence with the successive illumination of each pair of illuminators. Such a display provides two overlapping lobes each having three overlapping windows at the nominal viewing position Z. If the six light emitting elements are individually controllable, the display may be operated as a six window single lobe display to achieve the same freedom of movement.

Figure 1:
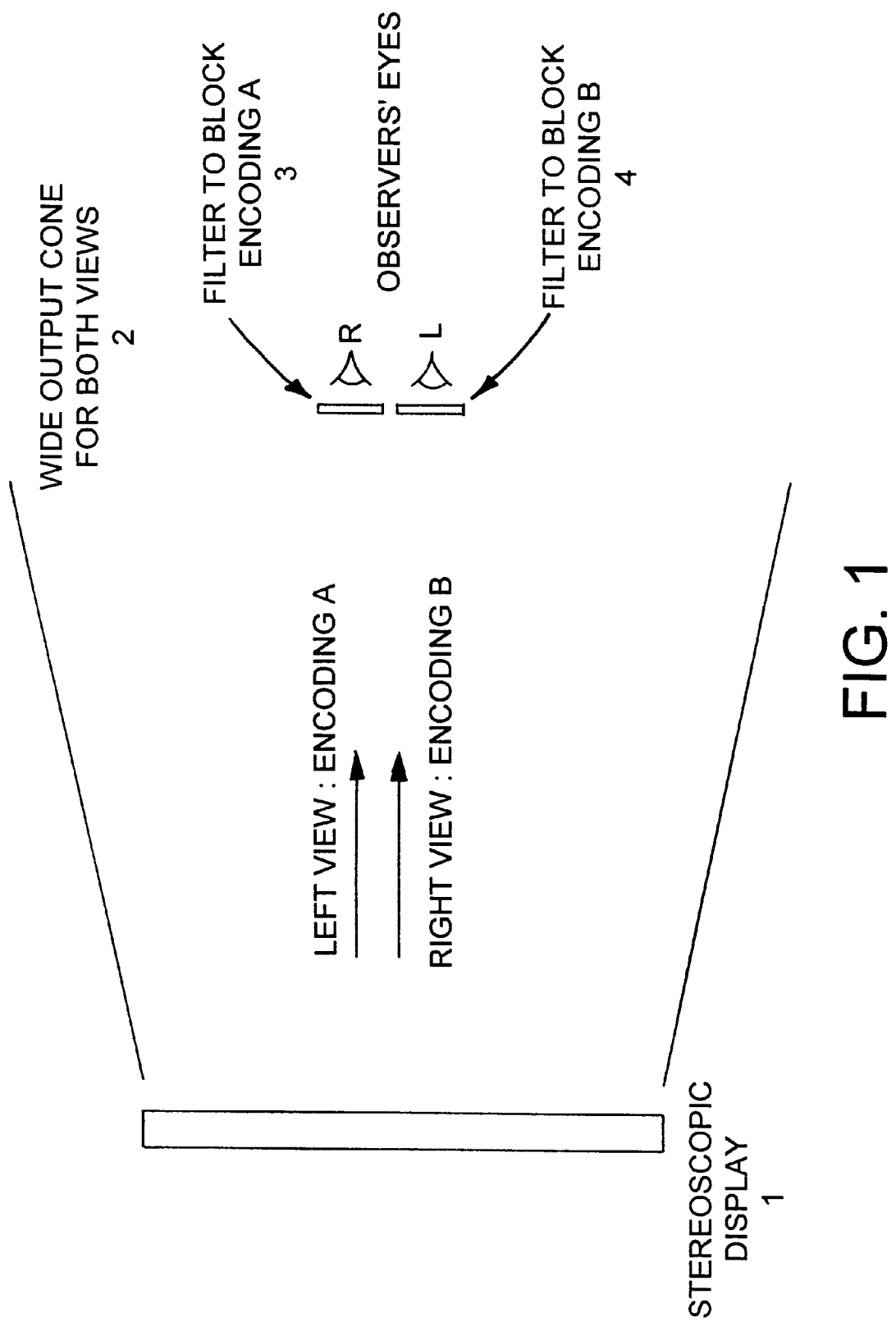
FIG. 1 is a schematic plan view of a known type of stereoscopic display.
Figure 2:
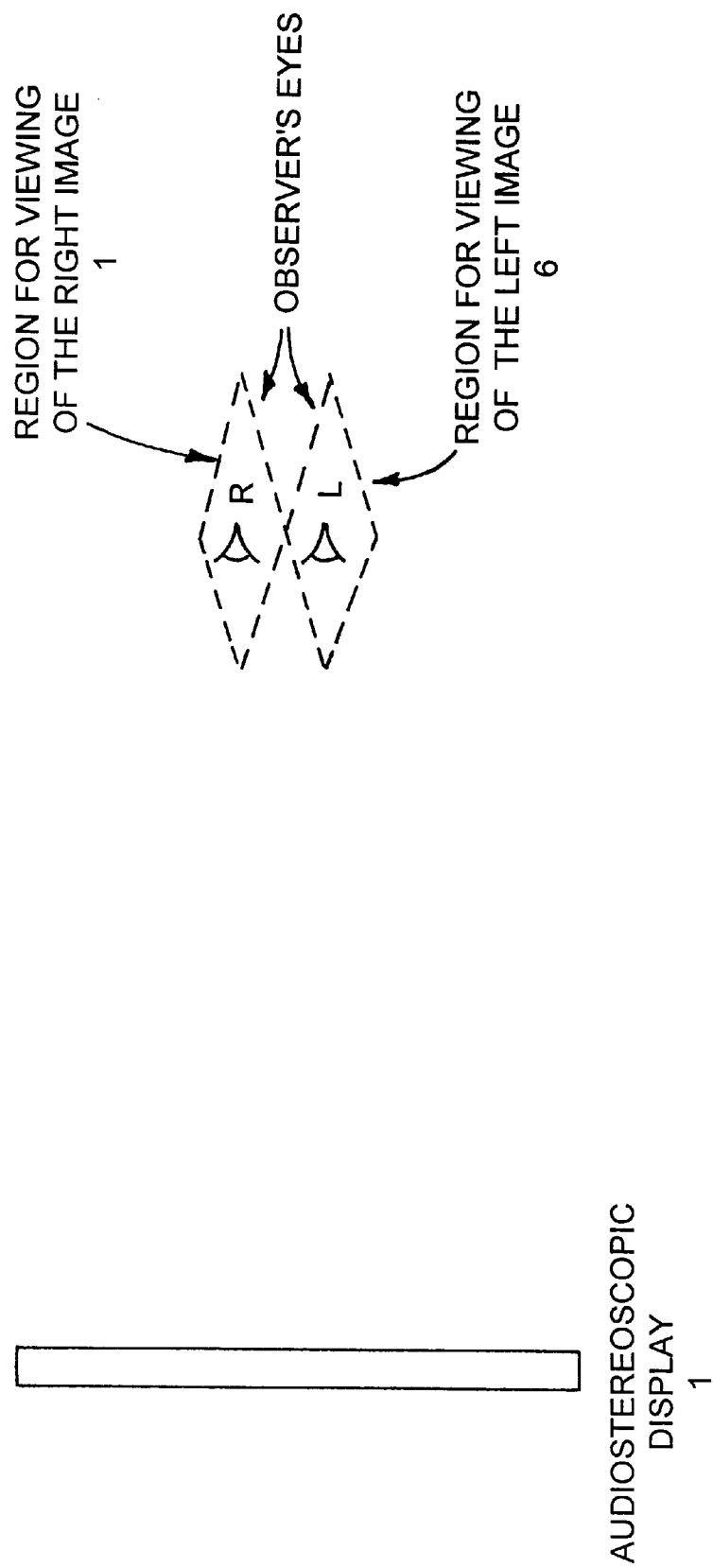
FIG. 2 is a schematic plan view of a known type of autostereoscopic display.
Figure 3:
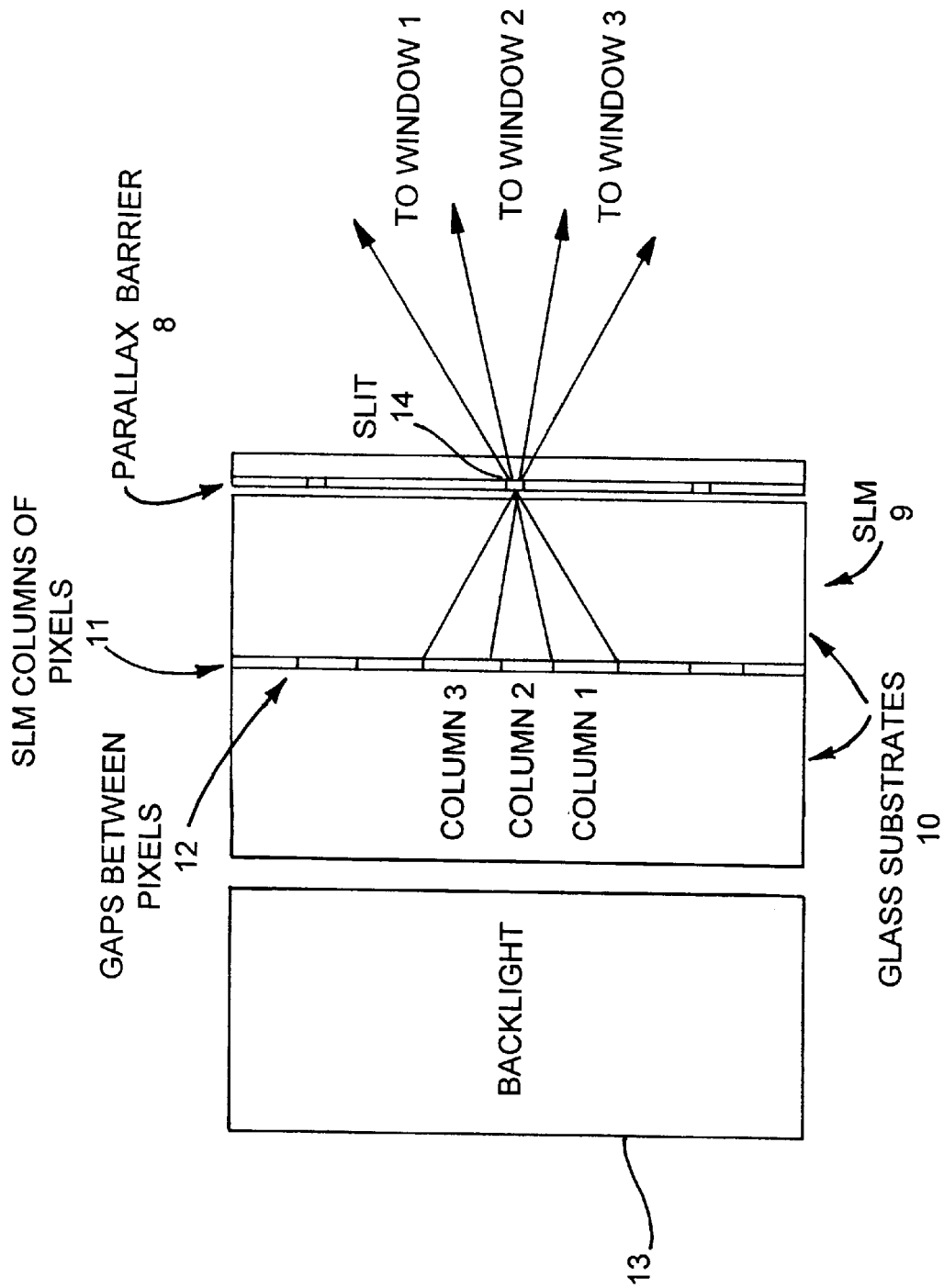
FIG. 3 is a schematic lateral sectional view of a known autostereoscopic display.
Figure 4:
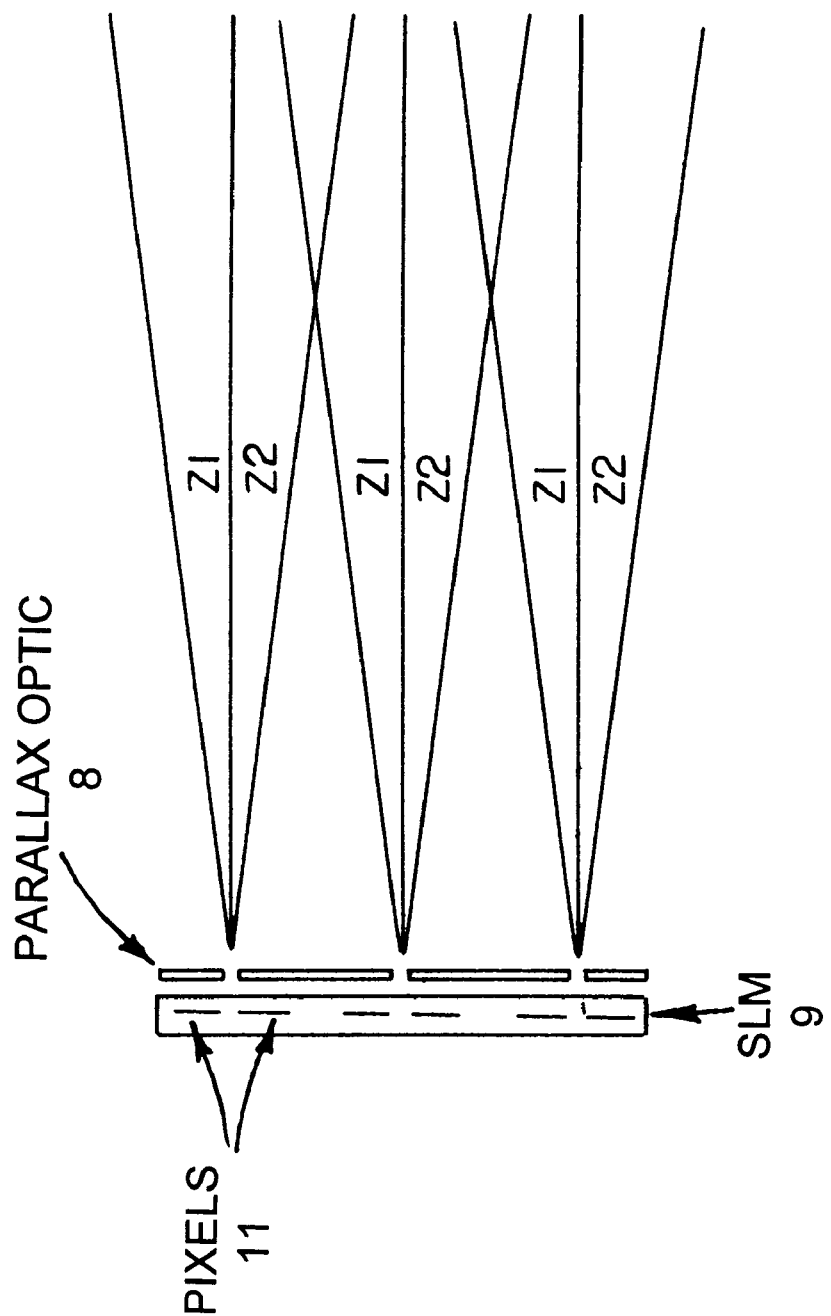
FIG. 4 is a schematic plan view illustrating a non-viewpoint corrected autostereoscopic display.
Figure 5:
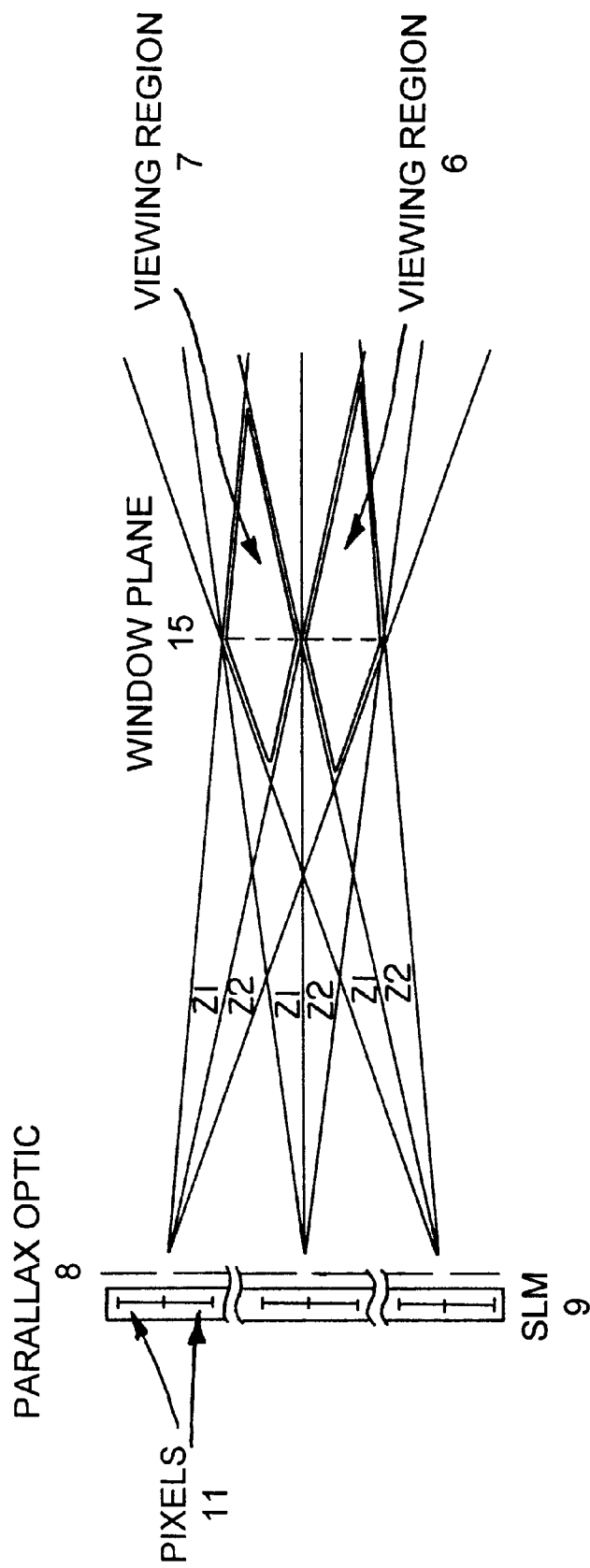
FIG. 5 is a schematic plan view illustrating a known view point corrected autostereoscopic display.
Figure 6:
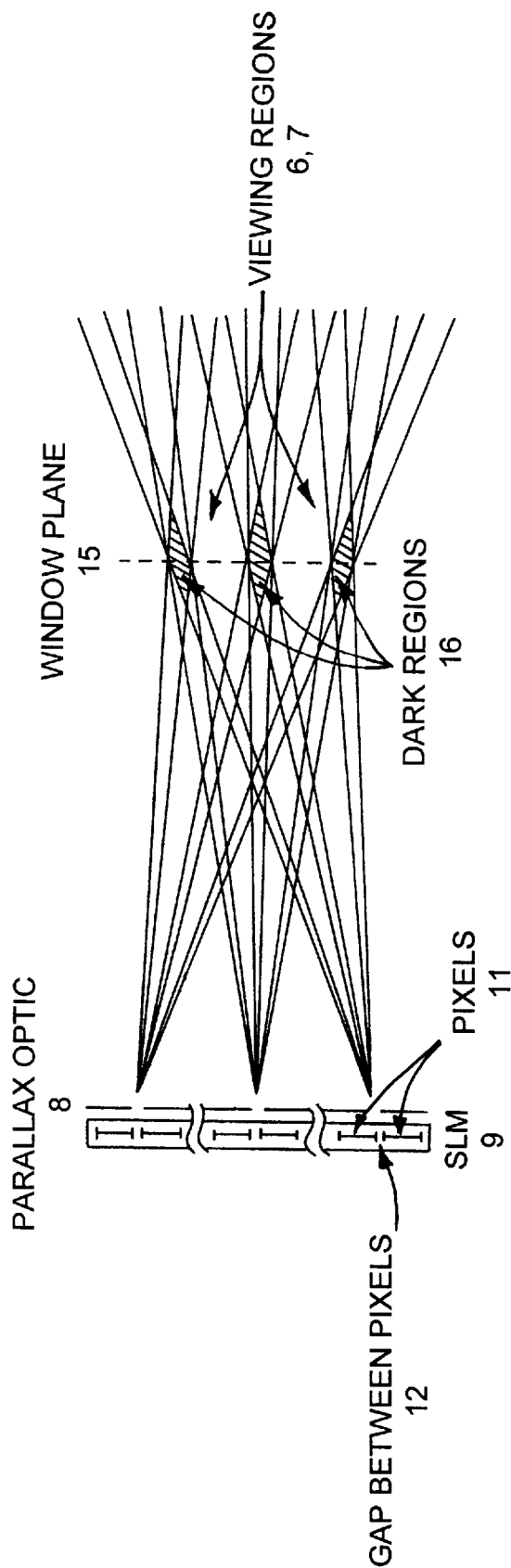
FIG. 6 is a view similar to FIG. 5 illustrating the effects of gaps between pixel columns in a display of the type shown in FIG. 5.
Figure 7:
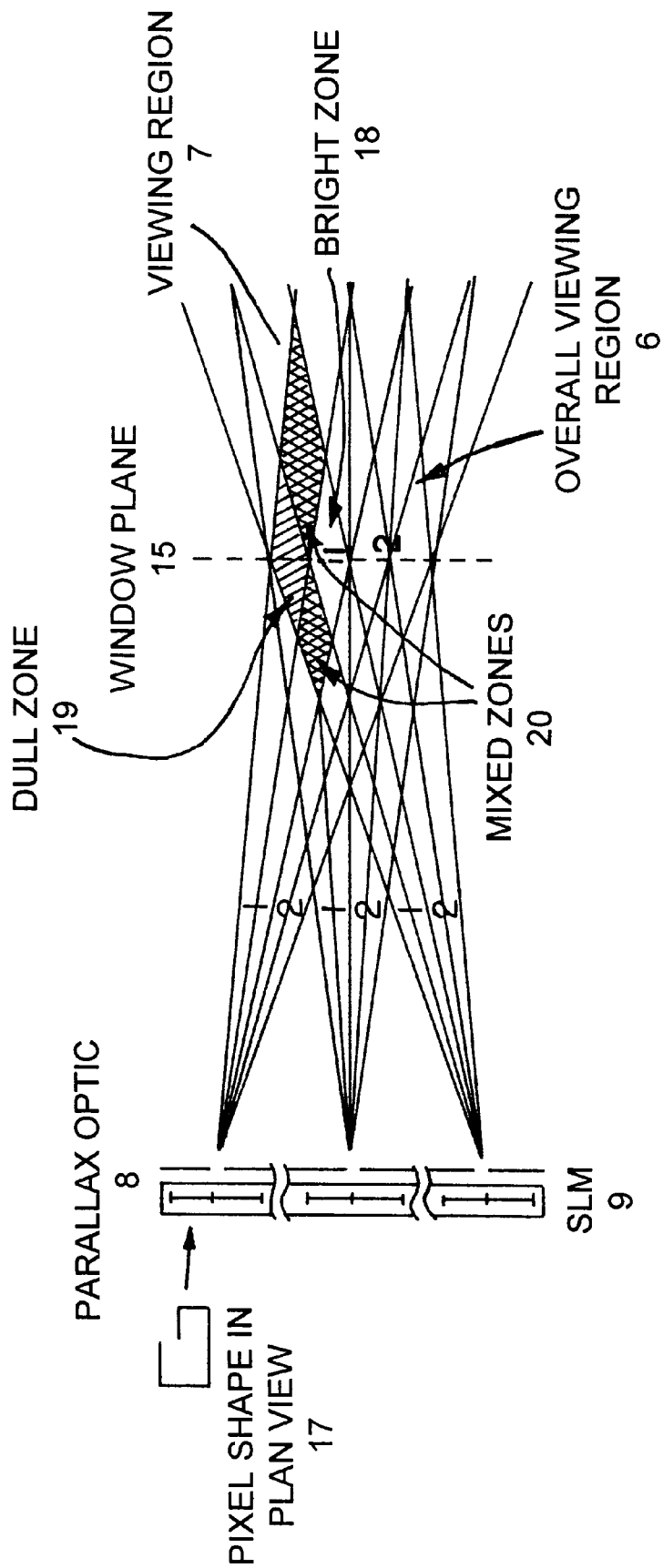
FIG. 7 is a view similar to FIG. 5 illustrating the effect of pixels of non-constant vertical aperture in a display of the type shown in FIG. 5.
Figure 8:
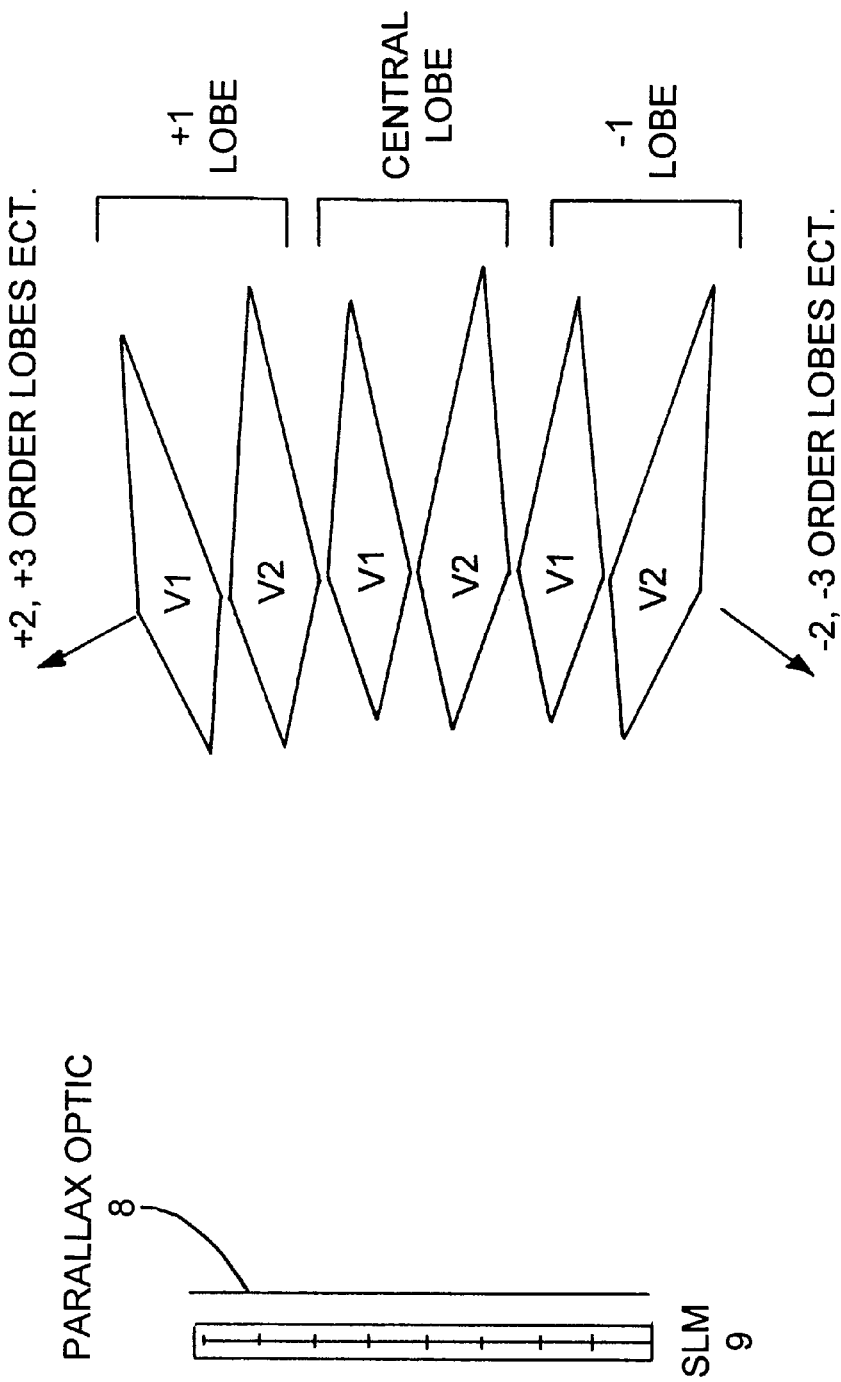
FIG. 8 is a schematic plan view illustrating the formation of lobes in a known type of autostereoscopic display.
Figure 9:
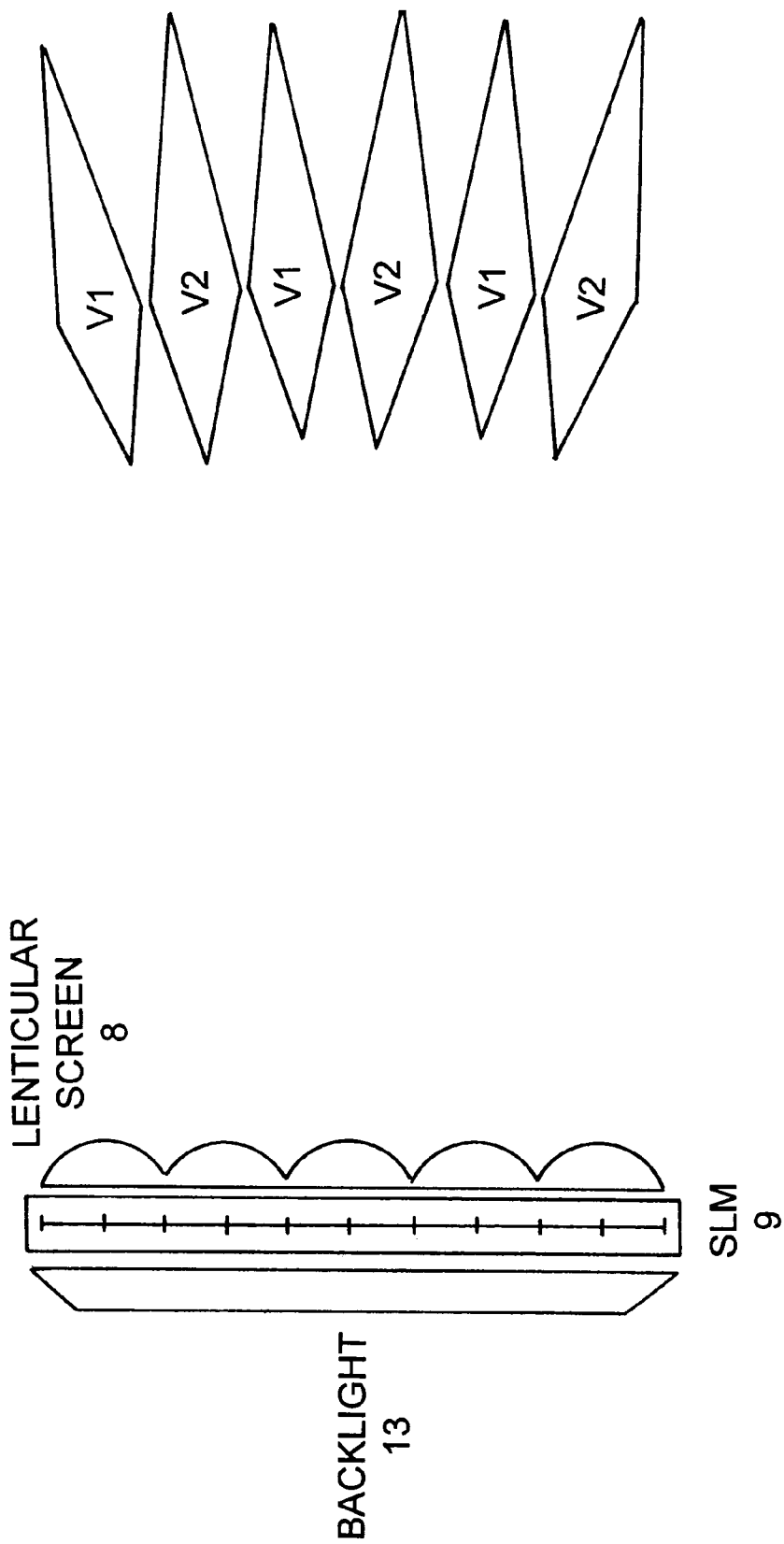
FIG. 9 is a schematic plan view illustrating another known type of autostereoscopic display.
Figure 10:
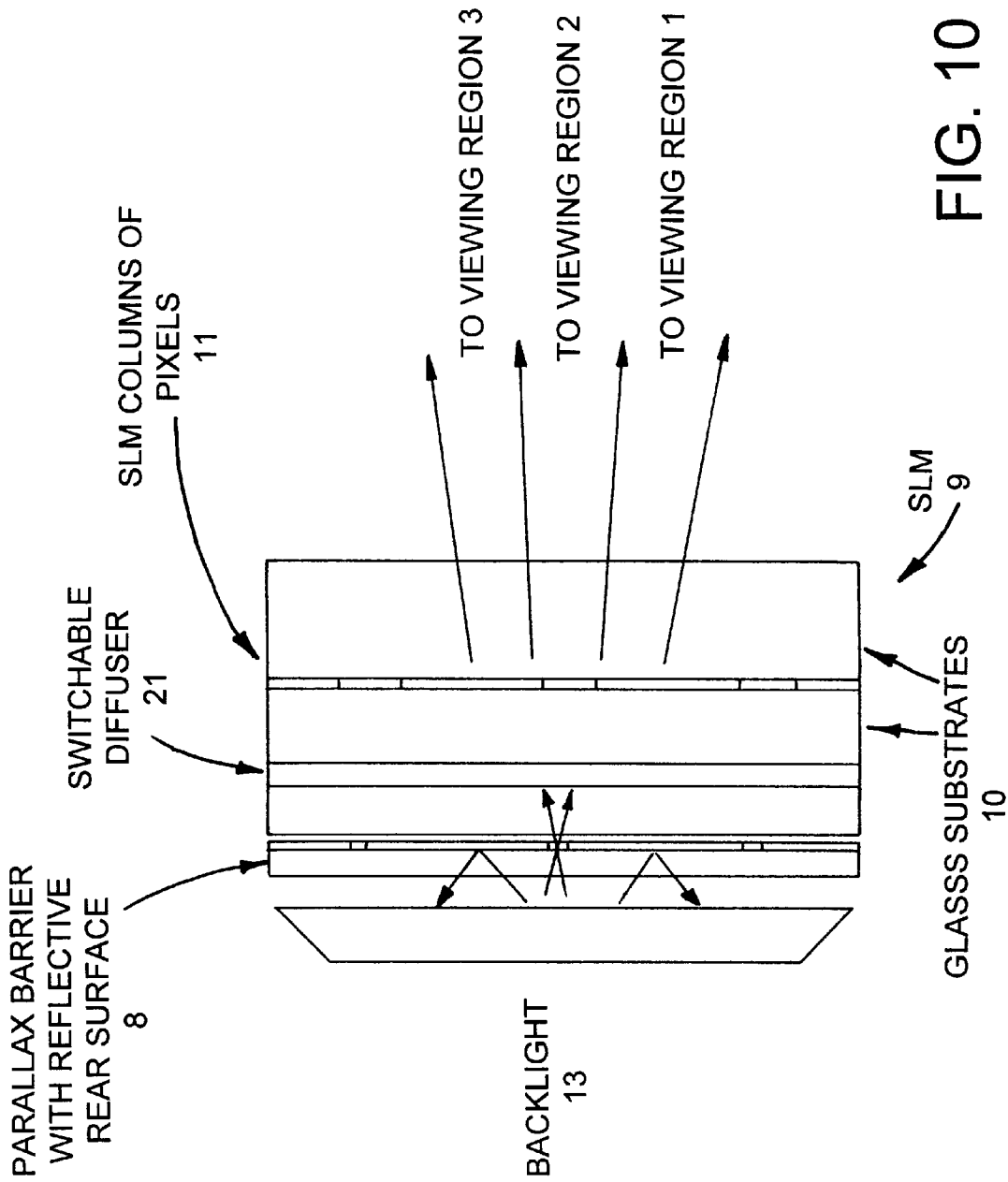
FIG. 10 is a schematic lateral section view illustrating a further known type of autostereoscopic display.
Figure 11:
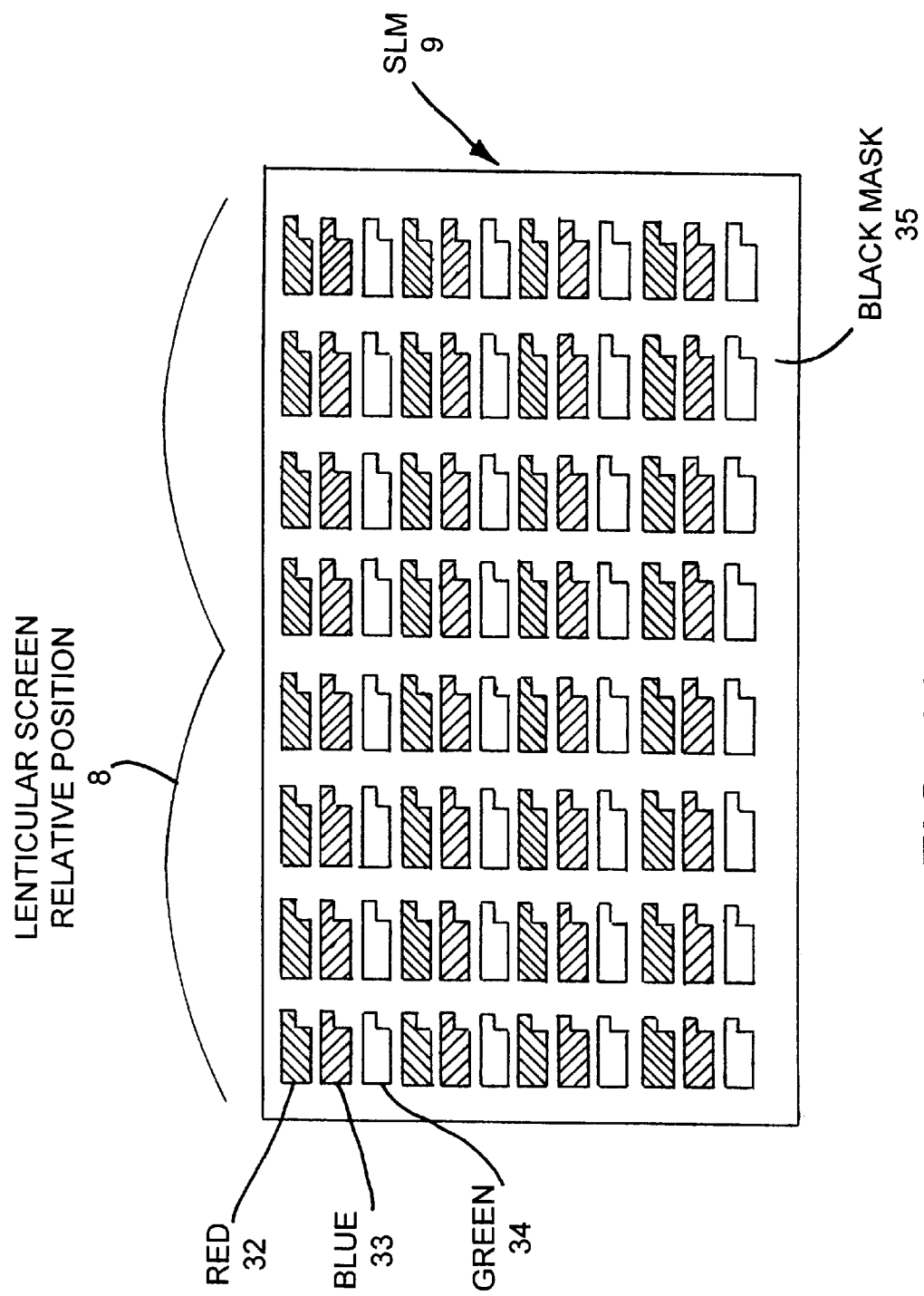
FIG. 11 illustrates a known type of directional display.
Figure 12:
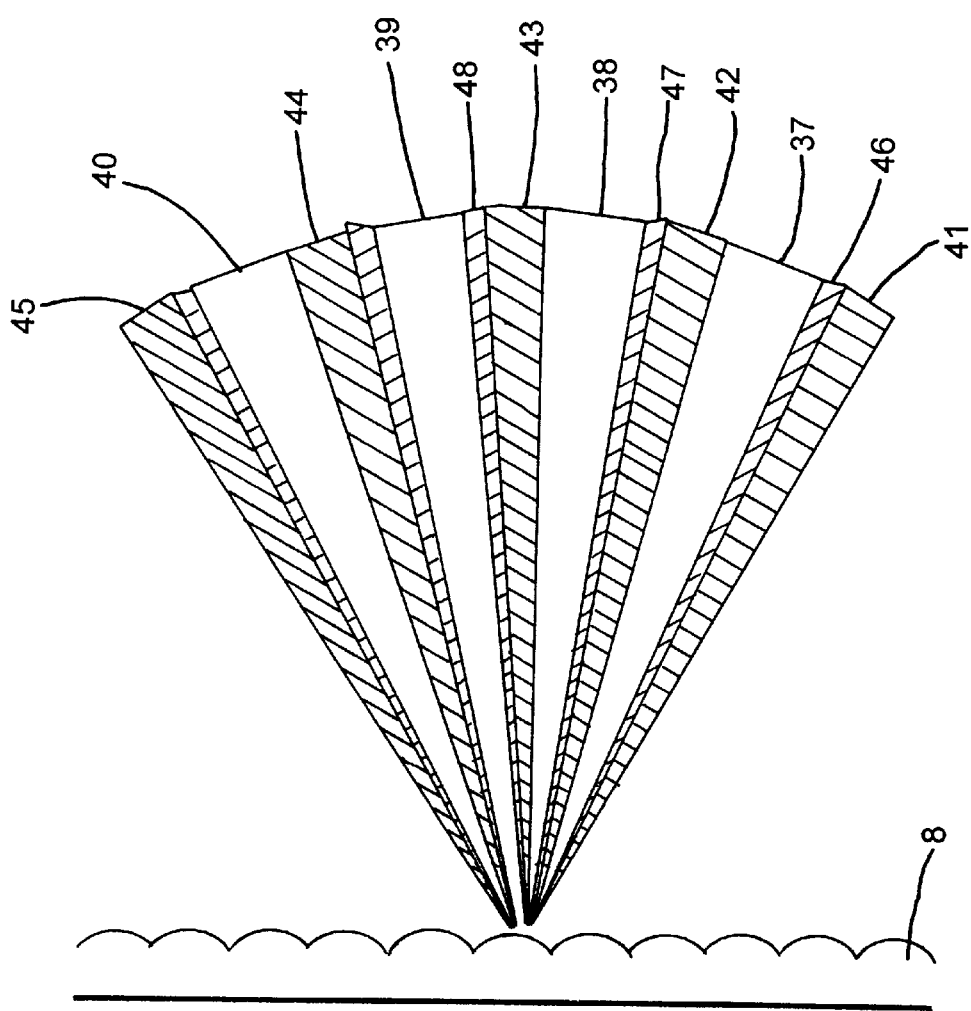
FIG. 12 illustrates the output of the display of FIG. 11.

In the display shown in FIG. 4, a first light source 13a comprises three regularly spaced illuminators and is arranged to illuminate a first spatial light modulator 9a via a lens 82. Similarly, a second light source 13b comprises three regularly spaced illuminators and is arranged to illuminate a second spatial light modulator 9b via a lens 86. A similar arrangement is provided in respect of a third light source 13c, a third lens 89 and a third spatial light modulator 9c. A first beam combiner 90 combines the images of the first and second light sources 13a and 13b, respectively, following modulation by their respective spatial light modulators. This combined image is further combined at a second beam combiner 92 with the image of the third light source 13c following modulation by the third spatial light modulator 9c. The images are arranged to be laterally offset with respect to one another so as to provide an output of three overlapping lobes each comprising three overlapping windows at a nominal viewing position Z.

Figure 43:
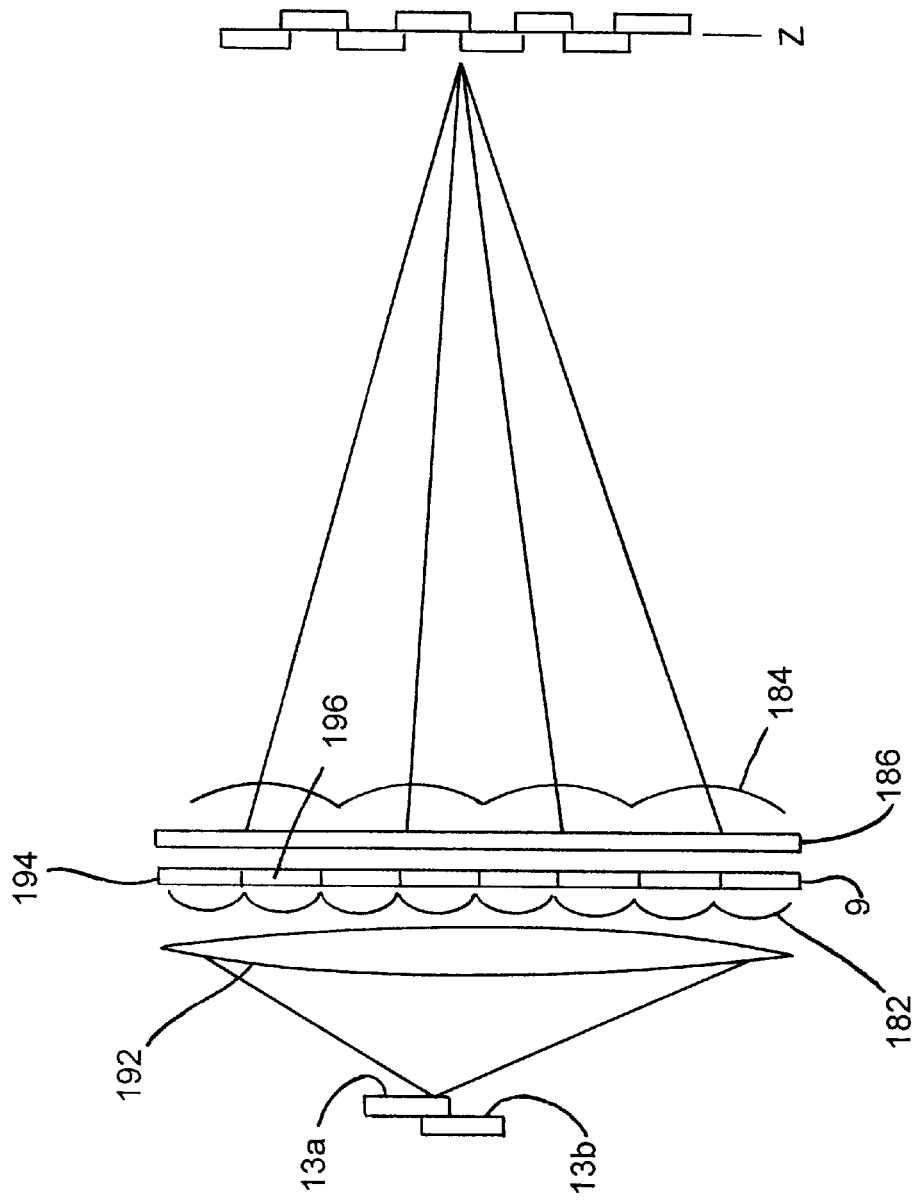
FIG. 43 is a schematic diagram illustrating a four view display constituting an embodiment of the present invention.

FIG. 43 schematically illustrates a display constituting an embodiment of the present invention. A spatial light modulator 89 is sandwiched between first and second lenticular arrays 182 and 184. The first array 182 is adjacent the spatial light modulator 89 and has a pitch substantially equal to that of the spatial light modulator. The second lenticular array 184 has a pitch substantially twice that of the first lenticular array. A diffuser 186 is positioned intermediate the spatial light modulator 89 and the second lenticular screen 184. First and second overlapping light sources 13a and 13b are arranged to illuminate the first lenticular array 182 via a lens 192. The diffuser 186 is positioned such that an image of the light sources 13a and 13b is formed thereon following modulation by the spatial light modulator 89. The diffuser 186 also lies in an object plane of the second lenticular screen 184. The second lenticular screen 184 re-images the diffuser 186 at the nominal viewing position Z.

The light sources 13a and 13b and the spatial light modulator 89 are driven in a time multiplexed manner. When the first light source 13a is illuminated, first and second modulating elements 194 and 196 of the spatial light modulator 89 form overlapping modulated images at a first region on the diffuser 186. When the first illuminator 13a is extinguished and the second illuminator 13b is illuminated, the same modulating elements 194 and 196 form overlapping images at a second region overlapping the first region on the diffuser 186. These images are re-imaged to form overlapping windows. Such an embodiment combines both spatial and temporal multiplexing to provide a multi-lobe four view display.

Figure 44:
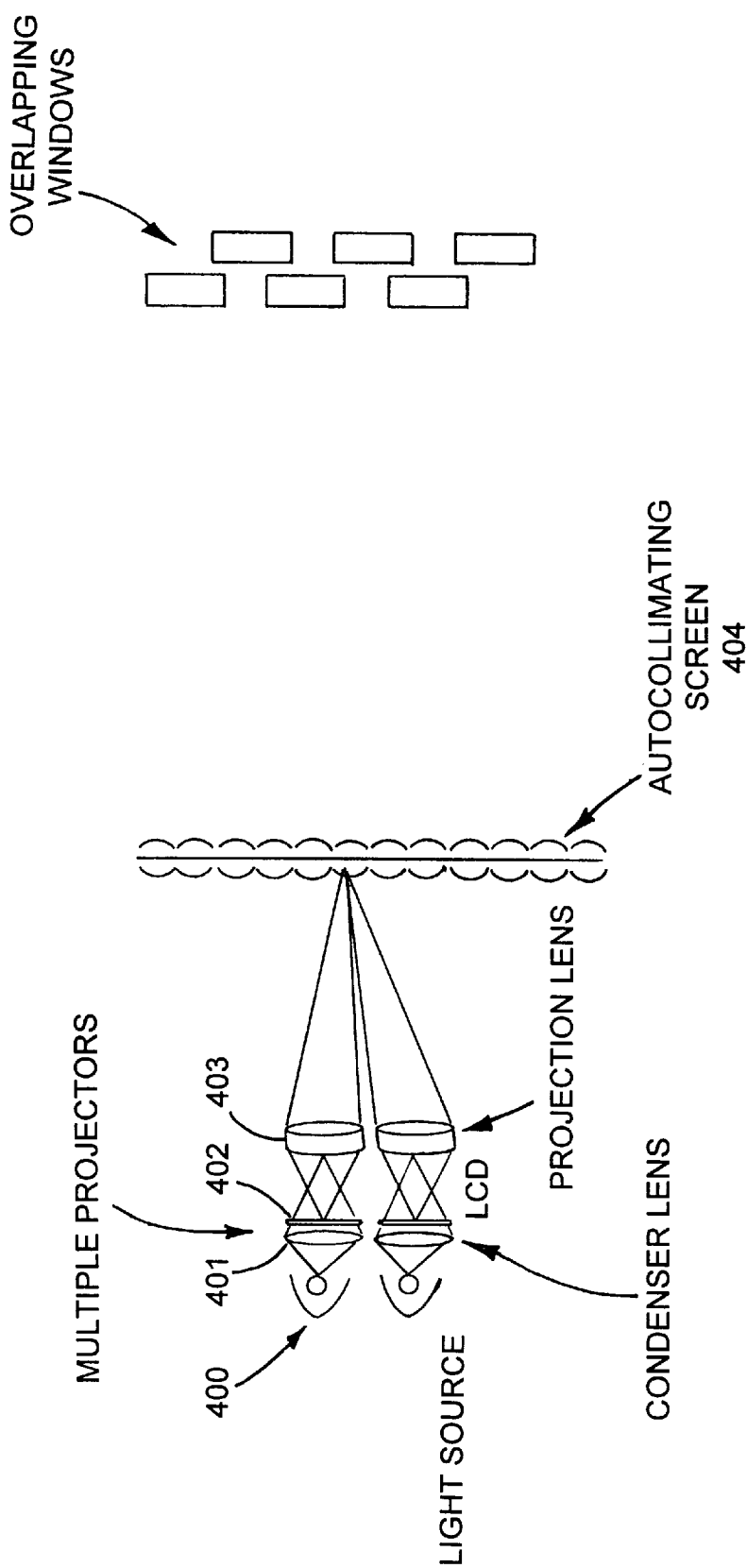
FIG. 44 is a schematic illustration of a projection display constituting an embodiment of the present invention.

FIG. 44 shows a projection display comprising a plurality of projectors, only two of which are shown. Each projector comprises a light source and reflector 400, a condenser lens 401, a LCD 402, and a projection lens 403. The images displayed by the LCDs are projected onto an autocollimating screen 404 so as to produce a set of overlapping windows 405. The overlapping windows 405 are images of the projection lens apertures in each lobe and the lobes are produced by the autocolimating screen 404.

Figure 45:
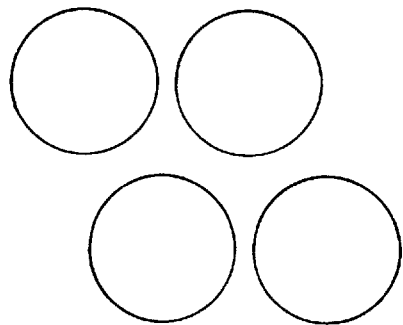
FIGS. 45 and 46 illustrate arrangements of projection apertures of the display of FIG. 44.
Figure 46:
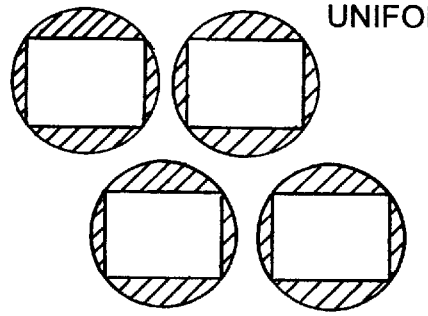

FIG. 45 illustrates an arrangement of projection apertures which may be used to form the overlapping windows 405. Because these apertures are circular, there are intensity variations across the overlapping windows. As shown in FIG. 46, the intensity at the window plane may be made more uniform by using a rectangular mask to restrict the projection apertures.

Various modifications may be made within the scope of the invention. For instance, instead of using appropriately illuminated SLMs for the displays, other types of image display device may be used, such as emissive or reflective display devices.

Figure 47:
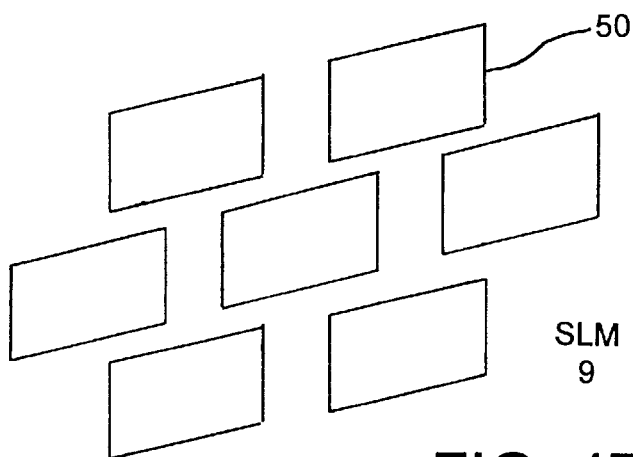
FIG. 47 illustrates a pixel structure using parallelogram shaped pixels.

The SLM 9 shown in FIG. 15 comprises a regular array of rectangular pixels 50 so that the pixels have constant vertical aperture. However, other arrangements are possible. For instance, FIG. 47 illustrates an array of parallelogram-shaped pixels which are such that the pixels have constant vertical aperture.

In order for an observer to move without perceiving undesirable visual artifacts in displays having electronic tracking, it is important for the viewing windows to be uniform in intensity level. This allows the observer to move within a viewing region or to another viewing region which is showing the same image without thicker or change in the display intensity being visible.

Figure 48:
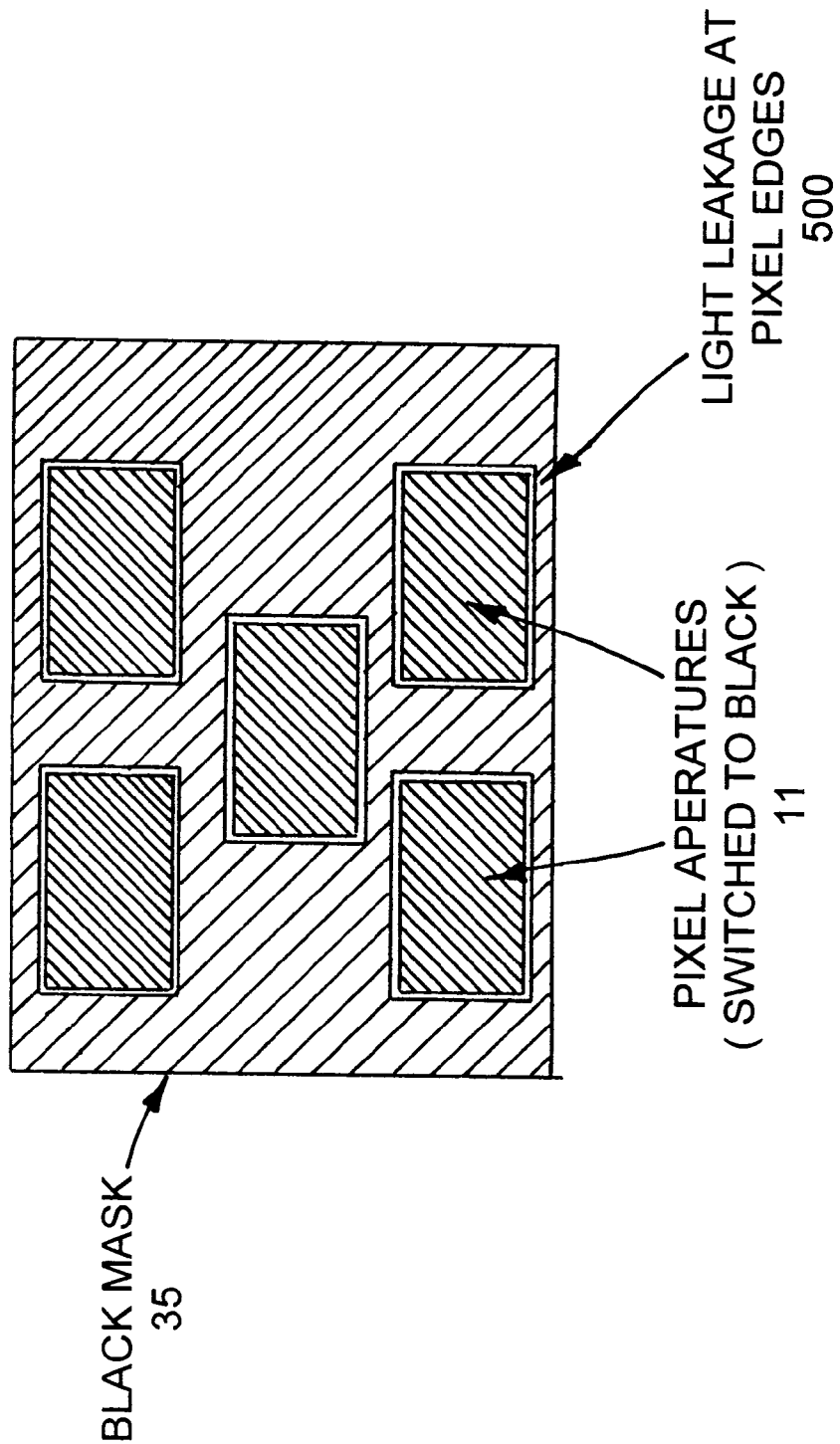
FIG. 48 illustrates the appearance of an LCD SLM in the black state showing the occurrence of light leakage.

A problem which may occur with SLMs 9 as described hereinbefore is that, when the SLM displays a dark or black background, the pixel boundaries may be visible as thin white lines as illustrated at 500 in FIG. 48. Such light leakage is believed to be due to a polarisation effect. In an LCD switched to black, light is blocked from transmission by crossed polarisers. The input light is polarised in one plane by the input polariser and the liquid crystal re-orients this plane so that it is at 90° to the preferred transmission axis of the output polariser. Accordingly, substantially all the light is blocked by the second polariser and the display appears black.

For light to be leaking at the pixel edges in the black state, there must be a disturbance in the plane of polarisation around the edge of the panel. It has been shown that most light leaks from the edges of pixels which are aligned at 45° to the input (and output) polariser. Edges which are aligned to the axis of either the input or output polariser do not show light leakage. Unfortunately, in the common TFT twisted nematic LCD, the polarisers are aligned at 45° to the vertical and horizontal for viewing angle reasons so that the vertical edges of, for instance, rectangular pixels give rise to light leakage. The mechanism for this is believed to be polarisation angle rotation caused by light reflection, diffraction or scattering at the edges of the pixel apertures defined by the black mask 35.

In a 3D autostereoscopic display having a lenticular screen, light from the right edges 500 of the pixels is collected by the lens aperture and imaged to the window plane, thus causing thin vertical stripes of light. The strips are more visible against a dark image background as thin light strips.

Figure 49:
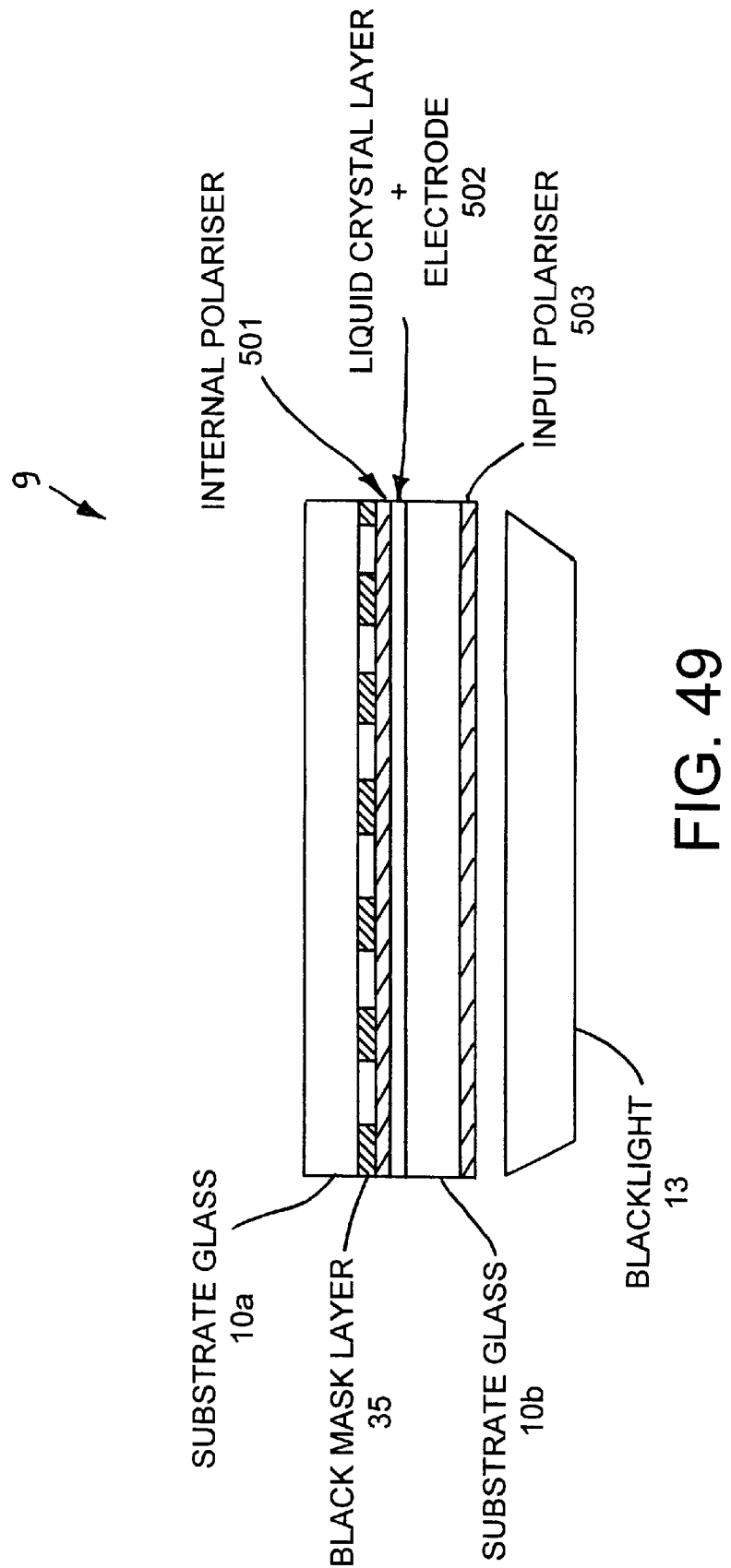
FIG. 49 is a cross-sectional view of an SLM arranged to reduce light leakage.

FIG. 49 illustrates one technique for reducing or eliminating such light leakage in an SLM 9. The SLM 9 comprises glass substrates 10a and 10b with an input polariser 503 disposed between the substrate 10b and a backlight 13. The black mask layer 35 is formed on the internal surface of the substrate 10a and an active layer 502 comprising a liquid crystal layer, electrodes etc., is provided between the substrates. An output polariser, which would normally be disposed on the outer surface of the substrate 10a is disposed internally at 501 between the black mask 35 and the layer 502. With this arrangement, light from each pixel is extinguished before reaching the black mask 35 so that any subsequent rotation of the polarisation direction has no effect and does not give rise to light leakage.

Figure 50:
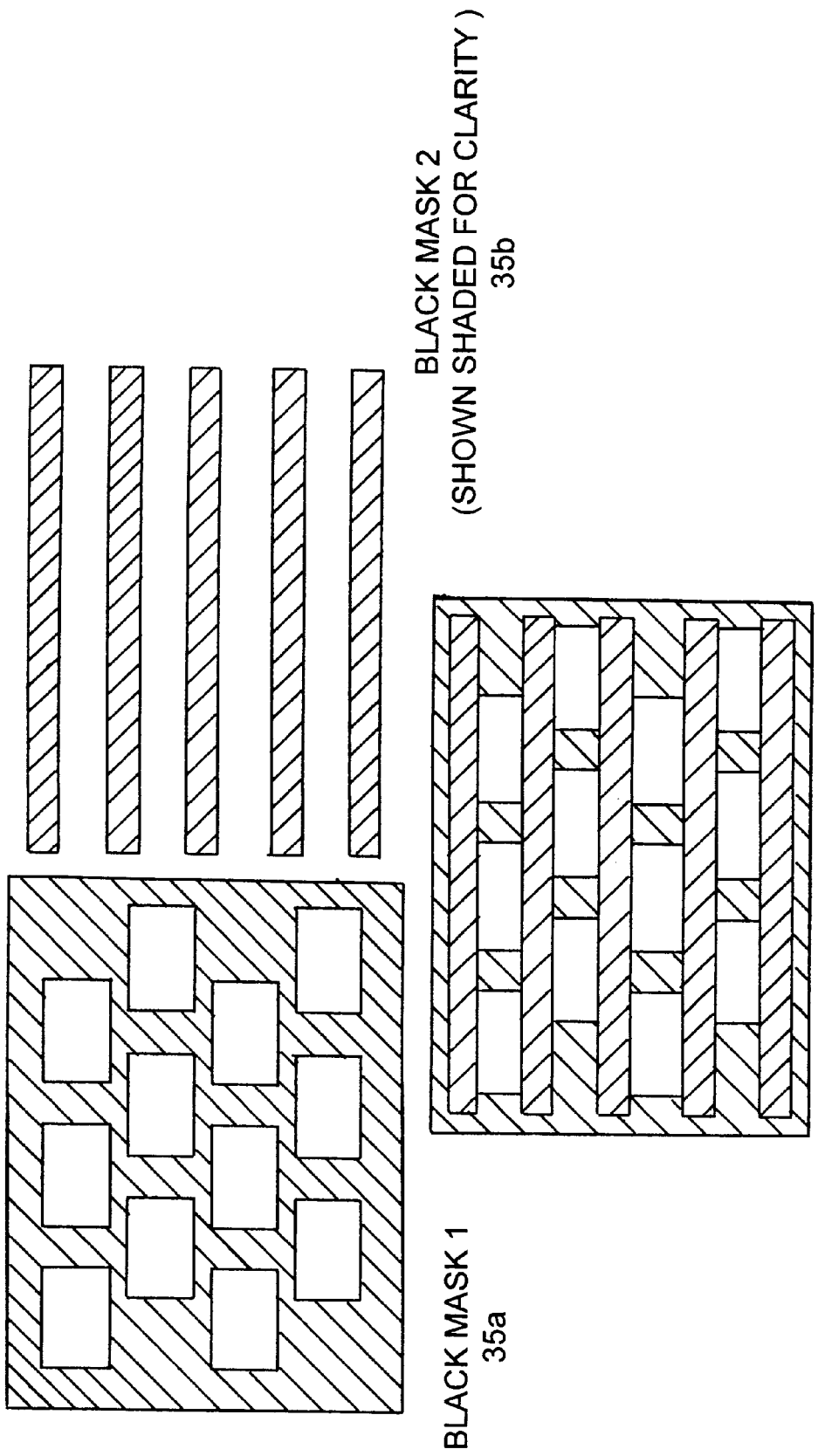
FIG. 50 illustrates a black mask arrangement for reducing light leakage.
Figure 51:
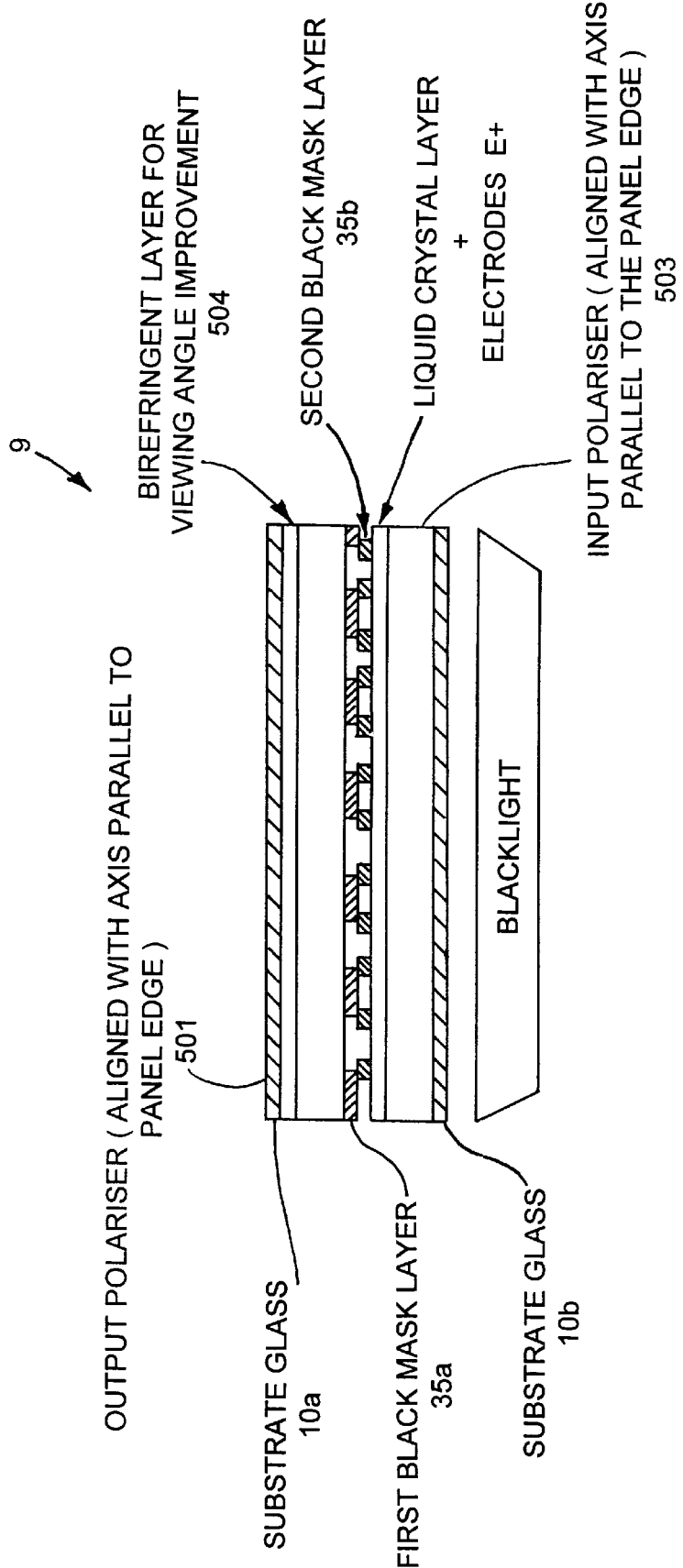
FIG. 51 is a cross-sectional diagram of an SLM incorporating the black mask arrangement of FIG. 50.

FIGS. 50 and 51 illustrate another technique for reducing or eliminating light leakage. The input and output polarisers 503 and 501 are aligned with their polarisation directions parallel to the edges of the pixel apertures. As shown in FIG. 50, the pixel apertures may have rounded corners between adjacent edges so that light leakage can only occur at the rounded corners. However, a second black mask 35b comprising parallel opaque stripes is superimposed over the first black mask 35a such that the combination forms a black mask 35 with sharp corners. Thus, the rounding of pixels caused by imperfections in manufacture can be substantially eliminated so that light leakage at the corners can be substantially prevented.

Aligning the polarisers 501 and 502 in this way effects the viewing angle of the LCD when twisted nematic liquid crystal is used and, as is known, results in different panel contrast on either side of the centre line. This may be corrected by adding a birefringent or reacted mesogen layer 504 as shown in FIG. 51 or by using a different liquid crystal material.

This polarisation rotation is resulting from skew rays reflecting off the black mask edge, then using a colimated backlight may reduce this source of light leakage. However this would effect the viewing zone of the display and is difficult to achieve in compact systems.

If the light leakage mechanism is one of reflection, then using a less reflective black mask may reduce the amount of light being reflected. For instance, an organic pigmented layer or emulsion layer instead of the known inorganic layer may be used to reduce this effect.

What is claimed is:

1. A viewpoint corrected autostereoscopic display for use by an observer, comprising:

at least one display device and an optical system, wherein the optical system cooperates with the display device to form, in a window plane, a plurality of viewing windows with adjacent pairs of the viewing windows overlapping laterally, and wherein the optical system cooperates with the display device to form the overlapping adjacent pairs of viewing windows independent of observer movement; and an image controller for selectively presenting left eye view data and right eye view data to the overlapping adjacent pairs of viewing windows as a function of position of the observer relative to the overlapping adjacent pairs of viewing windows, wherein when an eye of the observer is in a region where an adjacent pair of viewing windows overlap, one of the viewing windows receives black view data.

2. A display as claimed in claim 1, wherein the optical system has at least one lobe, and cooperates with the at least one display device to form at least three windows per lobe.

3. A display as claimed in claim 2, wherein the optical system has at least one lobe, and cooperates with the at least one display device to form three windows per lobe.

4. A display as claimed in claim 1, wherein the at least one display device and the optical system cooperate to repeat the windows in a plurality of lobes.

5. A display as claimed in claim 4, wherein the lobes overlap.

6. A display as claimed in claim 1, wherein the at least one display device comprises a spatial light modulator comprising a plurality of picture elements arranged in rows extending in a first direction and columns extending in a second direction substantially perpendicular to the first direction, the picture elements being arranged in groups of N, where N is an integer greater than one, adjacent picture elements of each group overlapping with each other in the first direction.

7. A display as claimed in claim 6, wherein the picture elements of each group are disposed in two adjacent rows.

8. A display as claimed in claim 6, wherein each of the picture elements has a substantially constant vertical aperture.

9. A display as claimed in claim 6, wherein adjacent groups of picture elements overlap with each other in the first direction.

10. A display as claimed in claim 6, wherein the width of each picture element is substantially equal to one and a half times the lateral pitch of the picture elements.

11. A display as claimed in claim 6, wherein the modulator is a light-emissive device.

12. A display as claimed in claim 6, wherein the modulator is a light-transmissive device.

13. A display as claimed in claim 6, wherein the modulator comprises a liquid crystal device.

14. A display as claimed in claim 6, wherein the optical system comprises a parallax device having a plurality of parallax generating elements which extend in the second direction and each of which is aligned with N columns of picture elements.

15. A display as claimed in claim 1, wherein the at least one display device comprises a spatial light modulator comprising a plurality of picture elements arranged as rows extending in a first direction and columns extending in a second direction substantially perpendicular to the first direction, the picture elements being arranged in groups of N, where N is an integer greater than one, and wherein the optical system comprises: a first parallax device having a plurality of parallax generating elements which extend in the second direction and each of which is aligned with N columns of picture elements; and a second parallax device having a plurality of parallax generating elements which extend in the second direction and each of which is aligned with a respective column of picture elements.

16. A display as claimed in claim 2, further comprising an observer tracker for determining the position of the observer, wherein the image controller is responsive to the observer tracker for dividing the image displayed by the at least one display device such that a window which contains a left eye of the observer receives left eye view data, and a window which contains a right eye of the observer receives right eye view data.

17. A display as claimed in claim 16, wherein the observer tracker is arranged to determine the positions of a plurality of observers and providing at least three windows per observer.

18. A display as claimed in claim 16, wherein the image controller is arranged, when an observer eye is in a region where adjacent windows overlap, to switch the image data received in one of the adjacent windows from black video data to image data, and simultaneously, to switch the image data received in the other of adjacent windows from image data to black video data.

19. A display as claimed in claim 2, further comprising an observer tracker for determining the position of the observer, wherein the image controller is responsive to the observer tracker for dividing the image supplied to the windows in regions across a display surface such that: a left eye of the observer perceives only left eye image information; a right eye of the observer perceives only right eye image information.

20. A display as claimed in claim 1, wherein the optical system has at least one lobe, and cooperates with the at least one display device to form the windows with a lateral pitch substantially equal to 2e/N, where e is an average interocular separation and N is the number of windows per lobe.

21. A display as claimed in claim 2, wherein the at least one display device and the optical system cooperate to repeat the windows in a plurality of lobes.

22. A display as claimed in claim 21, further comprising an observer tracker for determining the position of the observer, wherein the image controller is responsive to the observer tracker for dividing the image displayed by the at least one display device such that a window which contains a left eye of the observer receives left eye view data, and a window which contains a right eye of the observer receives right eye view data.

23. A display as claimed in claim 22, wherein the observer tracker is arranged to determine the positions of a plurality of observers and providing at least three windows per observer.

24. A display as claimed in claim 22, wherein the image controller is arranged, when an observer eye is in a region where adjacent windows overlap, to switch the image data received in one of the adjacent windows from black view data to image data and simultaneously to switch the image data received in the other adjacent windows from image data to black view data.

25. A display as claimed in claim 21, further comprising an observer tracker for determining the position of the observer, wherein the image controller is responsive to the observer tracker for dividing the image supplied to the windows in regions across a display surface such that: a left eye of the observer perceives only left eye image information; a right eye of the observer perceives only right eye image information.

26. A display as claimed in claim 2, wherein the at least one display device comprises a spatial light modulator comprising a plurality of picture elements arranged as rows extending in a first direction and columns extending in a second direction substantially perpendicular to the first direction, the picture elements being arranged in groups of N, where N is an integer greater than one, adjacent picture elements of each group overlapping with each other in the first direction.

27. A display as claimed in claim 26, further comprising an observer tracker for determining the position of the observer, wherein the image controller is responsive to the observer tracker for dividing the image displayed by the at least one display device such that a window which contains a left eye of the observer receives left eye view data, and a window which contains a right eye of the observer receives right eye view data.

28. A display as claimed in claim 27, wherein the observer tracker is arranged to determine the positions of a plurality of observers and providing at least three windows per observer.

29. A display as claimed in claim 27, wherein the image controller is arranged, when an observer eye is in a region where adjacent windows overlap, to switch the image data received in one of the adjacent windows from black to image data and simultaneously to switch the image data received in the other of adjacent windows from image data to black.

30. A display as claimed in claim 26, further comprising an observer tracker for determining the position of the observer, and wherein the image controller is responsive to the observer tracker for dividing the image supplied to the windows in regions across a display surface such that: a left eye of the observer perceives only left eye image information; a right eye of the observer perceives only right eye image information.

31. A display as claimed in claim 1, wherein the optical system cooperates with the display device to form the overlapping adjacent pairs of viewing windows substantially simultaneously.

* * * * *